US008908651B2

(12) United States Patent
Noh et al.

(10) Patent No.: US 8,908,651 B2
(45) Date of Patent: Dec. 9, 2014

(54) REFERENCE SIGNAL TRANSMITTING METHOD

(75) Inventors: Min Seok Noh, Anyang-si (KR); Yeong Hyeon Kwon, Anyang-si (KR); Jae Hoon Chung, Anyang-si (KR); Hyun Woo Lee, Anyang-si (KR); Dong Cheol Kim, Anyang-si (KR); Seung Hee Han, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 323 days.

(21) Appl. No.: 13/128,228

(22) PCT Filed: Nov. 6, 2009

(86) PCT No.: PCT/KR2009/006513
§ 371 (c)(1),
(2), (4) Date: Sep. 19, 2011

(87) PCT Pub. No.: WO2010/053309
PCT Pub. Date: May 14, 2010

(65) Prior Publication Data
US 2012/0033643 A1 Feb. 9, 2012

Related U.S. Application Data

(60) Provisional application No. 61/112,196, filed on Nov. 7, 2008, provisional application No. 61/113,608, filed on Nov. 12, 2008, provisional application No. 61/118,479, filed on Nov. 28, 2008, provisional application No. 61/155,501, filed on Feb. 25, 2009, provisional application No. 61/155,918, filed on Feb. 27, 2009.

(30) Foreign Application Priority Data

Jun. 8, 2009 (KR) .................. 10-2009-0050514
Jun. 8, 2009 (KR) .................. 10-2009-0050515
Jun. 8, 2009 (KR) .................. 10-2009-0050516

(51) Int. Cl.
H04W 72/04 (2009.01)
H04L 25/02 (2006.01)
H04L 1/00 (2006.01)
H04L 5/00 (2006.01)

(52) U.S. Cl.
CPC .......... *H04L 5/0048* (2013.01); *H04L 25/0226* (2013.01); *H04L 1/0083* (2013.01); *H04L 5/001* (2013.01)
USPC .......................................... 370/335

(58) Field of Classification Search
CPC .................................... H04L 5/0048
See application file for complete search history.

(56) References Cited

U.S. PATENT DOCUMENTS

2006/0250941 A1* 11/2006 Onggosanusi et al. ....... 370/208
2008/0260062 A1 10/2008 Imamura
2009/0245187 A1* 10/2009 Nam et al. .................... 370/329
2011/0002293 A1* 1/2011 Yuk et al. ...................... 370/329

FOREIGN PATENT DOCUMENTS

KR 1020050081552 8/2005
KR 1020080054164 6/2008

* cited by examiner

*Primary Examiner* — Huy D Vu
*Assistant Examiner* — Teisha D Hall
(74) *Attorney, Agent, or Firm* — Lee, Hong, Degerman, Kang & Waimey

(57) ABSTRACT

The present invention relates to a radio communication system. More particularly, the present invention relates to a reference signal transmitting method in a radio communication system, comprising the steps of generating a subframe including a control area and a data area, allocating a reference signal to a control channel mapped in the control area, and transmitting the subframe.

16 Claims, 51 Drawing Sheets

UE-specific reference signal of Rel-8 LTE Normal CP case (left), extended CP case (right)

FIG. 5
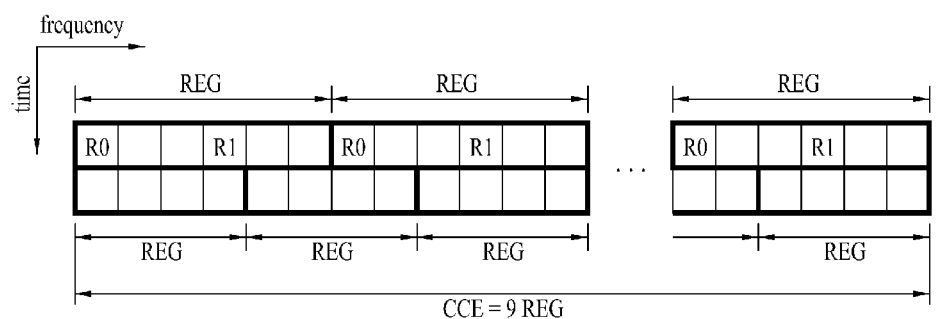
(a) 1 or 2 Tx case
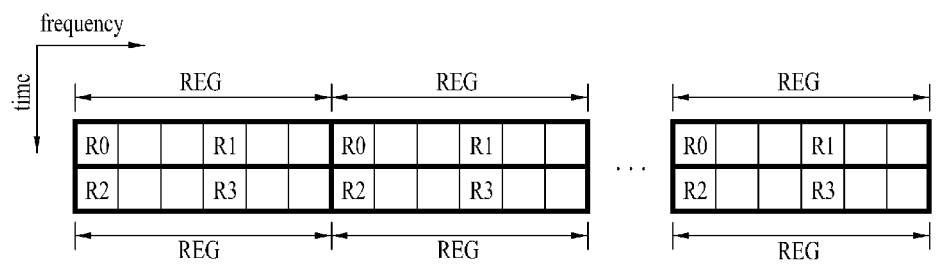
(b) 4 Tx case

FIG. 7
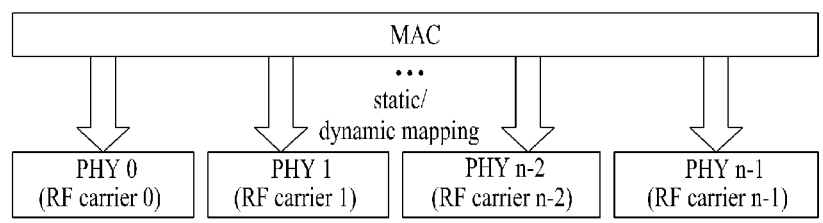
(a)
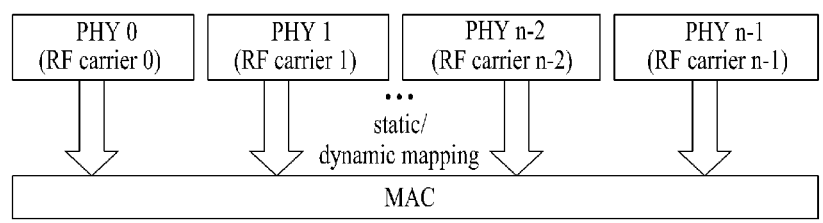
(b)

* Notes: The above process is focused on the four added transmitting antennas (i.e., antennas #4 to #7). Channel estimation for 4 original transmitting antennas (i.e., antennas #0 to #3) can be performed by a general process defined by LTE Rel-8 system.

P-5. Extended CP case

P-6. Extended CP case

P-7. Extended CP case

REFERENCE SIGNAL TRANSMITTING METHOD

This application is the National Stage filing under 35 U.S.C. 371 of International Application No. PCT/KR2009/006513, filed on Nov. 6, 2009, which claims the benefit of earlier filing date and right of priority to Korean Application Nos. 10-2009-0050516, filed on Jun. 8, 2009, 10-2009-0050515, filed on Jun. 8, 2009, and 10-2009-0050514, filed on Jun. 8, 2009, and also claims the benefit of U.S. Provisional Application Serial Nos. 61/155,918, filed on Feb. 27, 2009, 61/155,501, filed on Feb. 25, 2009, 61/118,479, filed on Nov. 28, 2008, 61/113,608, filed on Nov. 12, 2008, and 61/112,196, filed on Nov. 7, 2008, the contents of all of which are incorporated by reference herein in their entirety.

TECHNICAL FIELD

The present invention relates to a radio communication system. The present invention relates to a radio communication system supporting at least one of SC-FDMA, MC-FDMA and OFDMA, and more particularly, to a method of transmitting a reference signal in a radio communication system.

BACKGROUND ART

First of all, 3GPP ($3^{rd}$ generation partnership project) radio communication system based on WCDMA (wideband code division multiple access) radio access technology is globally developing. In particular, HSPDA (high speed downlink packet access) defined as a first evolution stage of WCDMA provides 3GPP with a radio access technology having high competitiveness in the mid-term future.

E-UMTS provides high competitiveness in the long-term future. The E-UMTS (evolved universal mobile telecommunications system) is the system evolved from a conventional WCDMA UMTS and its basic standardization is ongoing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

E-UMTS mainly consists of a user equipment (UE), a base station and an access gateway (AG) provided to an end terminal of a network (E-UTRAN) connected to an external network. The base station is normally able to simultaneously transmit multi-data stream for a broadcast service, a multicast service and/or a unicast service. In LTE system, OFDM (orthogonal frequency divisional multiplexing) and MIMO (multi-input multi-output) are used to transmit various services in downlink.

The OFDM represents a high speed data downlink access system. The advantage of the OFDM is high spectrum efficiency in enabling all allocated spectra to be used by all base stations. A transmission band in OFDM modulation is divided into a plurality of orthogonal subcarriers in a frequency domain and is also divided into a plurality of symbols in a time domain. Since the OFDM divides the transmission band into a plurality of subcarriers, a bandwidth per subcarrier decreases, while a modulation time per subcarrier increases. As a plurality of the subcarriers are transmitted in parallel, a transmission rate of digital data or symbol of a specific subcarrier becomes lower than that of a single carrier.

The MIMO (multiple input multiple output) system is a communication system that uses a plurality of transmitting and receiving antennas. As the number of the transmitting and receiving antennas is incremented, it is able to linearly increase a channel capacity without increasing a frequency bandwidth additionally. The MIMO technique can be classified into a spatial diversity scheme of raising transport reliability using symbols through various channel paths and a spatial multiplexing scheme of raising a transmission rate in a manner of transmitting separate data streams simultaneously from a plurality of transmitting antennas.

And, the MIMO technologies can be classified into an open-loop MIMO technique and a closed-loop MIMO technique, in accordance with whether a transmitting stage is aware of channel information. In the open-loop MIO technology, a transmitting stage is not aware of channel information. For examples of the open-loop MIMO technique, there are PARC (per antenna rate control), PCBRC (per common basis rate control), BLAST, STTC, random beamforming and the like. On the contrary, in the closed-loop MIMO technique, a transmitting stage is aware of channel information. And, performance of the closed-loop MIMO system depends on how accurately the transmitting stage is aware of the channel information. For examples of the closed-loop MIMO technique, there are PSRC (per stream rate control), TxAA and the like.

The channel information means radio channel information (e.g., attenuation, phase shift, time delay, etc.) between a plurality of transmitting antennas and a plurality of receiving antennas. In the MIMO system, various stream paths attributed to a plurality of transmitting and receiving antenna combinations exist. And, the MIMO system has a fading characteristic that a channel status irregularly changes in time/frequency domain in accordance with time due to multi-path time delay. Therefore, a transmitting stage calculates channel information through channel estimation. In this case, the channel estimation means that channel information is estimated to reconstruct a distorted transmission signal. For instance, channel estimation means that a size and reference phase of a carrier are estimated. In particular, the channel estimation means that a frequency response of a radio interval or channel.

For example of a channel estimating method, there is a method of estimating a reference value based on reference signals (RSs) of several base stations using a 2-dimensional (2D) channel estimator. In this case, the reference signal (hereinafter abbreviated RS) means a symbol having high output despite not having data actually in order to help carrier phase synchronization, base station information acquisition and the like. A transmitting/receiving state is able to perform the channel estimation using such RS. The channel estimation using RS is performed in a manner of estimating a channel through a symbol known in common to transmitting and receiving stages and then reconstructing data using the corresponding estimation value. Besides, the RS can be named a pilot as well.

The MIMO system supports a TDD (time division duplex) system and a frequency division duplex (FDD) system. In the TDD system, since a forward link transmission and a backward link transmission exist in a same frequency domain, estimation can be performed on a forward link channel from a backward link channel by reciprocity principle.

DISCLOSURE OF THE INVENTION

Technical Problem

As communication systems are evolving, adopted in general is a method of achieving goals with minimum costs by enhancing performance of a legacy system rather than defining a new system for each communication scheme. Specifically, since communication system is likely to affect all infrastructures as well as RF interfaces of user equipment and base station, a scheme of minimizing changes thereof is commercially meaningful. Therefore, in such an environment, a new version of a communication system is bound to follow limitations in maintaining properties of a legacy system. In particular, major requirements are to provide functions of a new system without degrading performance of a legacy system.

This situation currently takes place in the relation of LTE/LTE-A. Likewise, such a situation takes place on the condition that IEEE 802.16m or other communication systems should secure operations of legacy systems. The basic performance enhancement needs schemes of incrementing a modulation order, incrementing the number of antennas, reducing influence of interference, etc., which requires more reference signals (RSs). In particular, it is able to deliver more information by means of providing a device capable of identifying signal components in a manner of acquiring more channel information. Currently, LTE Rel-8 is designed to support maximum 4 multi-antennas. On the other hand, LTE-A is supposed to support maximum 8 multi-antennas. Yet, a general OFDM based communication system inserts a reference signal in a specific position and then performs channel estimation at the specific position. And, the rest of subcarriers are used for data or control channel. Under this circumstance, when a job for system enhancement is going to be performed in the future, since flexibility fails to exist already, it is unable to insert an additional reference signal.

However, if a specific resource is allowed to be reserved to insert a reference signal, it can be utilized as a resource for the reference signal. For instance, if a specific resource seeming to be in a state of being unallocated by a base station exists in aspect of a legacy user equipment, it can be utilized as a resource for a reference signal. For example of such an available resource, a channel having a usage variable for each user equipment can be taken into consideration. For instance, although a base station sends resource allocation channel, ACK/NACK response channel or traffic channel in any form, a previous legacy user equipment is not affected. Yet, usefulness as a reference signal resource within the corresponding channel can differ in form in accordance with an actual channel structure.

Accordingly, the present invention is directed to a method of transmitting a reference signal in a radio communication system that substantially obviates one or more of the problems due to limitations and disadvantages of the related art.

An object of the present invention is to provide a method of transmitting/receiving a reference signal efficiently in a radio communication system having multiple antennas and signaling method thereof.

Another object of the present invention is to provide a method of transmitting/receiving a reference signal efficiently in case of extending the number of multi-antennas and signaling method thereof.

A further object of the present invention is to provide a method of transmitting/receiving a reference signal and signaling method thereof, by which backward compatibility can be provided in case of extending the number of multi-antennas.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Technical Solution

To achieve these and other advantages and in accordance with the purpose of the present invention, as embodied and broadly described, a reference signal transmitting method in a radio communication system according to a first embodiment of the present invention includes the steps of generating a subframe including a control region and a data region, allocating a reference signal to a control channel mapped in the control region, and transmitting the subframe.

To further achieve these and other advantages and in accordance with the purpose of the present invention, a reference signal processing method in a radio communication system according to a second embodiment of the present invention includes the steps of receiving a subframe including a control region and a data region, extracting a reference signal from a control channel mapped in the control region, and estimating a channel using the reference signal.

According to the first and second embodiments, the reference signal can be allocated to the control channel to have a predetermined pattern within the control region.

According to the first and second embodiments, the reference signal can be transmitted in each period corresponding to a multiple of a subframe or a plurality of multiples of the subframe. In this case, an offset different per component carrier is applied to a start point of transmitting the reference signal.

According to the first and second embodiments, the reference signal includes reference signals for $5^{th}$ to $8^{th}$ antennas and the reference signals for the antennas can be multiplexed together using at least one of TDM (Time Division Multiplexing), FDM (Frequency Division Multiplexing) and CDM (Code Division Multiplexing). Moreover, the reference signals for the antennas can be multiplexed in a hybrid form of TDM, FDM and CDM among a plurality of component carriers.

According to the first and second embodiments, the reference signal can be multiplexed among a plurality of component carriers using at least one of TDM (Time Division Multiplexing), FDM (Frequency Division Multiplexing) and CDM (Code Division Multiplexing). Moreover, the reference signal can be multiplexed in a hybrid form of TDM, FDM and CDM among a plurality of the component carriers.

According to the first and second embodiments, the control channel includes PDCCH (Physical Downlink Control CHannel). In this case, the PDCCH is configured by a CCE (Control Channel Element) unit. Moreover, the control channel includes PHICH (Physical Hybrid-ARQ Indicator CHannel). In this case, the PHICH is configured by a unit of 3 REGs (resource element groups).

According to the first and second embodiments, the reference signal can include one of CRS (Cell-specific Reference Signal), CSI-RS (Channel State Information Reference Signal) for CSI measurement and DM-RS (DeModulation Reference Signal) used for demodulation of a data channel allocated to each user.

To further achieve these and other advantages and in accordance with the purpose of the present invention, a reference signal transmitting method in a radio communication system according to a third embodiment of the present invention includes the steps of generating a subframe including a control region and a data region, signaling information on a control region format of the subframe, allocating a reference signal in a prescribed pattern within the control region in association with the control region format, and transmitting the subframe.

To further achieve these and other advantages and in accordance with the purpose of the present invention, a reference signal processing method in a radio communication system according to a fourth embodiment of the present invention includes the steps of receiving a subframe including a control region and a data region, checking a control region format of the subframe, extracting a reference signal allocated in a prescribed pattern in association with the control region format from the control region, and estimating a channel using the reference signal.

According to the third and fourth embodiments, the method can further include the step of transmitting/receiving configuration information indicating the control region format. And, the method can further include the step of transmitting/receiving information related to a pattern of the reference signal.

According to the third and fourth embodiments, the control region format can be checked via PCFICH (physical control format indicator channel).

According to the third and fourth embodiments, the control region format can be constantly fixed to a specific frame to which the reference signal is allocated. In this case, a size of the control region within the reference signal allocated specific subframe can be fixed to 3 OFDM symbols.

According to the third and fourth embodiments, the control region format can be checked from a parameter for configuring PHICH (physical hybrid-ARQ indicator channel). In this case, a duration of the PHICH within the reference signal configured specific subframe can be fixed to 3 OFDM symbols.

According to the third and fourth embodiments, the reference signal can be allocated to a control channel mapped in the control region. In this case, the control channel is configured using a resource in the control region remaining after allocating reference signals for $1^{st}$ to $4^{th}$ antennas and at least one of reference signals for $5^{th}$ to $8^{th}$ antennas can be allocated to the control channel.

In this case, the reference signals for the $5^{th}$ to $8^{th}$ antennas and the reference signals for the antennas can be multiplexed together using at least one of TDM (Time Division Multiplexing), FDM (Frequency Division Multiplexing) and CDM (Code Division Multiplexing). Moreover, the reference signals for the antennas can be multiplexed in a hybrid form of TDM, FDM and CDM.

According to the third and fourth embodiments, the reference signal can be multiplexed among a plurality of component carriers using at least one of TDM (Time Division Multiplexing), FDM (Frequency Division Multiplexing) and CDM (Code Division Multiplexing). Moreover, the reference signal can be multiplexed in a hybrid form of TDM, FDM and CDM among a plurality of the component carriers.

According to the third and fourth embodiments, the control channel includes PDCCH (Physical Downlink Control CHannel).

According to the third and fourth embodiments, the reference signal can include one of CRS (Cell-specific Reference Signal) for $5^{th}$ to $8^{th}$ antennas among 8 antennas, CSI-RS (Channel State Information Reference Signal) for CSI measurement and DM-RS (DeModulation Reference Signal) used for demodulation of a data channel allocated to each user.

To further achieve these and other advantages and in accordance with the purpose of the present invention, a reference signal transmitting method in a radio communication system according to a fifth embodiment of the present invention includes the steps of generating a subframe including a plurality of PHICH (Physical Hybrid-ARQ Indicator CHannel) groups, allocating a reference signal to at least one specific PHICH group, and transmitting the subframe. And, the steps can further include the step of transmitting information for identifying a PHICH resource to which the reference signal is allocated.

To further achieve these and other advantages and in accordance with the purpose of the present invention, a reference signal processing method in a radio communication system according to a sixth embodiment of the present invention includes the steps of receiving an information for identifying a PHICH group to which a reference signal is allocated, receiving a subframe including a plurality of PHICH (Physical Hybrid-ARQ Indicator CHannel) groups, extracting a reference signal from at least one specific PHICH group based on the control information, and estimating a channel using the reference signal.

According to the fifth and sixth embodiments, the at least one specific PHICH group can be selected to be evenly distributed within a system band.

According to the fifth and sixth embodiments, the at least one specific PHICH group can be determined by selecting a physical index of a PHICH group or a physical index of REG configuring the PHICH group with an equal interval.

According to the fifth and sixth embodiments, the reference signal can be allocated using a portion of the resource of the specific PHICH group.

According to the fifth and sixth embodiments, the reference signal can be allocated using a contiguous PHICH group or a contiguous REG.

According to the fifth and sixth embodiments, the reference signal can include one of CRS (Cell-specific Reference Signal) for $5^{th}$ to $8^{th}$ antennas among 8 antennas, CSI-RS (Channel State Information Reference Signal) and DM-RS (DeModulation Reference Signal). The reference signal for each of the antennas can be multiplexed using at least one of TDM (Time Division Multiplexing), FDM (Frequency Division Multiplexing) and CDM (Code Division Multiplexing). Moreover, the reference signal for each of the antennas can be multiplexed in a hybrid form of TDM, FDM and CDM.

According to the fifth and sixth embodiments, the reference signal can be multiplexed among a plurality of component carriers using at least one of TDM (Time Division Multiplexing), FDM (Frequency Division Multiplexing) and CDM (Code Division Multiplexing). Moreover, the reference signal can be multiplexed in a hybrid form of TDM, FDM and CDM among a plurality of the component carriers.

According to the fifth and sixth embodiments, the reference signal can be transmitted in each period corresponding to a multiple of a subframe or a plurality of multiples of the subframe. In this case, an offset different per component carrier is applied to a start point of transmitting the reference signal.

To further achieve these and other advantages and in accordance with the purpose of the present invention, a reference signal transmitting method in a radio communication system according to a seventh embodiment of the present invention includes the steps of generating a subframe including a PDCCH search space including a plurality of CCEs (control channel elements), allocating a reference signal in the PDCCH search space, and transmitting the subframe.

To further achieve these and other advantages and in accordance with the purpose of the present invention, a reference signal processing method in a radio communication system according to an eighth embodiment of the present invention includes the steps of receiving a subframe including a PDCCH search space including a plurality of CCEs (control channel elements), checking a specific CCE to which a reference signal is allocated in the PDCCH search space, extracting the reference signal from the specific CCE, and estimating a channel using the reference signal.

According to the seventh and eighth embodiments, the reference signal can be allocated within a CCE set including a prescribed number of the CCEs.

According to the seventh and eighth embodiments, the reference signal can be allocated to a UE-common search space allowing a search for all user equipments within a cell in the PDCCH search space.

According to the seventh and eighth embodiments, the reference signal can be allocated in the rest of the UE-common search space except the CCE reserved for a prescribed purpose. In this case, the CCE reserved for the prescribed purpose may be associated with RACH (random access channel).

According to the seventh and eighth embodiments, the reference signal for a first antenna group is allocated to a first UE-common search space and the reference signal for a second antenna group can be allocated to a second UE-common search space. In this case, the first antenna group includes $1^{st}$ to $4^{th}$ antennas among 8 antennas and the second antenna group can include $5^{th}$ to $8^{th}$ antennas among the 8 antennas.

According to the seventh and eighth embodiments, the reference signal can be allocated to a UE-specific search space allowing a search for a specific user equipment only within the PDCCH search space. In this case, the reference signal can be allocated to a first or last CCE of the UE-specific search space and at least one CCE contiguous with the CCE. Moreover, the reference signal can be allocated to a plurality of the CCEs situated in the UE-specific search space by being equally spaced apart from each other.

According to the seventh and eighth embodiments, the reference signal can include one of CRS (Cell-specific Reference Signal) for $5^{th}$ to $8^{th}$ antennas among 8 antennas, CSI-RS (Channel State Information Reference Signal) and DM-RS (DeModulation Reference Signal). The reference signal for each of the antennas can be multiplexed using at least one of TDM (Time Division Multiplexing), FDM (Frequency Division Multiplexing) and CDM (Code Division Multiplexing). Moreover, the reference signal for each of the antennas can be multiplexed in a hybrid form of TDM, FDM and CDM.

According to the seventh and eighth embodiments, the reference signal can be multiplexed among a plurality of component carriers using at least one of TDM (Time Division Multiplexing), FDM (Frequency Division Multiplexing) and CDM (Code Division Multiplexing). Moreover, the reference signal can be multiplexed in a hybrid form of TDM, FDM and CDM among a plurality of the component carriers.

According to the seventh and eighth embodiments, the reference signal can be transmitted in each period corresponding to a multiple of a subframe or a plurality of multiples of the subframe. In this case, an offset different per component carrier is applied to a start point of transmitting the reference signal.

To further achieve these and other advantages and in accordance with the purpose of the present invention, a reference signal transmitting method in a radio communication system according to a ninth embodiment of the present invention includes the steps of generating a subframe including a control region and a data region, allocating a reference signal to a data channel mapped in the data region, and transmitting the subframe.

To further achieve these and other advantages and in accordance with the purpose of the present invention, a reference signal processing method in a radio communication system according to a tenth embodiment of the present invention includes the steps of receiving a subframe including a control region and a data region, extracting a reference signal mapped in a prescribed pattern to a data channel in the data region, and estimating a channel using the reference signal.

According to the ninth and tenth embodiments, the prescribed pattern for allocating the reference signal can apply to one of patterns A-1 to A-8, patterns B-1 to B-4, patterns C-1 to C-16, patterns D-1 to D-4, patterns E-1 and E-2, and patterns P-1 to P-8, which will be described later.

According to the ninth and tenth embodiments, the data channel is configured using a resource in the data region remaining after allocating the reference signal for a first antenna group and the reference signal for a second antenna group is allocated to the data channel. The first antenna group includes $1^{st}$ to $4^{th}$ antennas among 8 antennas and the second antenna group includes $5^{th}$ to $8^{th}$ antennas among the 8 antennas.

According to the ninth and tenth embodiments, the reference signal can be transmitted in each period corresponding to a multiple of a subframe or a plurality of multiples of the subframe. In this case, an offset different per component carrier is applied to a start point of transmitting the reference signal.

According to the ninth and tenth embodiments, the reference signal includes reference signals for $5^{th}$ to $8^{th}$ antennas and the reference signals for the antennas can be multiplexed together using at least one of TDM (Time Division Multiplexing), FDM (Frequency Division Multiplexing) and CDM (Code Division Multiplexing). Moreover, the reference signals for the antennas can be multiplexed in a hybrid form of TDM, FDM and CDM among a plurality of component carriers.

According to the ninth and tenth embodiments, the reference signal can be multiplexed among a plurality of component carriers using at least one of TDM (Time Division Multiplexing), FDM (Frequency Division Multiplexing) and CDM (Code Division Multiplexing). Moreover, the reference signal can be multiplexed in a hybrid form of TDM, FDM and CDM among a plurality of the component carriers.

According to the ninth and tenth embodiments, the data channel includes PDSCH (Physical Downlink Shared CHannel).

According to the ninth and tenth embodiments, the reference signal can include one of CRS (Cell-specific Reference Signal), CSI-RS (Channel State Information Reference Signal) for CSI measurement and DM-RS (DeModulation Reference Signal) used for demodulation of a data channel allocated to each user.

It is to be understood that both the foregoing general description and the following detailed description are exemplary and explanatory and are intended to provide further explanation of the invention as claimed.

Advantageous Effects

Accordingly, embodiments of the present invention provide the following effects and/or advantages.

First of all, in a radio communication system having multiple antennas, a reference signal is efficiently transmitted/received and signaling of the transmitted/received reference signal can be performed.

Secondly, in case of extending the number of multi-antennas, a reference signal is efficiently transmitted/received and signaling of the transmitted/received reference signal can be performed.

Thirdly, in case of extending the number of multi-antennas, a reference signal is transmitted/received with backward compatibility and signaling of the transmitted/received reference signal can be performed.

Fourthly, in an environment that user equipments having different capabilities coexist, a reference signal is efficiently transmitted/received and signaling of the transmitted/received reference signal can be performed.

Effects obtainable from the present invention are non-limited the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 5 shows a resource unit allocated to a control channel;

FIG. 7 (a) and FIG. 7 (b) exemplarily show a multi-band radio frequency based signal transmitting/receiving method;

BEST MODE

Mode for Invention

Reference will now be made in detail to the preferred embodiments of the present invention, examples of which are illustrated in the accompanying drawings. The embodiments described in the following description include the examples showing that the technical features of the present invention are applied to a radio communication system. Preferably, the radio communication system is able to support at least one of SC-FDMA scheme, MC-FDMA scheme and OFDMA scheme. In the following description, methods of allocating an additional reference signal via various channels are exemplarily shown. Although the present specification is described based on channels of 3GPP LTE, examples described in the present specification are applicable to a reference signal resource allocating method using a control channel of IEEE 802.16 (or a revised version of IEEE 802.16) or a control channel of another system.

Abbreviations used in the present specification are described as follows.

RE: Resource element
REG: Resource element group
CCE: Control channel element
CDD: Cyclic delay diversity
RS: Reference signal
CRS: Cell specific reference signal or cell common reference signal
CSI-RS: Channel state information reference signal
DM-RS: Demodulation reference signal
MIMO: Multi-input multi-output
PBCH: Physical broadcast channel
PCFICH: Physical control format indicator channel
PDCCH: Physical downlink control channel
PDSCH: Physical downlink shared channel
PHICH: Physical hybrid-ARQ indicator channel
PMCH: Physical multicast channel
PRACH: Physical random access channel
PUCCH: Physical uplink control channel
PUSCH: Physical uplink shared channel FIG. 1 shows a structure of a radio frame used for 3GPP LTE.

Figure 1:
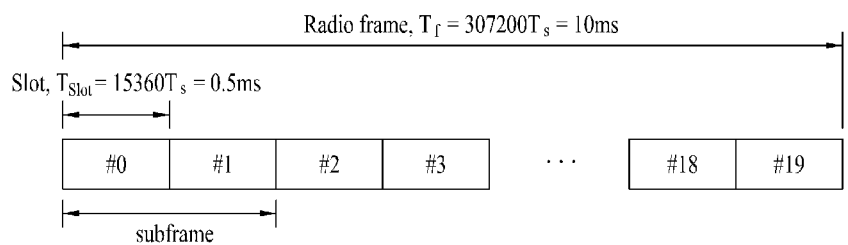
FIG. 1 shows a structure of a radio frame used for LTE system.

Referring to FIG. 1, a radio frame has a length of 10 ms $(327200 \cdot T_s)$ and is constructed with 10 subframes in equal size. Each of the subframes has a length of 1 ms and is constructed with two slots. Each of the slots has a length of 0.5 ms (15360·$T_s$). In this case, $T_s$ indicates a sampling time and is expressed as $T_s$=1/(15 kHz×2048)=3.2552×10$^{-8}$ (about 33 ns). The slot includes a plurality of OFDM symbols in a time domain and includes a plurality of resource blocks (RB) in a frequency domain. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 2:
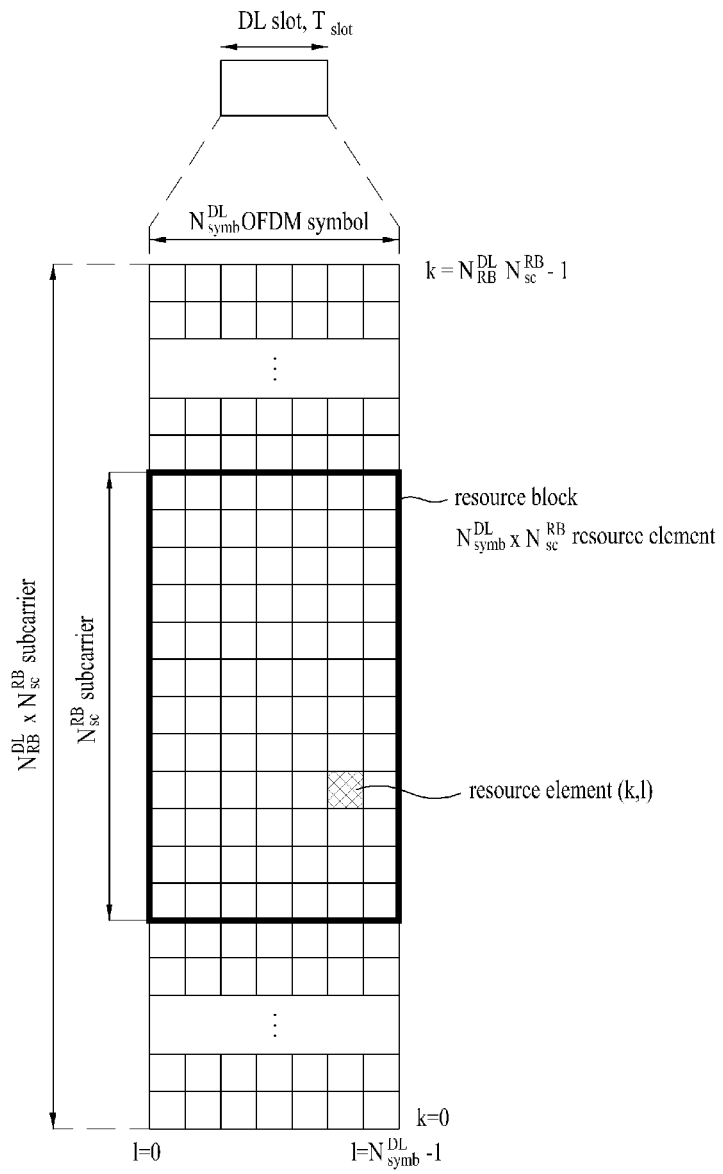
FIG. 2 shows a resource grid for a downlink slot.

FIG. 2 shows a resource grid for a downlink slot.

Referring to FIG. 2, a downlink slot includes $N_{symb}^{DL}$ OFDM symbols in a time domain and $N_{RB}^{DL}$ resource blocks in a frequency domain. Since each resource block includes $N_{sc}^{RB}$ subcarriers, a downlink slot includes $N_{RB}^{DL} \times N_{sc}^{RB}$ subcarriers in the frequency domain. FIG. 2 shows that a downlink slot includes 7 OFDM symbols and that a resource block includes 12 subcarriers, by which the downlink slot is non-limited. For instance, the number of OFDM symbols included in a downlink slot can be modified according to a length of a cyclic prefix (CP). Each element on a resource grid is named a resource element (RE). One resource element is indicated by one OFDM symbol index and one subcarrier index. One resource block (RB) is constructed with $N_{symb}^{DL} \times N_{sc}^{RB}$ resource elements (REs). The number ($N_{RB}^{DL}$) of resource blocks included in a downlink slot is dependent on a downlink transmission bandwidth set for a cell.

Figure 3:
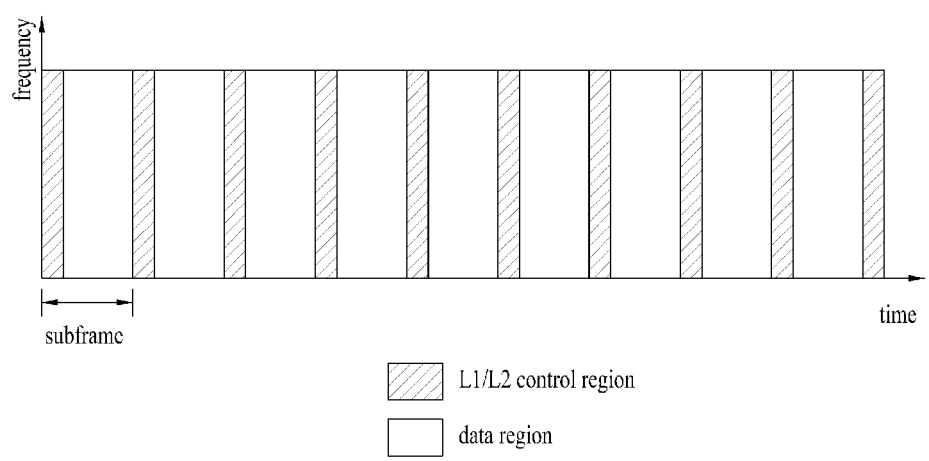
FIG. 3 shows a structure of a downlink radio frame.

FIG. 3 shows a structure of a downlink radio frame.

Referring to FIG. 3, a downlink radio frame includes 10 subframes, each of which has an equal length. Each subframe includes L1/L2 (Layer 1/Layer 2) control region and a data region. In the following description, the L1/L2 control region shall be simply called a control region. The control region starts with a first OFDM symbol of a subframe and includes at least one or more OFDM symbols. A size of the control region can be independently set for each subframe. The control region is used in transmitting L1/L2 control signal. For this, such a control channel as PCFICH, PHICH, PDCCH and the like is allocated to the control region. Meanwhile, the data region is used in transmitting downlink traffic. And, PDSCH is allocated to the data region.

Figure 4:
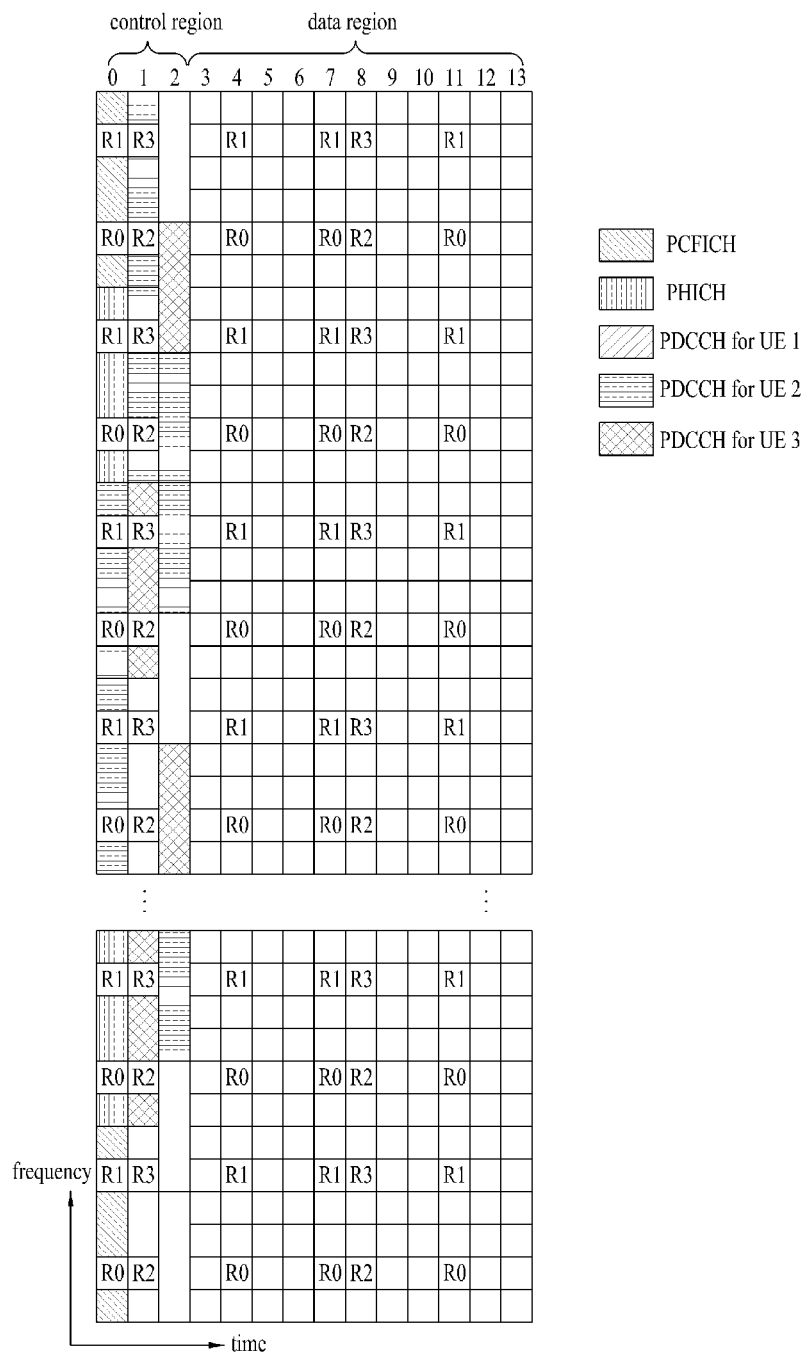
FIG. 4 shows a control channel allocated to a downlink subframe.

FIG. 4 shows a control channel allocated to a downlink subframe.

Referring to FIG. 4, a subframe is constructed with 14 OFDM symbols. According to the number of OFDM symbols for a control region set by PCFICH in the subframe, 1~3 OFDM symbols at first are used as the control region and the rest of the OFDM symbols (e.g., 13~11 OFDM symbols) are used for a data region. In FIG. 4, R1 to R4 indicate reference signals (RS) for antennas 0 to 3, respectively. The reference signal (RS) is fixed to a predetermined pattern within a subframe irrespective of the control region or the data region. A control channel is assigned to a resource failing to have the RS allocated thereto in the control region. And, a traffic channel is assigned to a resource failing to have the RS allocated thereto in the data region as well. Control channels assigned to the control region include PCFICH (Physical Control Format Indicator CHannel), PHICH (Physical Hybrid-ARQ Indicator CHannel), PDCCH (Physical Downlink Control CHannel), etc.

The PCFICH is a physical control format indicator channel informs a user equipment of the number of OFDM symbols used for PDCCH for each subframe. The PCFICH is located at a first OFDM symbol and is set prior to the PHICH and the PDCCH. The PCFICH is constructed with four resource element groups (REGs). Each of the REGs is distributed within the control region based on a cell ID. One REG is constructed with four REs. REG structure will be described in detail with reference to FIG. 5. The PCFICH indicates a value of 1~3 and is modulated by QPSK (quadrature phase shift keying).

Table 1 exemplarily shows a resource mapping relation of PCFICH according to cell ID.

TABLE 1

The PHICH is a physical HARQ indicator channel and is used in carrying H-ARQ ACK/NACK for uplink transmission. The PHICH is constructed with 3 REGs and is cell-specifically scrambled. The resource mapping of PHICH shall be described in detail with reference to FIG. 6 later. The ACK/NACK is indicated by 1 bit, is spread by 'SF (spreading factor)=4', and is repeated three times. A plurality of PHICHs can be mapped to the same resource. And, the PHICH is modulated by BPSK (binary phase shift keying).

The PDCCH is a physical downlink control channel and is assigned to first n OFDM symbols. In this case, 'n' is an integer equal to or greater than 1 and is indicated by the PCFICH. The PDCCH is allocated by CCE unit and one CCE includes 9 REGs. The PDCCH indicates information relevant to resource allocation of transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control signals or specific service data. Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

FIG. 5 (a) and FIG. 5 (b) show resource units used in configuring a control channel, respectively.

Specifically, FIG. 5 (a) shows a case that the number of transmitting antenna(s) is 1 or 2. FIG. 5 (b) shows a case that the number of transmitting antennas is 4. And, the former and latter cases only differ from each other in RS pattern according to the number of the transmitting antennas but are identical to each other in a method of setting a resource unit related to a control channel. Referring to FIG. 5 (a) and FIG. 5 (b), a resource unit for a control channel is REG (resource element group). The REG includes four resource elements neighbor to each other while RS is excluded. The REG is represented as a bold line in the drawings. PCFICH includes 4 REGs and PHICH includes 3 REGs. PDCCH is configured by CCE (control channel element) unit. And, one CCE includes 9 REGs. Although the drawings exemplarily show that the REGs configuring the CCE are neighboring to each other, the REGs can be distributed on 9 REGs configuring the CCE.

Figure 6:
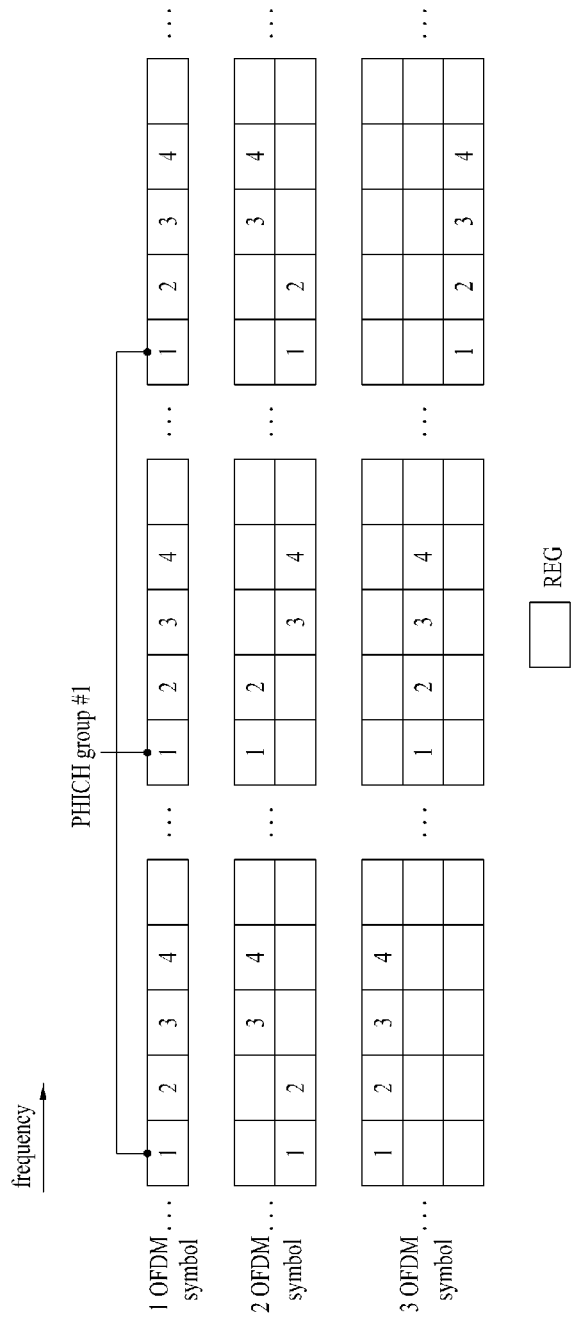
FIG. 6 shows an example for allocating PHICH within a control region.

FIG. 6 shows an example of allocating PHICH within a control region.

First of all, allocation of PHICH is affected by PCFICH. Although a start position of the PCFICH varies in accordance with a cell ID, as shown in Table 1, the PCFICH is transmitted in an interval, which results from dividing a whole subcarrier of a first OFDM symbol into 4 equal parts, using 4 REGs. And, the PHICH is defined for the REG remaining after the allocation of the PCFICH. For at least one or more OFDM symbols set by a PHICH duration, the remaining REGs except RS and the PCFICH (i.e., first OFDM symbol) are divided into 3 equal parts on each of the OFDM symbols and PHICH groups are contiguously allocated in a manner of starting at a specific start position.

Referring to FIG. 6, 3 PHICH allocation sections exist in a frequency domain. And, it can be observed that PHICH groups are contiguously allocated to each of the PHICH allocation sections. In the drawing, the same numeral indicates the same PHICH group. Each of the PHICH groups is constructed with 3 REGs spaced apart from each other. The PHICH duration is restricted by a maximum size of a control region and corresponds to 1 to 3 OFDM symbols. In case that a plurality of OFDM symbols are used for PHICH, the REGs belonging to the same PHICH group for time diversity are transmitted using different OFDM symbols, respectively. Moreover, in case that PHICH is transmitted via multiple antennas, the REGs belonging to the same PHICH group for space diversity are transmitted via different antenna sets, respectively. And, each of the antenna sets includes a pair of antennas.

FIG. 7 (a) and FIG. 7 (b) exemplarily show a multi-band radio frequency based signal transmitting/receiving method.

Referring to FIG. 7 (a) and FIG. 7 (b), a single MAC layer in transmitting/receiving stage is able to manage several carriers to use a multi-carrier efficiently. In this case, in order to effectively transmit and receive a multi-carrier, assume that both of the transmitting stage and the receiving stage are able to transceive multi-carriers. Since frequency carriers (FCs) managed by the single MAC layer need not to be contiguous to each other, they are flexible in aspect of resource management. In particular, both contiguous aggregation and non-contiguous aggregation are possible.

PHY 0, PHY 1 . . . PHY n−2 and PHY n−1 indicate multi-bands, respectively. And, each of the bands can have a size of a frequency allocation band (FA) allocated for a specific service in accordance with a predetermined frequency policy. For instance, the PHY 0 (RF carrier 0) can have a size of a frequency band allocated for a normal FM radio broadcasting. For another instance, the PHY 1 (RF carrier 1) can have a size of a frequency band allocated for a mobile phone communication.

Thus, although the frequency bands can differ from each other in frequency band size in accordance with frequency band characteristics, the following description is made on the assumption that each frequency allocation band (FA) has a size of A MHz. And, each frequency allocation band can be represented by a carrier frequency band to use a baseband signal on each frequency band. In the following description, each frequency allocation band is named 'carrier frequency band'. Alternatively, if there is no confusion, each frequency allocation band shall be simply named 'carrier' that represents each carrier frequency band. Moreover, in order to discriminate the above-mentioned carrier from a subcarrier used by a multi-carrier scheme in the recent 3GPP LTE-A, the above-mentioned carrier can be named 'component carrier'. In this aspect, the above-mentioned 'multi-band' scheme can be named 'multi-carrier' scheme or 'carrier aggregation' scheme.

In order to transmit a signal on a multi-band [FIG. 7 (a)] or to receive a signal on the multi-band [FIG. 7 (b)], both a transmitter and a receiver need to include RF modules configured to transmit and receive signals on the multi-band, respectively. In FIG. 7 (a) and FIG. 7 (b), a configuration method of 'MAC' is determined by a base station irrespective of DL and UL. Schematically, 'multi-band' scheme means a scheme of transmitting/receiving a signal in a manner that a single MAC entity (hereinafter named 'MAC simply if there is no confusion) manages/operates a plurality of radio frequency carriers (RF carrier: Radio Frequency). Moreover, RF carriers managed by a single MAC need not to be contiguous with each other. Therefore, the 'multi-band' scheme is able to perform resource management more flexibly.

Figure 8:
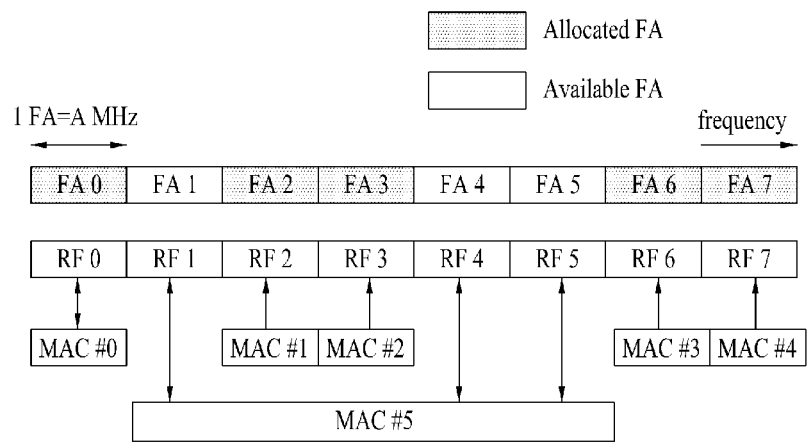
FIG. 8 exemplarily shows a method of allocating a frequency in a multi-carrier system.

FIG. 8 exemplarily shows a method of allocating a frequency in a multi-carrier system.

Referring to FIG. 8, FA 0 to FA 7 can be managed by RD 0 to RF 7, respectively. In FIG. 8, it is assumed that FA 0, FA 2, FA3, FA 6 and FA 7 are already allocated to specific communication services in advance, respectively. In this case, the available RF 1 (FA 1), RF 4 (FA 4) and RF 5 (FA 5) can be effectively managed by a single MAC (MAC #5). In this case, as mentioned in the foregoing description, since RF carriers configuring a single may not be contiguous with each other, frequency resources can be managed more efficiently.

Figure 9:
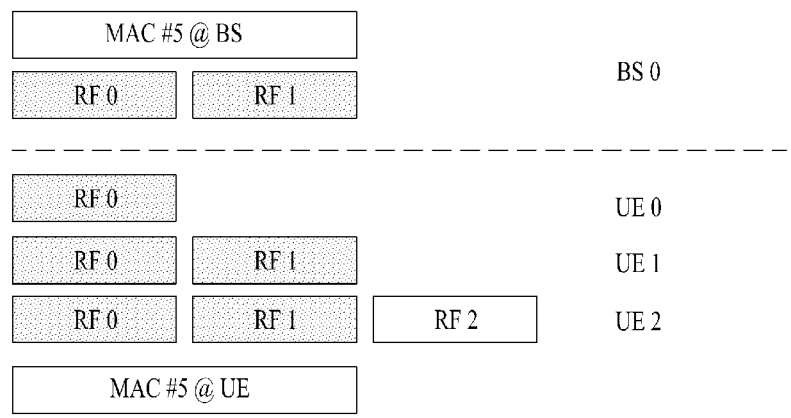
FIG. 9 exemplarily shows a scenario for performing communications between a base station and a plurality of user equipments in a multi-band supporting scheme.

FIG. 9 exemplarily shows a scenario for performing communications between a base station (BS) and a plurality of user equipments (UEs) in a multi-band supporting scheme. Referring to FIG. 9, it is assumed that signals for UE 0, UE 1 and UE 2 are multiplexed. BS 0 is able to transmit a signal on a frequency band managed by carriers of RF 0 and RF 1. Assume that UE 0 is capable of receiving RF 0 only. Assume that UE 1 is able to receive both of RF 1 and RF 2. And, assume that UE 2 is able to receive RF 0, RF 1 and RF 2. In this case, BS 0 multiplexes the signal for UE 0 with RF 0 only and multiplexes the signals for UE 1 and UE 2 with RF 0 and RF 1, respectively. Meanwhile, since BS 0 transmits RF 0 and RF 1 only, UE 2 is unable to receive a signal via RF 2.

One embodiment of the present invention relates to a method of transmitting RS in DL in case that the number of transmitting antennas is extended to M (>N) in a previous system having N transmitting antennas. In this case, the RS can include CSI-RS for measurements of CRS (cell-specific reference signal) and CSI (channel state information) or DM-RS (demodulation reference signal) used for demodulation of a data channel allocated to each user. LTE Rel08 assume that the number of antennas in DL is 4 (=N). Therefore, LTE Rel-8 user equipment is able to recognize antennas up to 4. On the other hand, LTE-A is considering that the number of antennas used for DL transmission is extended to 8 (=M). Although one embodiment of the present invention in the following description an example using LTE-A, it should be understood that the present invention is applicable to any MIMO systems, which meet the condition of 'M>N', in a manner of adhering to the same principle.

In the above-described environment, LTE Rel-8 UE capable of recognizing the previous 4 (=N) transmitting antennas only and LTE-A UE capable to recognizing antennas up to 8 (=M) coexist within a cell of a base station (BS) supporting LTE-A. In the environment that the LTE-A UE capable of recognizing 8 antennas is added without additional signaling to the LTE Rel-8 UE capable of recognizing the previous 4 antennas only, it is necessary to transmit data and a reference signal efficiently. In order to support an MIMO method for 8 transmitting antennas (antenna #0~antenna #7) in downlink, it is necessary to measure and estimate channel information on the 8 transmitting antennas. Simultaneously, a method of maintaining backward compatibility with the current 3GPP LTE-8 is required as well. Moreover, in the system that considers carrier aggregation in single- and multi-carrier situations like LTE-A, it is necessary to measure channel information on 8 transmitting antennas per component carrier to support the MIMO method for the 8 transmitting antennas (antenna #0~antenna #7) in downlink per component carrier.

Therefore, the embodiment of the present invention proposes a reference signal transmitting method for supporting 8 transmitting antennas to meet the above requirements. In particular, the embodiment of the present invention proposes a method of performing channel estimation experienced by 8 transmitting antennas by transmitting CRS and/or CSI-RS for channel dependent scheduling. This proposed method is identically usable in transmitting DM-RS as well.

LTE Rel-8 is defined to use antenna port 5 in case of closed loop rank 1 transmission mode. Hence, if a antenna port number is defined in a same manner of current LTE Rel-8, the newly-considered 4 antennas (i.e., antenna #4~antenna #7) can be considered as antenna port number 6~antenna port number 9 (R6~R9). In another aspect of definition, the R6 to R9 defined as the antenna port numbers can be used for the definition of rank or layers in case of MIMO transmission rather than antenna ports. In the following detailed description, the antenna port number can be defined as a rank number or a layer number.

Meanwhile, in order to maintain a maximum overhead below 15% in transmitting RS, LTE Rel-8 defines the number of reference signals included in a single resource block as shown in Table 2.

TABLE 2

| | Antenna port | | | |
|---|---|---|---|---|
| | 0 | 1 | 2 | 3 |
| # of RSs | 8 | 8 | 4 | 4 |

Referring to Table 2, LTE Rel-8 defines the RS numbers of antenna ports 0 to 4 as 8, 8, 4, and 4, respectively. Since each of the RS numbers for the antenna port 2 and the antenna port 3 is 4, in case that the LTE-A system additionally supports antenna ports 6 to 9, it is able to consider that each of the RS numbers for the antenna ports 6 to 9 is limited within 4. The more the RS number is incremented, the more accurate the channel estimation can be performed. Yet, since each of the RS numbers of the antenna port 2 and the antenna port 3 is limited to 4 in the LTE Rel-8 environment supporting 4 antennas, it may preferable to put the same limitation on the added antennas.

In the following description, a method of transmitting RS (R6~R9) for antenna port 6~9 is explained in detail with reference to the accompanying drawings. For clarity, R6~R9 is named an additional RS. In the present specification, RS can include one of CRS, CSI-RS and DM-RS.

Detailed Example 1

Transmission of RS Using PDCCH

In case of PDCCH, channel ID and UE ID are designed in association with each other. In particular, a position, for which a single UE should search a single radio frame, is determined in accordance with a determined size of the PDCCH (e.g., 0 to 3 OFDM symbols in LTE Rel-8). A set of PDCCH candidates to be searched is defined as a search space.

The search space $S_k^{(L)}$, which is an aggregation level, is defined as a set of PDCCH candidates. And, CCEs corresponding to the PDCCH candidates in the search space $S_k^{(L)}$ is defined as follows.

$$L \cdot \{(Y_k+m) \bmod \lfloor N_{CCE,k}/L \rfloor\}+i$$

In Formula 1, $Y_k$ is defined in a tail part, it is i=0, . . . , L−1, and it is m=0, . . . , $M^{(L)}$−1. $M^{(L)}$ indicates the number of PDCCH candidates that should be monitored in a given search space.

UE should monitor one common search space on Level 4 and Level 8 and should monitor a UE-specific search space on aggregation levels 1, 2, 4 and 8. And, the common search space and the UE-specific search space can be overlapped with each other.

Table 3 shows one example of a search space that should be monitored by UE.

TABLE 3

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

For the common search space, $Y_k$ is set to 0 for an aggregation level (L=4) and an aggregation level (L=8). For the UE-specific space $S_k^{(L)}0\|$ on an aggregation level L, $Y_k$ is defined as follows.

$$Y_k = (A \cdot Y_{k-1}) \bmod D$$

In Formula 2, it is $Y_{-1} = n_{RNTI} \neq 0$, it is A=39827, and it is D=65537.

As mentioned in the foregoing description, the space, which should be searched by a UE, is divided into two kinds. One of the two kinds is a common search space all UEs should search, while the other is a UE-specific search space. Hence, in case of using CCE, which is a resource of PDCCH, as an RS resource, both of the two spaces can be taken into consideration.

1. Case of Using a Common Search Space

If CCE is used in a common search space, it is equal to using a portion of a space searched by all UEs. Yet, in case of using a case of 'L=4' in accordance with definition of aggregation levels for example, it is preferable that all corresponding CCEs are used. Since the rest of the CCEs are not available for other usages, it is a proper selection to use 4 CCEs as they are. In doing so, it is preferable to use a common search space index that is not overlapping with RACH response channel. When a legacy user equipment transmits a signal using RACH, as a common search space index of the corresponding PDCCH is fixed already, allocation should be made by voiding it. Therefore, when RCH or a specific response is in downlink through a common search space, collision should be controller to prevent a different RS from being transmitted from a position at which the legacy user equipment should await a response. Therefore, the corresponding setting can be made in a manner of discriminating a case of allocation an RS resource in a common search space, a case of defining a common search space to be used for a specific pattern (e.g., a prescribed designated periodicity, a specific periodicity (e.g., 5 ms, 10 ms, 20 ms, 40 ms, etc.)) and then using an index of the defined common search space, and the like from each other. In order to settle a phenomenon that a common search space becomes in short of CCE resources in case of allocating CCEs for RS transmission in the common search space, a rage of CCEs in a common search space dedicated to LTE-A UE is set to N CCEs (N is greater than 16 of previous CCE indexes #0 to #15), i.e., CCE index #0 to CCE index #(N−1), PDCCHs carrying information to be received in common by LTE Rel-8 UE and LTE-A UE, information to be received in common by LTE-A UEs or information to be received in common by LTE Rel-8 UEs can be transmitted on the CCE indexes #0 to #15 among the CCE indexes within the range, and the CCEs corresponding to the CCE indexes #16 to #(N−1) can be set to carry PDCCHs (or CCEs) used for RS (this should be received by LTE-A UEs) and PDCCHs (this should be received in common by the LTE-A UEs). In this case, the LTE-A UEs recognize a UE-specific search space to start with the CCE index #N and then perform blind decoding. The LTE Rel-8 UEs recognize a UE-specific search space to start with the CCE index #16 and then perform blind decoding. In doing so, in order to support the LTE UEs, a base station scheduler may not allocate the CCE indexes #16 to #(N−1) for the PDCCH, which is to be transmitted to the LTE UEs. In this case, a setting value of the N is set to an arbitrary value by unit of 1 CCE or can be designated as a value of multiple of 2, 4 or 8 in consideration of a CCE aggregation level.

2. Case of Using a UE-Specific Search Space

In this case, since a position of PDCCH used by a user equipment varies each subframe, a specific number of CCEs are entirely used as RS in accordance of an aggregation level but a position of a used CCE is preferably set different each subframe. For instance, as mentioned in the above description, since a position of PDCCH to be searched by each user equipment is designated to Y_K and then varies in accordance with a subframe index k, allocation of CCE is preferably set to a value corresponding to a specific user equipment ID. And, the number of CCEs to be used therein can be defined as a multiple of one of available values of an aggregation level. In particular, if the number of RS needs not to be great, it is able to allocate CCE in a manner of setting the number of CCE to be used to 1 and designating a specific user equipment ID. If the number of RS needs to be great, it is able to use CCEs in a manner of setting the number of CCEs to be used to a multiple of one of available values of an aggregation level greater than 1. In this case, for an actual position of a used CCE, a CCE contiguous to a first or last CCE in a corresponding search space is used or a CCE is selected in every equal interval from a corresponding search space. When RS resources are actually allocated, it is able to designate CCE using at least one multiple IDs and aggregation level instead of selecting CCEs corresponding to a specific ID. For instance, if an aggregation level is not determined yet, it is able to make a CCE reservation with arrangement of aggregation level and user equipment combination. If an aggregation level is already determined, it is able to make a CCE reservation with user equipment ID combination only. Thus, if a reservation is made using several user equipment IDs, the reduction of a search space to be experienced by a specific user equipment is dispersed. Hence, if an ID is actually assigned to a user equipment, it is advantageous in preventing the corresponding number from being decremented. And, it is advantageous in using all user equipment IDs.

As mentioned in the above description, if CCE is allocated based on a search space, in order to prevent a user equipment from increasing a count of performing blind decoding unnecessarily, CCE(s) to be used can be set to be situated at a last part of a UE-specific search space or can be set to be situated by starting with CCE index #16 that is a start point of a UE search space. Alternatively, if CCE(s) to be used is situated in a common search space, it can be set to be situated at a last part of a corresponding search space or in a manner of starting with CCE index #0 that is a start point of a UE search space. For instance, in case of a common search space, if a CCE (L=4) is dedicatedly used as an RS resource, a preferable space in using CCE can appropriately use logical CCE indexes #12~#15 (0 base). Yet, as a method of allocating a CCE as an RS resource, it is unnecessary to use a last one of CCEs in a search space. Specifically, in case of 'UE specific', one UE CCE overlaps with a CCE search space of another UE and its start position is randomly set. Hence, even if a position of a specific CCE is allocated as an RS resource, there exists no gain. Namely, unlike the above scheme, in case of a UE-specific search space, it is able to randomly set a CCE index position that is not the first or the last.

In LTE Rel-8, CCE of PDCCH is spread on a whole band or a partial frequency band using a block interleaver. If CCE is spread on a whole band, three cases can be taken into consideration. First of all, CCE can be allocated to a whole band within each component carrier. Secondly, CCE can be allocated to a whole band including all component carriers. Thirdly, CCE can be allocated through spreading on component carriers in part. If CCE is spread on a partial frequency band, it is able to consider allocation to a partial band within each component carrier. Using specific CCE as RSs for antennas #4 to #7 by reserving the specific CCE in each component carrier to measure a channel state of a whole band or a partial frequency band, it is able to perform channel state measurement of 8 transmitting antennas by maintaining backward compatibility with legacy LTE Rel-8.

Moreover, all CCEs or REGs within a region of a prescribe component carrier allocated for PDCCH can be used for RS. Considering that PHICH resource is allocated to each region of a system band divided into three equal parts in each component carrier, it is able to send RS to a whole band of a specific component carrier using PHICH of the specific component carrier.

Figure 10:
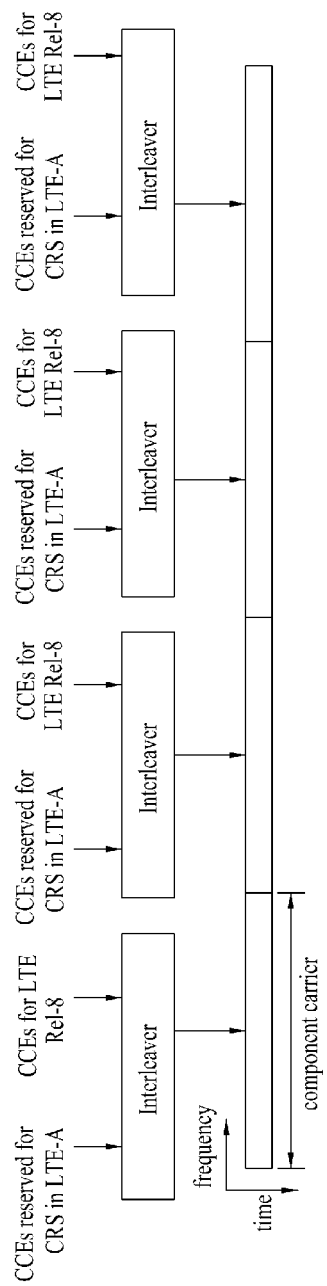
FIG. 10 exemplarily shows a method of spreading and allocating RS within a component carrier.

FIG. 10 exemplarily shows a method of spreading and allocating RS within a component carrier. In particular, FIG. 10 relates to an implementation example of a first method of allocating CCEs by spreading them on a whole band.

Referring to FIG. 10, CCEs for RSs for antennas #4 to #7 are reserved in each component carrier. RS can be spread and allocated within each component carrier in a manner that a block interleaver defined for each component carrier processes CCEs reserved for LTE-A or CCEs for LTE Rel-8.

Figure 11:
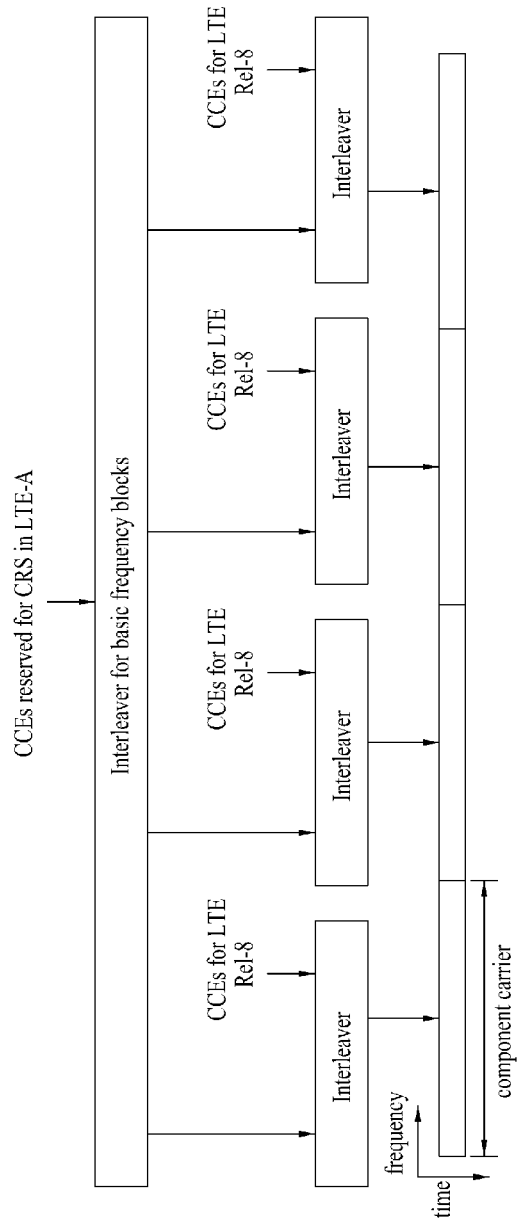
FIG. 11 exemplarily shows a method of spreading and allocating RS to all component carriers.

FIG. 11 exemplarily shows a method of spreading and allocating RS to all component carriers. In particular, FIG. 11 relates to an implementation example of a second method of allocating CCEs by spreading them on a whole band.

Referring to FIG. 11, CCEs for RSs for antennas #4 to #7 are reserved in an upper stage of component carriers in advance and are then spread on a whole band. Thereafter, RS can be spread and allocated to whole component carriers in a manner that a block interleaver defined for each component carrier processes CCEs reserved for LTE-A or CCEs for LTE Rel-8.

Figure 12:
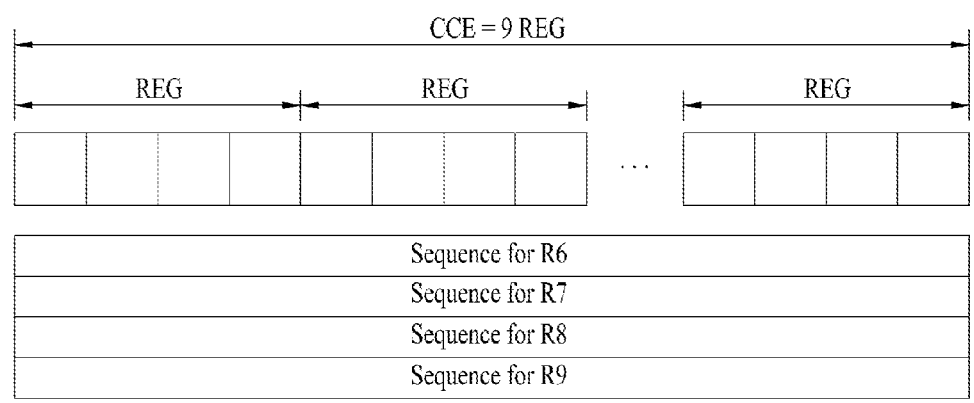
FIG. 12 and FIG. 13 show examples of allocating RSs for antennas #4 to #7 to CCE.
Figure 13:
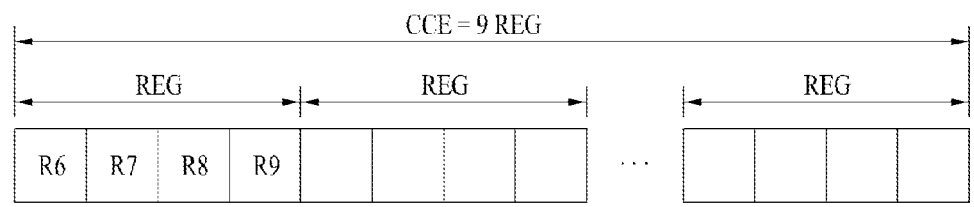

FIG. 12 and FIG. 13 show examples of allocating RSs for antennas #4 to #7 to CCEs.

In case that CCEs are reserved for RS, it is able to transmit RS using the reserved CCEs in part instead of using them all. If interference suppression is required (e.g., CoMP or inter-cell interference), contiguous CCEs can be allocated as an RS resource. And, a configuration of an RS sequence can be achieved through CDM across several subcarriers above the corresponding CCE resource. FIG. 12/13 shows an example of a method of transmitting an RS for CCE through CDM/FDM. FIG. 12 shows a case of a transmission by spreading a sequence on at least one REG in case of CCE allocation. FIG. 13 shows a case that a subcarrier of CCE is utilized as each RS resource. Irrespective of a multiplexing scheme, subcarriers used as each RS resource can be utilized as RS for the same layer/codeword/rank/antenna and the like and can overlap with each other. Although REGs configuring PHICH are depicted as contiguous to each other in the drawing for convenience, the respective REGs can be allocated by being spread within a system band.

In a situation in consideration of multi-carrier, a transmission periodicity of information on a channel state of downlink per component carrier and in accordance with a transmitting antenna can be adjusted by a subframe unit. Therefore, a transmission periodicity of RS for antennas #4 to #7 can include a multiple of N (≥1) [ms]. For instance, a transmission periodicity of RS can include one of a multiple of 1 ms, a multiple of 2 ms, a multiple of 5 ms, a multiple of 10 ms, a multiple of 20 ms and the like.

Figure 14:
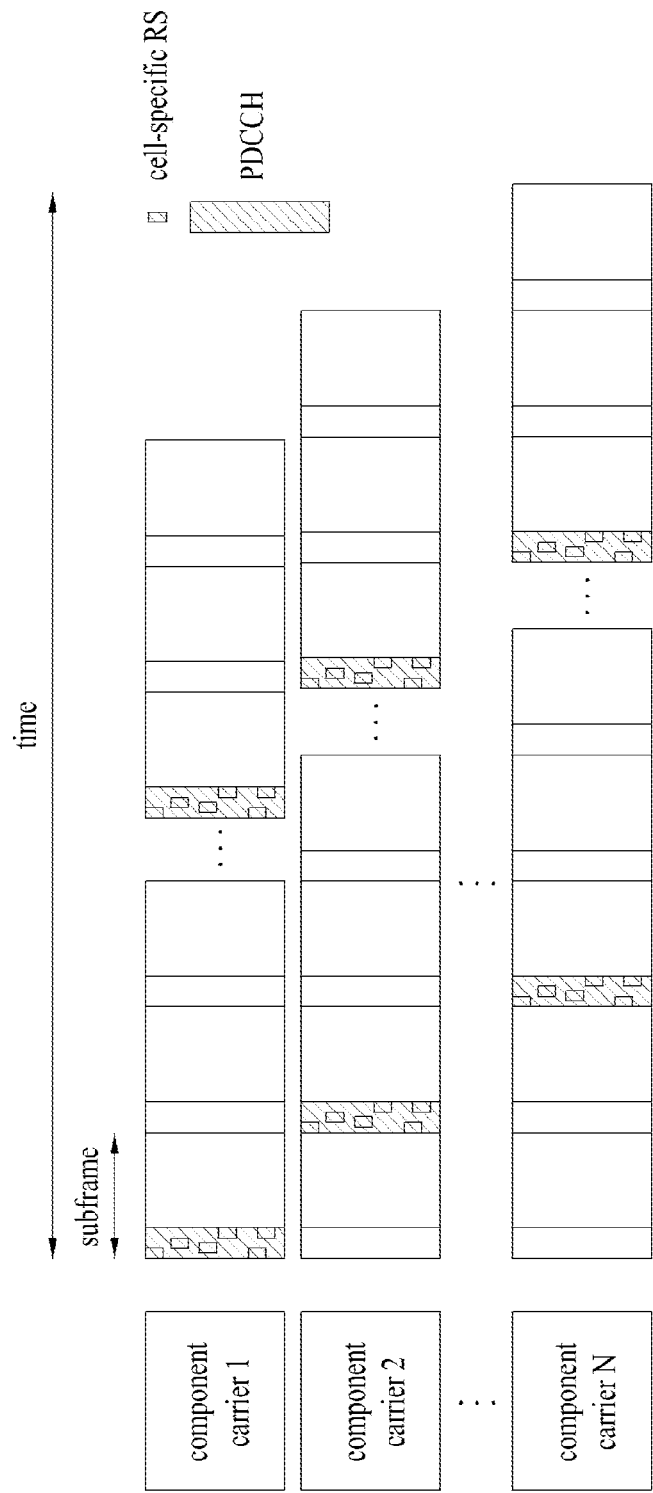
FIG. 14 exemplarily shows a method of allocating RSs for antennas #4 to #7 to component carriers by TDM, FDM or CDM.

FIG. 14 exemplarily shows a method of allocating RS to component carriers by TDM (time division multiplexing).

Referring to FIG. 14, RS for antennas #4 to #7, which is transmitted via reserved CCE of PDCCH, is transmitted per component carrier by a subframe unit or unit of more subframes. Meanwhile, a different time offset is applied between component carriers. In this case, the time offset can be given by an OFDM symbol unit or a subframe unit. Preferably, the time offset can be given by the subframe unit. In particular, an addition RS is carried on each component carrier with a fixed periodicity and is transmitted by TDM scheme using a time offset between component carriers. In this case, it is able to prevent an RS overhead from increasing linearly in proportion to the number of the component carriers.

When the RS for the antennas #4 to #7 is additionally allocated to each component, it is able to consider inter-subframe hopping. By measuring a channel state of a partial frequency band in a single frame in a manner of performing hopping to a different band per subframe index or component carrier index, it is able to perform channel quality measurement on a channel of a frequency band of a whole band can be performed under predetermined periodicity.

Figure 15:
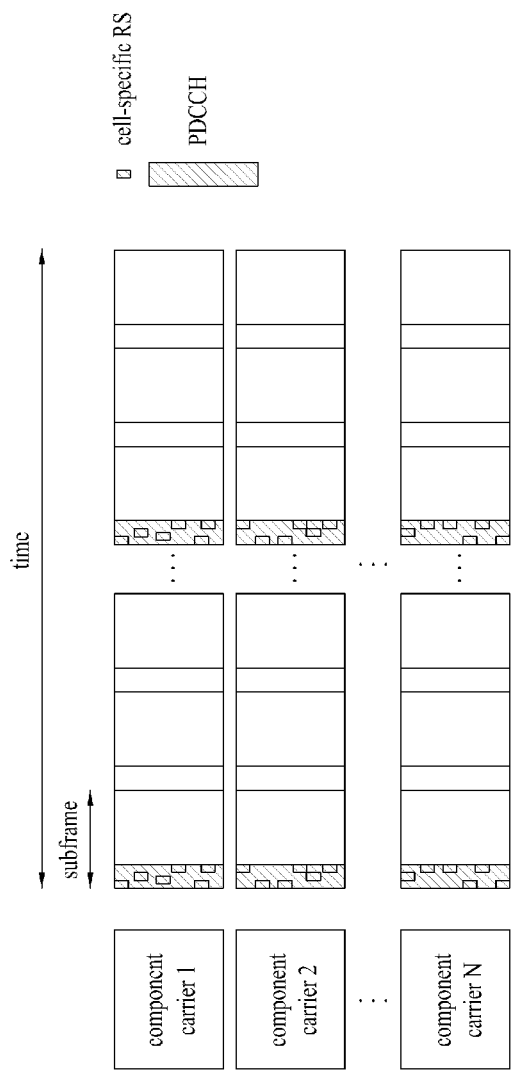
FIG. 15 and FIG. 16 exemplarily show methods of allocating RS to component carriers.

FIG. 15 exemplarily shows a method of allocating RS to component carriers by FDM (frequency division multiplexing).

Referring to FIG. 15, in order to enable multiplexing per component carrier, RSs for antennas #4 to #7 can be allocated to different frequency positions by FDM between component carriers. By assigning identifiable CCE indexes to the component carriers, respectively, the RS can be allocated to each of the component carriers by FDM. Moreover, by differentiating subframe indexes or CCE indexes reserved to allocate the RSs for the antennas #4 to #7 per slot from each other, it is able to perform multiplexing by FDM in a different form.

If the number of CCEs reserved for allocation is limited, RS can be sent in a manner of adjusting overhead per component carrier. In particular, RS density is raised by allocating more CCEs to a specific component carrier, while RS density of another specific component is lowered. The reserved CCE is allocated to each component carrier to maintain a low RS density on a predetermined level in addition and the additionally reserved CCEs can be allocated to the specific component carrier in form of hybrid TDM and FDM to change positions of OFDM symbol and subcarrier within PDCCH in accordance with an index of each subframe. In case that RSs are arranged to each component carrier with a predetermined periodicity, as shown in FIG. 14 or FIG. 15, additional RSs can be inserted in a position (except a position where the allocated RS appears with a high density or a density predetermined by a system) to have lower or higher density through signaling by the system in addition. In this case, it is advantageous in reducing performance degradation of a system by Doppler effect that is a channel variation in time domain. Moreover, RS resources used by antennas can be swapped in-between and the corresponding pattern can depend on a subframe or slot.

Figure 16:
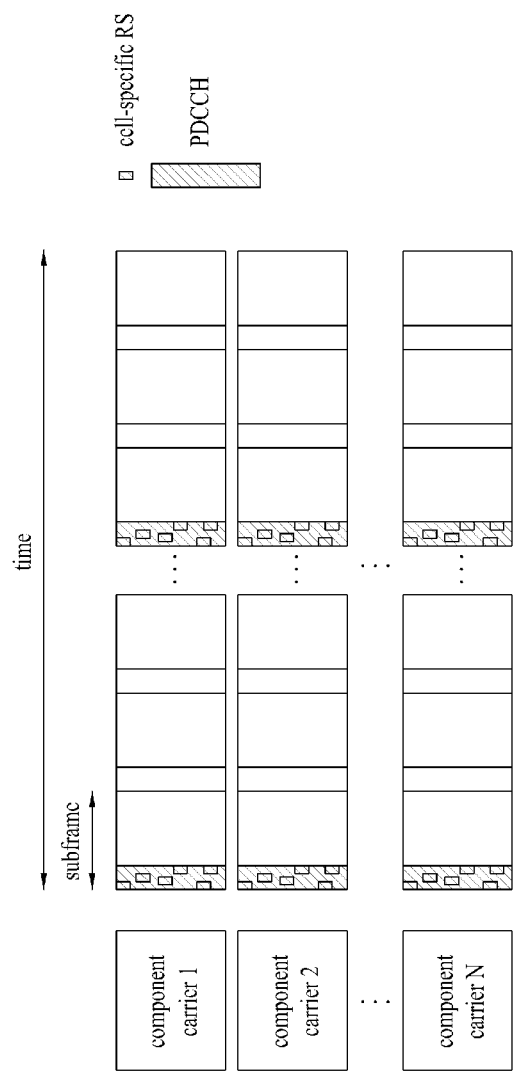

FIG. 16 exemplarily shows a method of allocating RS to component carriers at the same time and frequency positions by CDM (code division multiplexing).

Referring to FIG. 16, RSs for antennas #4 to #7 are allocated to the same time and subcarrier position within a component carrier band per component carrier and a different sequence is used in accordance with a component carrier index. A position of an RS sequence overlapping resource by CDM can occur across a whole band. And, a position of an RS sequence overlapping resource by CDM occurs per partial unit (e.g., RB unit, REG unit, etc.), whereby a channel estimation unit of a coherence BW can be proposed. This case is characterized in reducing a disadvantage that a channel of a broad band should be estimated in case of a narrow bandwidth of received data. In this case, a sequence form is divided into a basic sequence for identifying antennas and a cell-specific sequence for configuring a whole band to configure a whole RS sequence. When component carriers are configured in a manner of being contiguous with each other, if the same sequence is simply repeated among the component carriers, it may be disadvantageous in that PAPR/CM increases. Yet, if a SCM scheme is applied, it is able to overcome the PAPR increasing problem. A sequence available for the present embodiment includes an orthogonal sequence or a sequence having a low cross-correlation value, by which the present embodiment is non-limited. And, the sequence can include one of PN (Pseudo random Noise) sequence, Zadoff-Chu sequence of CAZAC (Constant Amplitude Zero Auto-Correlation) series, GCL (Generalized Chirp-Like) sequence and the like.

For instance, RS of antennas #4 to #7 is allocated to the same positions of OFDM symbol and subcarrier per antenna irrespective of an index of a component carrier but a different sequence is applied to the RS per component carrier, whereby a low PAPR/CM property can be obtained. For another instance, RS of antennas #4 to #7 is allocated to the same positions of OFDM symbol and subcarrier per antenna irrespective of an index of a component carrier, CAZAC sequence is allocated to the RS of a prescribed component subcarrier and a different cyclic shift of the CAZAC sequence can be allocated to the RS of another component subcarrier. Thus, by differentiating a sequence of the RS per component carrier, the low PAPR/CM property can be obtained. Moreover, in order to solve a problem that PAPR/CM increases due to repetition using the same sequence for each component carrier per antenna in case of allocating the RSs for antennas #4 to #7, phase modulation (i.e., modulation of −1 or +1 on each component carrier or RS part) is performed on a subframe carried by a specific component carrier or the aforesaid RSs for the antennas #4 to #7.

The following case can be taken into consideration as one embodiment.

First of all, if N=3 and if P(b) to be modulated is binary, it can be p(0)=1, p(1)=1, and p(2)=−1. If N=4 and if p(n) to be modulated is binary, it can be p(0)=1, p(1)=1, p(2)=1, and p(3)=−1. If N=5 and if p(n) to be modulated is binary, it can be p(0)=1, p(1)=1, p(2)=1, p(3)=−1, and p(4)=1. In this case, the N means the number of component carriers and the p(n) means phase modulation applied to a subframe carried on a specific component carrier or RSs for antennas #4 to #7.

In the following description, a method of multiplexing RS within each component is exemplarily explained.

Figure 17:
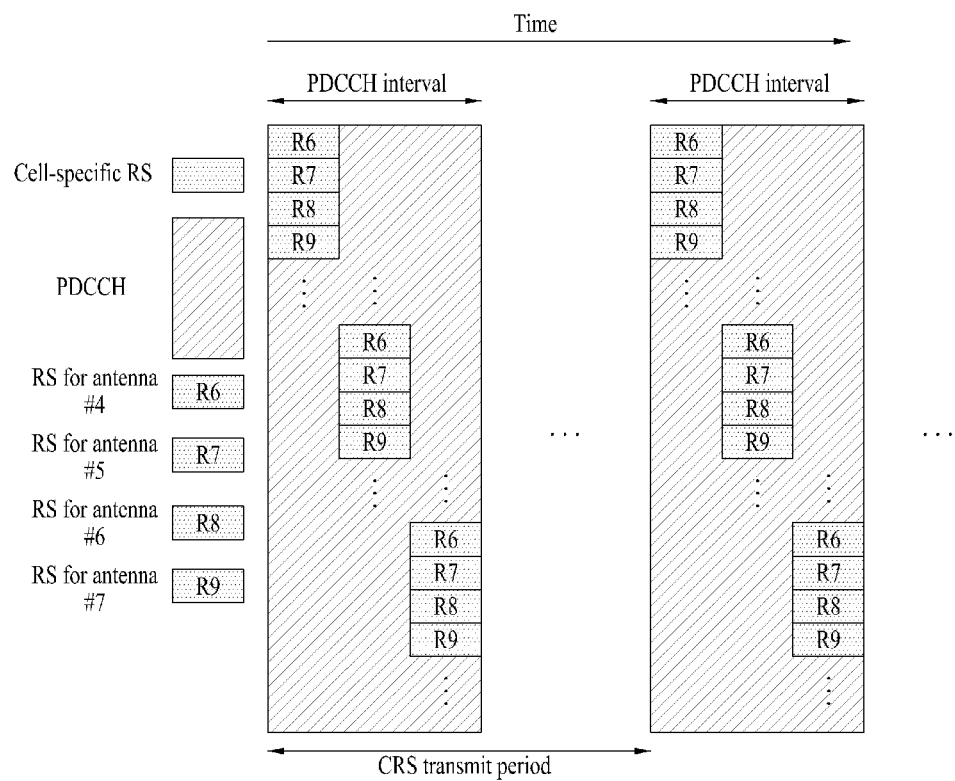
FIGS. 17 to 21 exemplarily show a method of multiplexing RSs for antennas #4 to #7 within a single component carrier by TDM, FDM or CDM.

FIG. 17 exemplarily shows a method of multiplexing RSs for antennas #4 to #7 within a single component carrier by FDM scheme.

Referring to FIG. 17, by allocating RSs for antennas #4 to #7 to different CCEs within a subframe for inter-antenna orthogonality, it is able to allocate the RS by FDM. FIG. 17 depicts the RSs for the antennas #4 to #7 as localized to further facilitate the description of FDM between antenna ports for example. Alternatively, RSs for different antennas can be allocated as distributed or staggered within a predetermined band. Moreover, although the number of OFDM symbols configuring PDCCH is assumed as 3, it is able to allocate the RSs for the antennas #4 to #7 by applying the same concept to the case of configuring PDCCH with at most 2 OFDM symbols or at least 4 OFDM symbols.

Figure 18:
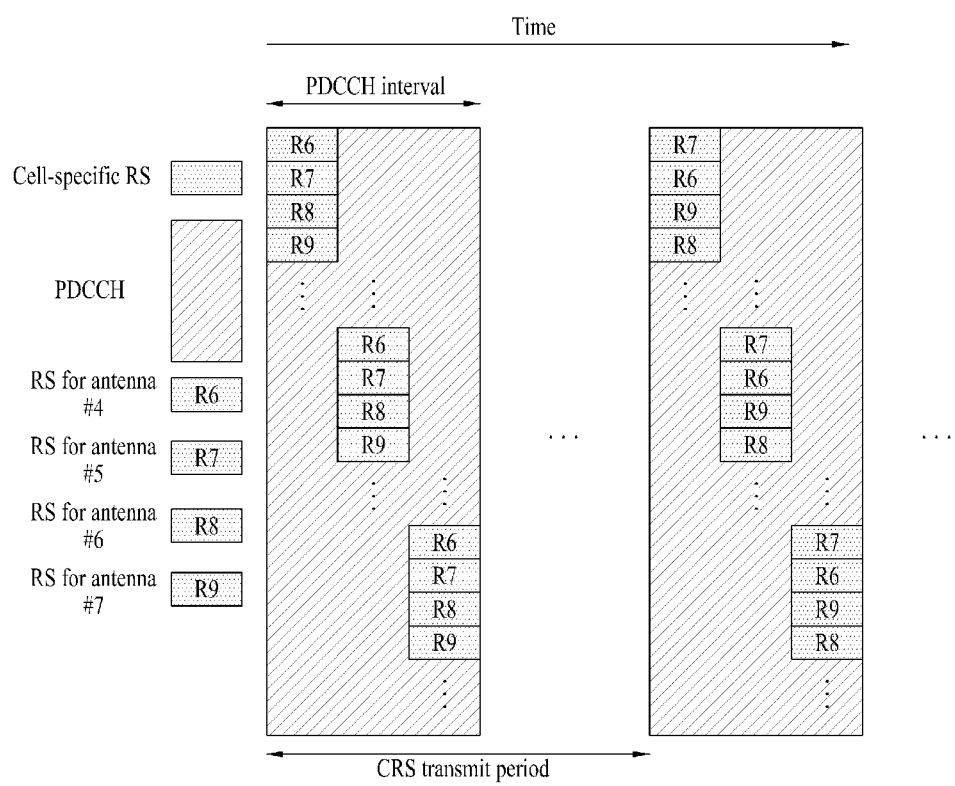

FIG. 18 exemplarily shows a method of multiplexing RSs for antennas #4 to #7 within a single component carrier by FDM scheme.

Referring to FIG. 18, by allocating RSs for antennas #4 to #7 to different CCEs within a subframe for inter-antenna orthogonality, the RS is allocated by FDM. And, swapping can be performed between different antennas. To further facilitate the description of the swapping among the antenna ports #6 to #9 with reference to FIG. 18, allocation is performed in a manner of paring <antenna port #6 and antenna port #7> together and padding <antenna port #8 and antenna port #9> together. Yet, the present concept is applicable to swapping cases of the antenna ports #6 to #9 by parings of any types. Moreover, it is able to consider a method of configuring symbols for the same antenna in contiguous resource units contiguously. For instance, regarding R6, R7, R8 and R9 in FIG. 18, the R6 uses first four, the R7 uses next four, and each of the R8 and the R9 occupies contiguous subcarriers in the same manner. In this case, RS blocks of the R6, R7, R8 and R9 can have configuration interlaced in-between.

Figure 19:
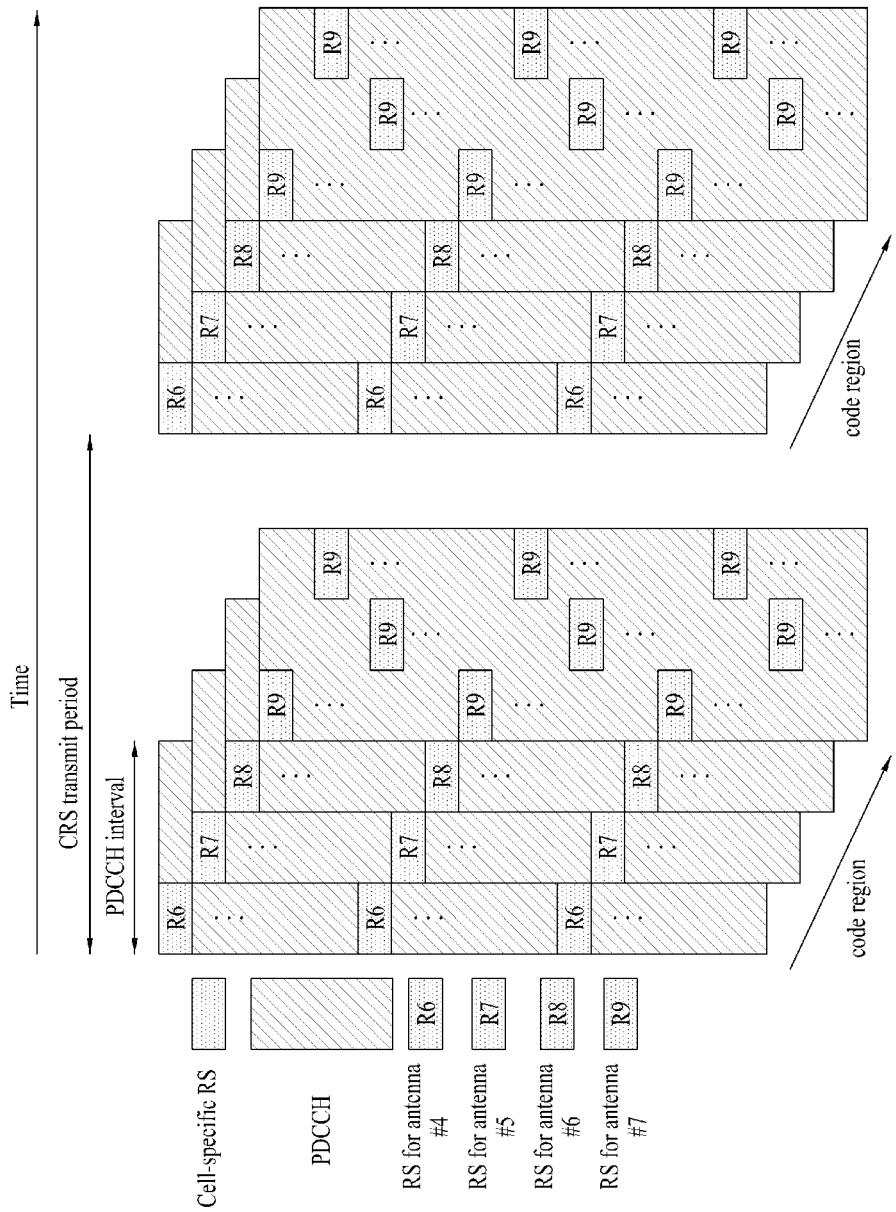

FIG. 19 exemplarily shows a method of multiplexing RSs for antennas #4 to #7 within a single component carrier by CDM scheme.

Referring to FIG. 19, RSs for antennas #4 to #7 allocated to PDCCH are allocated to the same CCEs irrespective of antenna but can be multiplexed by CDM scheme using different sequences for inter-antenna orthogonality. A sequence available for the present embodiment includes an orthogonal sequence or a sequence having a low cross-correlation value, by which the present embodiment is non-limited. And, the sequence can include one of PN (Pseudo random Noise) sequence, Zadoff-Chu sequence of CAZAC (Constant Amplitude Zero Auto-Correlation) series, GCL (Generalized Chirp-Like) sequence and the like.

For instance, the same OFDM symbol and subcarrier are allocated to the RSs of the antennas #4 to #7 per antenna within each component carrier and different orthogonal sequences are usable. For another instance, CAZAC sequence is used for the RSs for the antennas #4 to #7 but CAZAC sequence having a different cyclic shift is used for each antenna. Hence, orthogonal property can be given between the RSs of the antennas.

Figure 20:
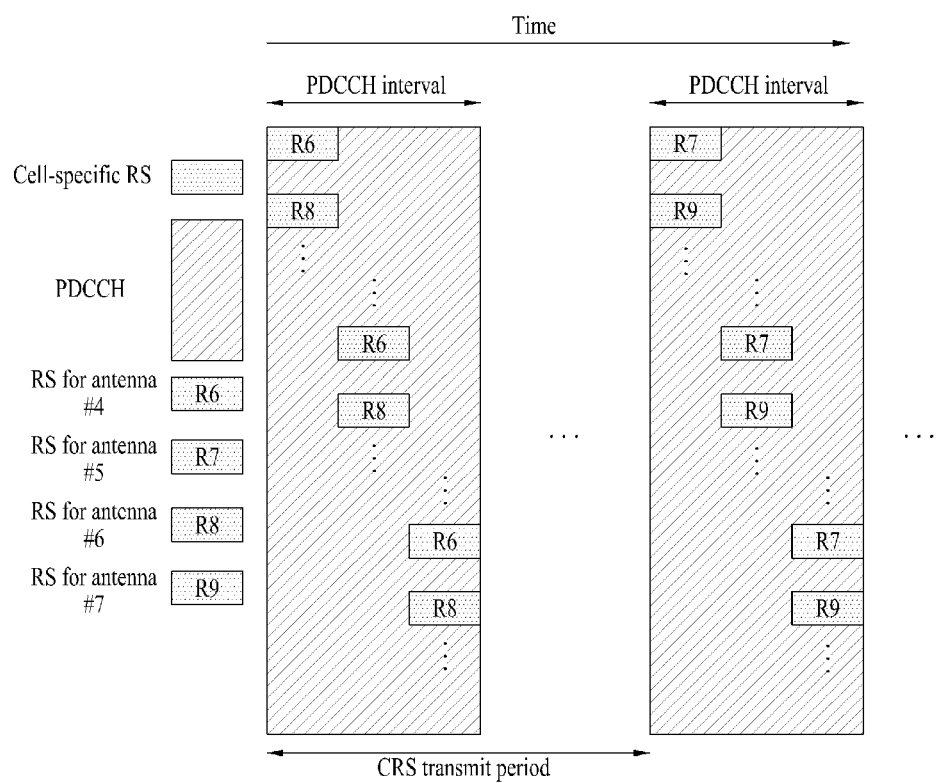

FIG. 20 exemplarily shows a method of multiplexing RSs for antennas #4 to #7 within a single component carrier by TDM scheme.

Referring to FIG. 20, RSs for antennas #4 to #7 are allocated to the same CCEs each subframe within the same component carrier and TDM can be performed between different antennas. In the drawing, <R6 and R8> and <R7 and R9> are multiplexed in different subframes by TDM scheme, respectively and the RS allocated within the same subframe is multiplexed per antenna by FDM scheme. This is an example for convenience of description, by which the present invention is non-limited. For instance, the number of per-antenna RS allocated within a single subframe is 1 or 3 and antenna port numbers of RSs allocated within the same subframe together can be combined in various ways.

Figure 21:
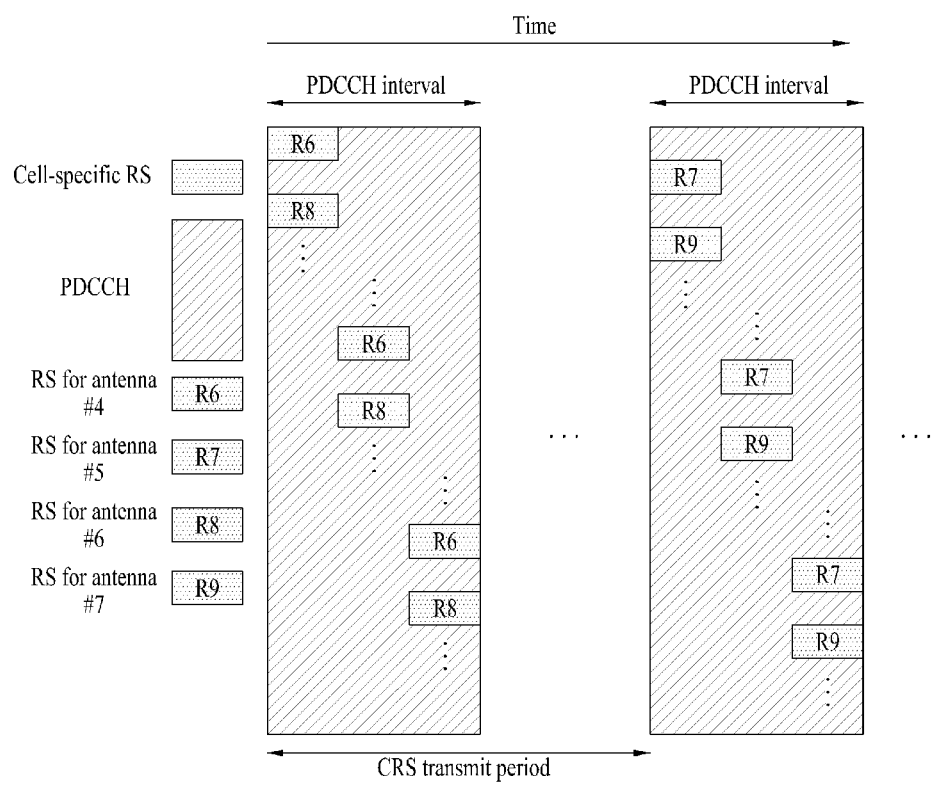

FIG. 21 exemplarily shows another method of multiplexing RSs for antennas #4 to #7 within a single component carrier by TDM scheme.

Referring to FIG. 21, TDM can be performed on RSs for antennas #4 to #7 among different antennas by allocating different CCEs per subframe. Thus, the RSs for the antennas #4 to #7 can be configured within a single component carrier in a manner of being multiplexed by TDM and FDM schemes together.

The methods proposed in FIG. 20 and FIG. 21 relate to the method of using TDM among subframes. This is for clarity of the description, by which the present invention is non-limited. For instance, the RSs for the antennas #4 to #7 can be multiplexed by TDM within OFDM symbols the PDCCH can have within a single frame. Moreover, TDM configuration for transmitting RS for a single antenna in a single periodicity for transmitting RS is possible.

A method of multiplexing RSs for antennas #4 to #7 can be taken into consideration in addition. For instance, CCEs previously reserved for the antenna #4 and the antenna #5 are allocated in a first subframe, CCEs previously reserved for the antenna #6 and the antenna #7 are allocated in a second subframe, and CCEs can be allocated alternately for antennas #4 to #8 by a subframe unit. Moreover, by giving an offset per component carrier, it is able to design antenna allocations different among component carriers. For instance, subframes are alternately allocated to a first component carrier in order of antenna #4, antenna #5, antenna #6 and antenna #7, subframes are alternately allocated to a second component carrier in order of antenna #5, antenna #6, antenna #7 and antenna #4, subframes are alternately allocated to a third component carrier in order of antenna #6, antenna #7, antenna #4 and antenna #5, and subframes are alternately allocated to a fourth component carrier in order of antenna #7, antenna #4, antenna #5 and antenna #6, Detailed Example 2

Transmission of RS Using PHICH

Using specific PHICH for CRSS for antennas #4 to #7 by reserving the specific PHICH in each component carrier to measure a channel state of a whole band or a partial frequency band, it is able to perform channel state measurement of 8 transmitting antennas by maintaining backward compatibility with legacy LTE Rel-8.

In LTE Rel-8, PHICH resource is determined by an index pair $(n_{PHICH}^{group}, n_{PHICH}^{seq})$, $n_{PHICH}^{group}$ is a PHICH group number, and $n_{PHICH}^{seq}$ indicates an orthogonal sequence index within a PHICH group. In this case, the PHICH group is a transmission unit for sending ACK/NACK and includes 3 REGs spaced apart from each other. In the frame structure type 1 of LTE Rel-8, the number of PHICH groups is constant in every subframe and is determined by the following formula.

$$N_{PHICH}^{group} = \begin{cases} \lceil N_g(d_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Formula 3]}$$

In Formula 3, $N_g \in \{1/6, 1/2, 1/2\}$ is indicated by a higher layer and $N_{RB}^{DL}$ indicates the number of resource blocks within a subframe.

The number of the PHICH groups is settable to 1/4~1/48 of total resource blocks in accordance with a value of $N_g$. An index of the PHICH group used by each user equipment is indicated as a combination of an index value of a resource, in which allocation information received by a corresponding user equipment is included, and RS in uplink.

Even if the allocation information is received via a specific same resource, a base station enables a used PHICH resource to be discriminated in a manner of designating a random RS to discriminate resources. Such relation is defined as the following formula.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (I_{PRB\_RA}^{lowest\_index}/N_{PHICH}^{group} + n_{DMRS}) \bmod 2 N_{SF}^{PHICH} \quad \text{[Formula 4]}$$

In this case, $n_{DMRS}$ is mapped to a cyclic shift for DMRS (demodulation reference signal), $N_{SF}^{PHICH}$ is a spreading factor size for PHICH modulation, $I_{PRB\_RA}^{lowest\_index}$ indicates a smallest PRB index in uplink resource allocation, $N_{PHICH}^{group}$ is the number of PHICH groups, and $I_{PHICH}$ indicates the following.

$$I_{PHICH} = \begin{cases} 1 & \text{for TDD UL/DL configuration 0 with} \\ & \text{PUSCH transmission in subframe } n = 4 \text{ or } 9 \\ 0 & \text{otherwise} \end{cases} \quad \text{[Formula 5]}$$

Hence, in order to dedicate a specific PHICH resource as an RS resource, a base station is able to control a corresponding resource not to be used by a user equipment by instructing a location, to which allocation information for enabling a specific PHICH group not to be used is sent, and an RS. In particular, when $N_{PHICH}^{group}$ and $I_{PHICH}$ are previously set in Formula 4 relating to the PHICH group index allocation, $I_{PRB\_RA}^{lowest\_index}$ and $n_{DMRS}$ have degrees of freedom a base station scheduler can randomly designate. Therefore, the base station scheduler is able to randomly set the $I_{PRB\_RA}^{lowest\_index}$ and $n_{DMRS}$ for the purpose of adjusting a value of $I_{PRB\_RA}^{lowest\_index} + n_{DMRS}$ to enable PHICH group indexes used for RS not to be designated. Therefore, in case of a previous legacy user equipment, since a corresponding matter is not recognizable at all and no influence is put on an operation, compatibility can be maintained. On the contrary, in case of a user equipment having a new function, a corresponding matter should be recognized. Therefore, a base station should perform indication on a PHICH resource allocated as an RS resource. For this, the base station is able to announce what kinds of PHICH groups are reserved as RS resources through broadcast information (i.e., system information) in order to announce the corresponding PHICH information. For instance, the broadcast information can be performed using the following structure.

1. Indexes of PHICH group to be used as RS are directly announced. In this case, the index of the PHICH resource used as the RS is directly announced as a series. For instance, enumeration of a corresponding index can be announced. For another instance, the announcement can be made using a start position (i.e., offset) of an index reserved for an RS and a period of appearing indexes used as the RS. For another instance, the announcement can be made using a start position of an index reserved for RS and a delta offset for values at which next positions appear. For further instance, the announcement can be made one by one simply using an index reserved for RS.

2. PHICH group to be used as RS is announced indirectly. In this case, a base station and a user equipment recognize a PHICH group set previously determined in-between as RS. In this case, index values of PHICH groups usable as RS are defined in a radio interface protocol (e.g., a corresponding definition form can have the structure shown in '1.') and the base station announces that the corresponding PHICH groups are used. For instance, in LTE-A system, if a set of a corresponding PHICH group is utilized as RS, it is able to define a bit indicating the corresponding utilization. Moreover, in case that various kinds of sets of PHICH group are defined, an index corresponding to a set of the group to use is announced. In case that a set of PHICH group is not utilized for RS, an index for a null set can be defined and announced. When an index for a set of PHICH group is defined, a definition of the corresponding set can have a structure differing in accordance with PHICH format or can have a same structure.

An announced unit in any method is a constant period (e.g., 1 TTI, 10 TTI, 40 TTI, etc.) and is facilitated to announce whether PHICH group is used as RS. If the above-mentioned configuration is actually transmitted on a broadcast channel (BCCH), a period for announcing the configuration about PHICH can have the same length of BCCH. In this case, since a user equipment, which performs an initial access (e.g., power-on, handover, etc.), is not aware of information on the PHICH related to RS, if the user equipment newly enters a cell, it is able to enter a mode in which the user equipment is unable to use the RS configuration of the corresponding cell. Therefore, a signal generation in PDCCH or PHICH should be applied from a timing point at which the user equipment starts to ensure the RS configuration. In particular, in case that a user equipment is not aware of RS information on an initial access, it generates and transmits a signal in a legacy transmission mode only. If the user equipment acquires the RS information, the signal transmission on PHICH, PDCCH or PUSCH is able to utilize TxD (capable of using an additional pilot), precoding, MIMO mode and the like. Moreover, if there is no instruction for a specific event, the same configuration can be set to keep being usable. In order for the number of PHICH groups, which are usable in making the above announcement, to enable a control channel used as allocation information to be available for all user equipments, limitation is put on the RS number. For instance, if the number of indexes usable as RS is 8, a maximum number of PHICH groups, which are picked up to be dedicatedly usable as RS, is limited to 8. Yet, if a use of a physical resource for specific allocation information is restricted, a maximum usable number can be incremented.

In LTE Rel-8, physical subcarrier resources used by PHICHs vary in accordance with a PCFICH used in a corresponding cell and a legacy RS. In particular, regarding a resource allocation order, RS is preferentially defined and REG is then defined through the rest of resources except a corresponding pilot. Using the REG as a basic unit, each control channel is allocated. The PCFICH is allocated in the first place. Four REGs are allocated to the positions defined by the following formula in a first OFDM symbol.

$z^{(p)}(0)$ is mapped to the resource-element group represented by $k=\bar{k}$ $z^{(p)}(1)$ is mapped to the resource-element group represented by $k=\bar{k}+\lfloor N_{RB}^{DL}/2 \rfloor \cdot N_{sc}^{RB}/2$ $z^{(p)}(2)$ is mapped to the resource-element group represented by $k=\bar{k}+\lfloor 2N_{RB}^{DL}/2 \rfloor \cdot N_{sc}^{RB}/2$ $z^{(p)}(3)$ is mapped to the resource-element group represented by $k=\bar{k}+\lfloor 3N_{RB}^{DL}/2 \rfloor \cdot N_{sc}^{RB}/2$ [Formula 6]

In Formula 6, $N_{RB}^{DL}$ and $N_{sc}^{RB}$ are already mentioned in the foregoing description. And, 'k' is represented by the following.

$$\bar{k}=(N_{sc}^{RB}/2)\cdot(N_{ID}^{cell} \bmod 2N_{RB}^{DL})$$ [Formula 7]

In Formula 7, $N_{ID}^{cell}$ indicates a physical layer cell ID.

According to the above formula, although a start position of PCFICH varies in accordance with a cell ID, the PCFICH is transmitted using 4 REGs on 4 equal spaces resulting from dividing a whole subcarrier of a first OFDM symbol into 4 equal parts. PHICH is then defined for the remaining REG in a following manner. First of all, REGs resulting from excluding RS and PCFICH (first OFDM symbol) from each of at least one or more OFDM symbols set by PHICH duration are divided into 3 equal parts. Secondly, PHICH group is contiguously allocated to a specific start position. In this structure, if a resource used as the PHICH is not evenly distributed on a whole band, RS may not be evenly distributed on the whole band. Hence, in order for the RS to be evenly distributed on the whole band, a scheme of incrementing the number of PHICH groups is recommended. In particular, in order to utilize PHICH as an RS resource, when the PHICH group number is determined, it is reasonable that Ng is sufficiently set to 1 or 2. In doing so, it is preferable that REGs of the PHICH group selected in consideration of positions of PCFICH and legacy RS are arranged on the system band by being equally spaced apart from each other. As a method of selecting a PHICH group index to be used for RS, it is able to consider a method of selecting the PHICH group index from PHICH logical indexes. Alternatively, as a scheme of selecting PHICH from a physical resource more equally, it may be preferable that physical REG indexes are selected in equal interval rather than logical indexes of PHICH are selected in equal interval. Considering the present proposal, although a resource index used in utilizing the aforesaid PHICH group as the RS resource may include a PHICH logical index, it is applicable in a manner of being represented by a physical index of REG. In this case, a resource usable as PHICH is automatically determined as a PHICH logical index overlapping with an index of an REG used as an RS.

PHICH reserved for an additional RS of LTE-A can be spread on a whole band or a partial frequency band using a block interleaver. If the PHICH is spread on the whole band, three kinds of cases can be taken into consideration as follows. First of all, PHICH can be allocated to a whole band within each component carrier. Secondly, PHICH can be allocated to a whole band including all component carriers. Thirdly, PHICH can be allocated by spreading among component carriers in part. If the PHICH is spread on the partial frequency band, it is able to consider allocation to a partial band within each component carrier. In this case, using specific PHICH as RSs for antennas #4 to #7 by reserving the specific PHICH in each component carrier to measure a channel state of the whole band or the partial frequency band defined herein, it is able to perform channel state measurement of 8 transmitting antennas by maintaining backward compatibility with legacy LTE Rel-8.

Figure 22:
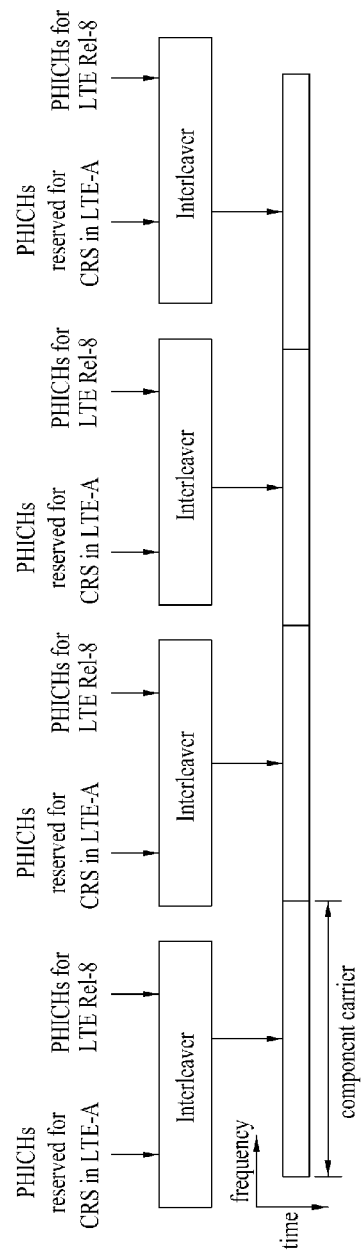
FIG. 22 exemplarily shows a method of spreading and allocating RS within a component carrier.

FIG. 22 exemplarily shows a method of spreading and allocating RS within a component carrier. In particular, FIG. 22 relates to an implementation example of a first method of allocating PHICHs by spreading them on a whole band.

Referring to FIG. 22, PHICHs for RSs for antennas #4 to #7 are reserved in each component carrier. RS can be spread and allocated within each component carrier in a manner that a block interleaver defined for each component carrier processes the PHICHs reserved for LTE-A or the PHICHs for LTE Rel-8.

Figure 23:
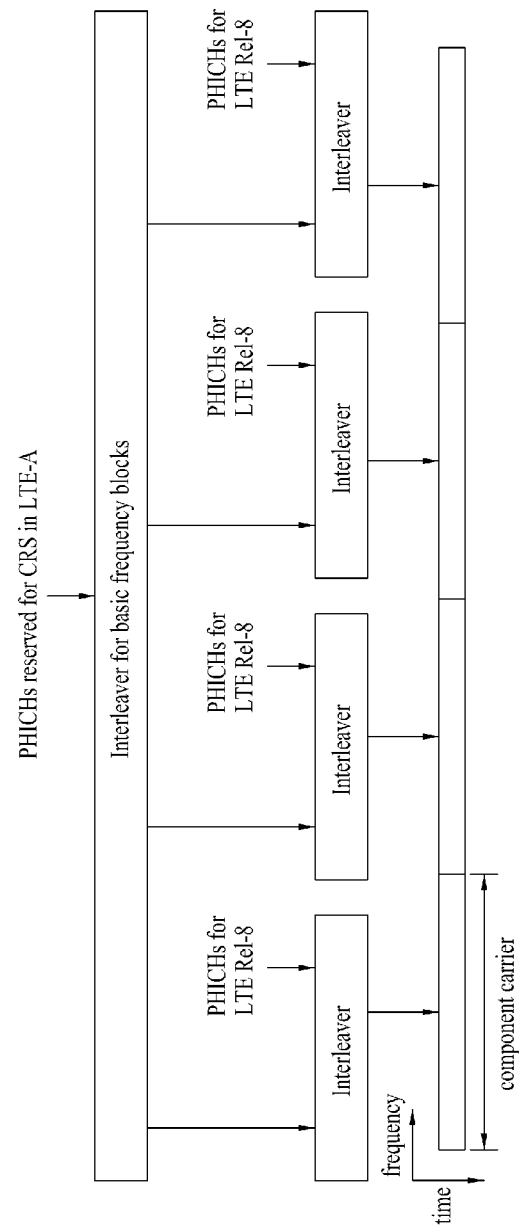
FIG. 23 exemplarily shows a method of spreading and allocating RS to all component carriers.

FIG. 23 exemplarily shows a method of spreading and allocating RS to all component carriers. In particular, FIG. 23 relates to an implementation example of a second method of allocating PHICHs by spreading them on a whole band.

Referring to FIG. 23, PHICHs for RSs for antennas #4 to #7 are reserved in an upper stage of component carriers in advance and are then spread on a whole band. Thereafter, RS can be spread and allocated to whole component carriers in a manner that a block interleaver defined for each component carrier processes PHICHs reserved for LTE-A or PHICHs for LTE Rel-8.

Figure 24:
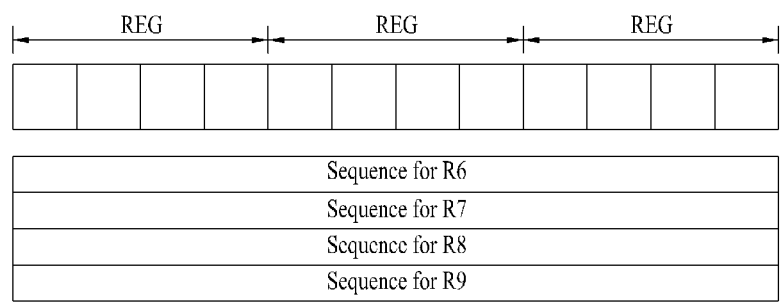
FIG. 24 and FIG. 25 show examples of allocating RSs for $4^{th}$ to $7^{th}$/antennas to PHICH.
Figure 25:
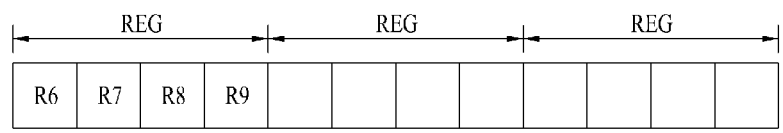

FIG. 24 and FIG. 25 show examples of allocating RSs for antennas #4 to #7 to PHICHs.

In case that PHICHs are reserved for RS, it is able to transmit the RS using the reserved PHICHs in part instead of using them all. If interference suppression is required (e.g., CoMP or inter-cell interference), contiguous PHICHs can be allocated as an RS resource. And, a configuration of an RS sequence can be achieved through CDM across several subcarriers above the corresponding PHICH resource. FIG. 24/25 shows an example of a method of transmitting an RS for PHICH through CDM/FDM. FIG. 24 shows a case of a transmission by spreading a sequence on at least one REG in case of allocating RS to PHICH. FIG. 25 shows a case that a subcarrier of PHICH is utilized as each RS resource. Irrespective of a multiplexing scheme, subcarriers used as each RS resource can be utilized as RS for the same layer/codeword/rank/antenna and the like and can overlap with each other. Although REGs configuring PHICH are depicted as contiguous to each other in the drawing for convenience, the respective REGs can be allocated by being spread within a system band.

Figure 26:
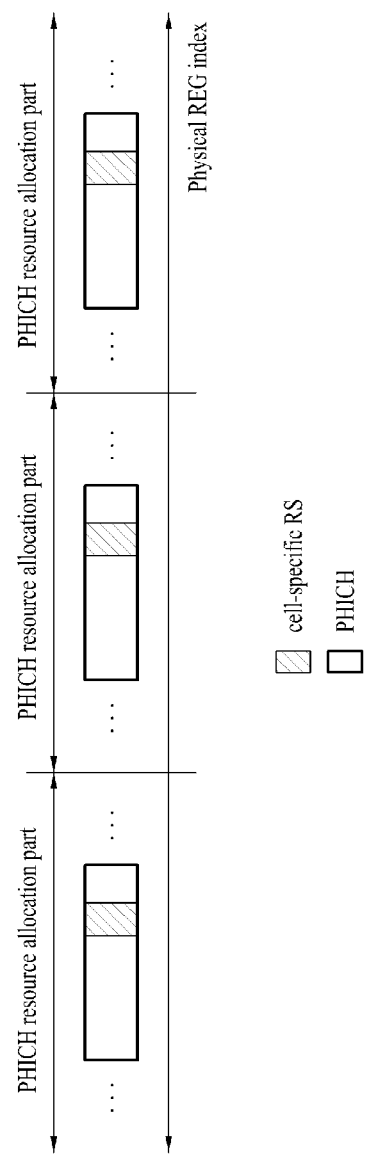
FIG. 26 and FIG. 27 show examples of transmitting RSs of antennas #4 to #7 via PHICH.

FIG. 26 shows an example of transmitting RSs of $4^{th}$ to $7^{th}$ antennas on PHICH.

Referring to FIG. 26, a system band is divided into parts in association with PHICH. Each of the 3 parts indicates a PHICH resource allocation part. And, one of 3 REGs belonging to the same PHICH group is allocated to each of the 3 parts. In the drawing, a same numeral indicates an REG belonging to a same PHUCH group. RSs for antennas #4 to #7 are allocated to a reserved one of PHICH groups. In a same manner of dispersing REGs configuring the PHIC group on the 3 PHICH resource allocation regions, an additional RS allocated PHICH group resource is distributed on each of the 3 PHICH resource allocation regions.

Figure 27:
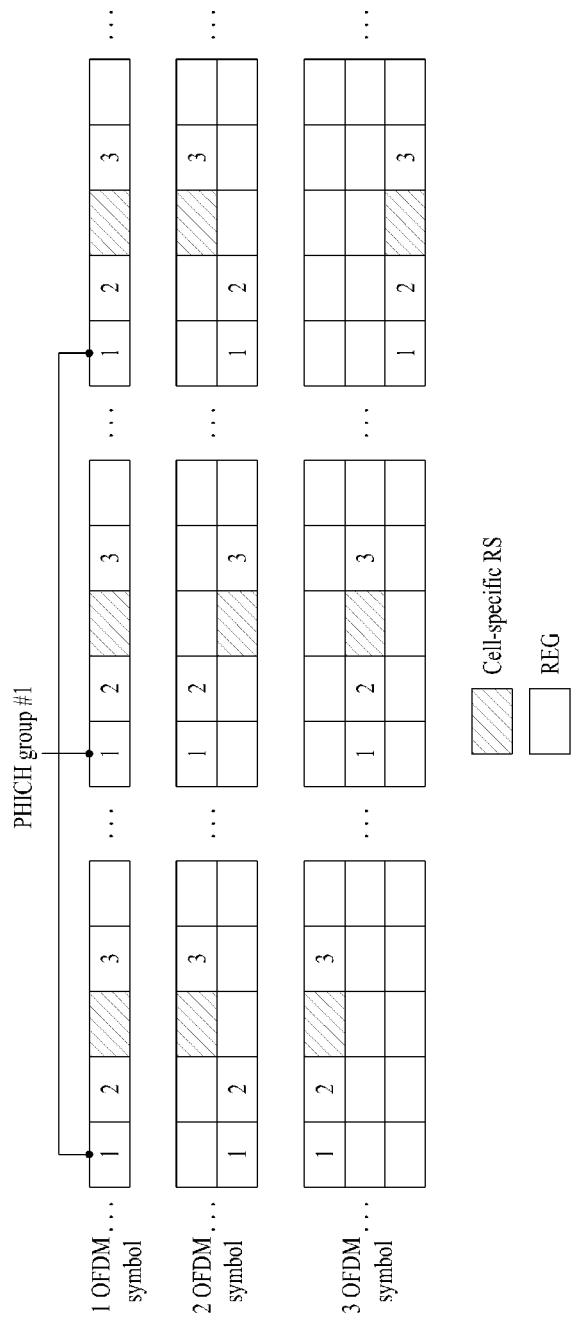

FIG. 27 shows another example of transmitting RS of antennas #4 to #7 via PHICH.

Referring to FIG. 27, as basic matters herein are identical to those of the former description with FIG. 26, details can refer to the descriptions with reference to the former drawings including FIG. 26. FIG. 27 additionally depicts a transmission of RS in viewpoint of time if duration of PHICH includes a plurality of OFDM symbols. The PHICH duration is limited by a maximum size of a control region. The PHICH duration corresponds to 1~3 OFDM symbols. In case that a plurality of OFDM symbols are used for PHICH, REG belonging to the same PHICH group is transmitted through a different OFDM symbol for transmit diversity. Likewise, RS allocated to PHICH is transmitted through a different OFDM symbol by REG unit a well.

In FIG. 26 and FIG. 27, the configuration of PHICH, RS allocation, inter-antenna RS multiplexing, RS allocation in case of multi-carrier and the like are fully explained in the foregoing descriptions and their details shall be omitted from the following description. Moreover, although FIG. 26 shows a case of one kind only for clarity and convenience of the description, the above contents described in association with PDCCH can be similarly applicable thereto. Namely, the contents exemplarily shown in association with PDCCH are equally or similarly applicable to PHICH.

Detailed Example 3

Signaling on RS of Antenna 4~7

In case that the number of transmitting antennas is extended to M (M>4) from 4, an RS related signaling method is described in detail. For clarity and convenience, a case of 'M=8' is assumed. This is just an example, by which the present invention is non-limited.

Figure 28:
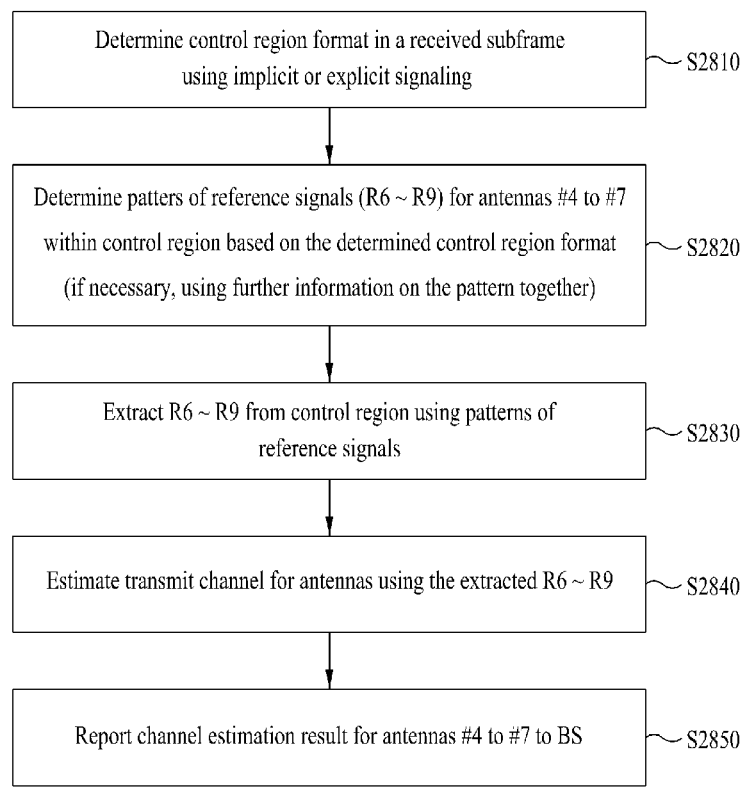
FIG. 28 is a flowchart for performing signaling on RSs of antennas #4 to #7.

FIG. 28 is a flowchart for performing signaling on RSs of antennas #4 to #7.

Referring to FIG. 28, a user equipment determines a format for L1/L2 control region within a received subframe [S2810]. In this case, the control region format can be performed by implicit signaling or explicit signaling. For one example, a control region format can be determined for a specific subframe in advance. A control region format can be instructed via a broadcasting channel. A control region format can be instructed via PCFICH. And, a control region format can be indirectly instructed through information related to PHICH. Once the control region format is confirmed, the user equipment determines RS patterns for antennas #4 to #7 based on the control region format [S2820]. The RS patterns for the antennas #4 to #7 are predetermined or can be semi-predetermined. Therefore, the user equipment determines the RS patterns for the antennas #4 to #7 using additional information if necessary. In this case, the additional information is signaled together with the information on the control region format or can be separately signaled. Once the RS patterns are determined, the user equipment extracts the RS patterns for the antennas #4 to #7 from the control region of the received subframe [S2830] and then estimates transport channels from the antennas #4 to #7 using the extracted RSs [S2840]. Thereafter, the user equipment transmits a channel estimation result for the antennas #4 to #7 to a base station [S2850]. In this case, the channel estimation result includes channel quality information (channel quality indicator: CQI) or CSI (channel state information), by which the present invention is non-limited.

The flowchart shown in FIG. 28 is exemplarily focused on the RSs for the antennas #4 to #7. Actually, the user equipment performs the channel estimation by receiving RSs for antennas #0 to #3 as well. Although the RSs for the antennas #0 to #3 and the RSs for the antennas #4 to #7 are separately used in performing the channel estimation, they can be used by being combined together to enhance channel estimation performance if necessary. Although FIG. 28 is described in viewpoint of the user equipment for clarity of description, a counter process is performed by the base station in a same manner. In the following description, signaling in association with RSs of antennas #4 to #7 is exemplarily explained in detail.

A. Method of Finding Out RSs for Antennas #4 to #7

In the LTE-A system adopting MIMO using 8 transmitting antennas, it is not necessary for RSs for antennas #4 to #7 to be transmitted in all subframes. Therefore, a user equipment needs to be aware of a position of a subframe in which the RSs for the antennas #4 to #7 exist. Unless mentioned specially, an additional RS means an RS for one of the antennas #4 to #7. In case that an additional RS existing subframe is static, since an additional RS is fixedly allocated to a specific subframe (e.g., $M^{th}$ subframe) of a radio frame, signaling is unnecessary. Although an additional RS is statically allocated to a subframe, if a position of an RS existing subframe is changed into $L^{th}$ subframe from $M^{th}$ subframe with a long radio frame period N (>>1), such a change information should be transmitted through system information. In case that an additional RS existing subframe is semi-static, an additional RS can be allocated to $M^{th}$ subframe with a constant radio frame period N (N>1) through the system information. And, a period for maintaining a position of the corresponding subframe can be indicated via configuration information. In case that an additional RS existing subframe is dynamically allocated, a position of a subframe can be indicated via the system information each radio frame. A position of an additional RS existing subframe is indicated using a bitmap for a radio frame or binary information on a position and period of a subframe.

Even if a user equipment is aware of a position of a subframe carrying an addition RS, a detailed information on a position, in which the additional RS exists, is necessary. As the position of the additional RS should be compatible with Rel-8, it is dependent on a PCFICH value. Hence, an approach method can vary in accordance with whether the PCFICH value needs to be checked.

A-1) Method of Recognizing RS Independently from PCIFCH

When LTE-A base station transmits an additional RS for MIMO scheme [e.g., spatial multiplexing (SM), transmit diversity (TxD), precoding, beamforming, etc.], in order to secure backward compatibility with LTE Rel-8, it is proposed that Nc OFDM symbols (e.g., 3 OFDM symbols in Rel-8) on a time axis, which is a maximum size usable as control resources in LTE Rel-8, are fixedly used as control resources. In this case, it is able to read RS without viewing PHICH or PCFICH. Yet, if required control resources are smaller than the Nc OFDM symbols, downlink radio resources may be wasted.

According to another method, LTE Rel-8 is currently set to inform a user equipment of length information on OFDM symbols occupied by PHICH via BCH. Hence, in case of supporting MIMO scheme using 8 transmitting antennas, the LTE-A base station enables the length information on the OFDM symbols, which are occupied by the PHICH in an additional RS existing subframe, to be set to 3 via the BCH. Since a maximum value of PCFICH is limited to 3 in LTE Rel-8, if an OFDM symbol length related to PHICH is set to 3 in BCH, a user equipment is able to recognize that a value of the PCFICH is 3. Therefore, without viewing control information carried on the PCFICH additionally, an additional RS can be read at a fixed position of OFDM symbol and subcarrier. Alternatively, in case that control information is RB-dependently allocated in addition by FDM, LTE-A base station adds an option to information on an OFDM symbol length occupied by PHICH, which is supposed to be indicated by BCH, and is then able to indicate information on the option using PHICH information bits in the BCH.

According to another method, in case that RS is transmitted each frame or in a predetermined period, it is set to have a predetermined relation with a PCFICH value acquired from a precedent subframe. In particular, it is able to previously set such a relational expression as 0, +1, −1, +2, −2 and the like for PCFICH values used in previous Ns subframes. This relational expression is preferably delivered as broadcast information. For instance, a method of setting +1 is described. In this case, the setting can be performed in a manner of incrementing a PCFICH value by +1 within a maximum PCFICH value. Thus, without decoding information on PCFICH of a current frame, it is able to read RS at a position previously determined in accordance with a PCFICH value of a precedent subframe or a position of OFDM symbol and subcarrier, which is known in common to a user equipment and a base station.

According to another method, proposed is a method of allocating RS for one of antennas #4 to #7 to a fixed position of OFDM symbol and subcarrier.

First of all, it is able to consider a method of allocating additional RS per OFDM symbol to a whole scheduling bandwidth by a physical allocation unit in form (e.g., a method of allocating additional RS to N OFDM symbols to have the same spacing in-between, an allocating method like randomly distributed allocation, etc.) of distributed allocation. Yet, this method should not cause performance degradation of LTE Rel-8 system in multiplexing with CCE, which is a control information allocation unit of LTE Rel-8, to secure backward compatibility with LTE Rel-8. If the multiplexing with CCE degrades performance of the LTE Rel-8 system, the method, which is considered as a method of recognizing RS independently in accordance with PCIFICH, can be utilized as a method for LTE-A only.

A-2) Method of Recognizing RS after Decoding of PCFICH

LTE-A user equipment obtains information on PCIFCH using a method of using maximum 4 antennas only. In particular, the LTE-A user equipment decodes PCFICH using RS used by LTE Rel-8 system only and is then able to read a preset RS at a fixed position of OFDM symbol and subcarrier based on the information obtained from the PCFICH.

B. Method of Determining RS Pattern in Accordance with PCFICH or PHICH Value

In the following description, a method of determining a pattern of an additional RS at a position of specific OFDM symbol and subcarrier in accordance with PCFICH/PHICH_len value is explained. In this case, the PHICH_len indicates the number of OFDM symbols occupied by PHICH indicated by BCH. In the following description, a method of determining an additional RS position in advance for a case of 'PCFICH/PHICH_len=1', 'PCFICH/PHICH_len=2', or 'PCFICH/PHICH_len=3' is proposed. When PCFICH is transmitted using 8 transmitting antennas, it may occur a situation that a channel estimation through additional RS is preferentially requested to decode the PCFIC. To prevent this occurrence, the PCFICH transmission can be performed by 2Tx or 4Tx TxD scheme of basically using 4 or 2 reference signals (This means RSs of 4 antenna ports defined for 4Tx transmission in LTE Rel-8). In particular, the PCFICH transmission can be performed by the TxD scheme defined by LTE Rel-8 using 2 or 4 physical antennas. Moreover, the PCFICH transmission can be achieved through 2 or 4 virtual antenna ports using an antenna virtualization scheme of transmitting equal data or reference signal by binding 8 physical antennas by unit of 2 or 4 physical antennas. Besides, the TxD scheme defined by LTE Rel-8 is applicable using RS of 4 antenna ports previously designated by LTE Rel-like the above-defined schemes over the whole PDCCH in consideration of backward compatibility with LTE Rel-8 user equipments.

Assuming that an additional RS is allocated to CCE of PDCCH, it is able to previously determine an RS position for the additional RS in a manner of allocating a specific CCE set index to 'PCFICH=1', allocating a CCE set index different from that of 'PCFICH=1' to 'PCFICH=2', and allocating a CCE set index different from that of 'PCFICH=1' or 'PCFICH=2' to 'PCFICH=3'. In this case, the CCE set index can include a logical index or a physical index. In particular, it is able to use a scheme of allocating RS to resources of different OFDM symbol and subcarrier in accordance with a PCFICH value in a manner of a CCE set index #L for 'PCFICH=1', a CCE set index #M for 'PCFICH=2', a CCE set index #N for 'PCFICH=3' and the like. Moreover, it is able to consider a method of performing allocation by varying density of RS in accordance with an increment of a PCFICH value. In particular, it is able to raise or lower RS density in a manner of incrementing or decrementing the set index number of CCE to allocate RS in accordance with increment of a PCFICH value. In more particular, the CCE set index #L is allocated to 'PCFICH=1', the CCE set index #L and the CCE set index #M are allocated to 'PCFICH=2', and CCEs of the CCE set index #L, the CCE set index #M and the CCE set index #N are allocated to 'PCFICH=3'. Thus, as the PCFICH value is incremented, it is able to additionally allocate a new CCE set index in addition to a previous CCE set index. Alternatively, it is able to use a following scheme. First of all, if 'PCFICH=1', the CCE set index #L is allocated. If 'PCFICH=2', the CCE set index #M and the CCE set index #(M+1) are allocated. If 'PCFICH=3', the CCE set index #N, the CCE set index #(N+1) and the CCE set index #(N+2) can be allocated.

The above-proposed embodiment exemplarily relates to a method of determining an RS pattern in accordance with a PCFICH value. The following example related to a method of determining an RS pattern in accordance with a value of the number of OFDM symbols (PCFICH_len) occupied by PHICH indicated by BCH in the same manner of the above description. Assuming that an additional RS is allocated to CCE of PDCCH, it is able to previously determine an RS position in a manner of allocating a specific CCE set index to 'PCFICH_len=1' for an additional RS, allocating a CCE set index different from that of 'PCFICH_len=1' to 'PCFICH_len=2', and allocating a CCE set index different from that of 'PCFICH_len=1' or 'PCFICH_len=2' to 'PCFICH_len=3'. In particular, it is able to use a scheme of allocating RS to resources of different OFDM symbol and subcarrier in accordance with a PCFICH value in a manner of a CCE set index #L for 'PCFICH_len=1', a CCE set index #M for 'PCFICH_len=2', a CCE set index #N for 'PCFICH_len=3' and the like. Moreover, it is able to consider a method of performing allocation by varying density of RS in accordance with an increment of a PCFICH value. In particular, it is able to raise or lower RS density in a manner of incrementing or decrementing the set index number of CCE to allocate RS in accordance with increment of a PCFICH value. In more particular, the CCE set index #L is allocated to 'PCFICH_len=1', the CCE set index #L and the CCE set index #M are allocated to 'PCFICH_len=2', and CCEs of the CCE set index #L, the CCE set index #M and the CCE set index #N are allocated to 'PCFICH_len=3'. Thus, as the PCFICH_len value is incremented, it is able to additionally allocate a new CCE set index in addition to a previous CCE set index. Alternatively, it is able to use a following scheme. First of all, if 'PCFICH_len=1', the CCE set index #L is allocated. If 'PCFICH_len=2', the CCE set index #M and the CCE set index #(M+1) are allocated. If 'PCFICH_len=3', the CCE set index #N, the CCE set index #(N+1) and the CCE set index #(N+2) can be allocated.

The number of CCEs utilizable as RS is set to be maintained at a constant ratio in accordance with a system BW, whereby a corresponding system can be simplified. For instance, the number of CCEs can be incremented in proportion to BW of each system. In particular, it is able to allocate RS using N CCEs if a system BW is 5 MHz. It is able to allocate RS using (2×N) CCEs if a system BW is 10 MHz. And, it is able to allocate RS using (4×N) CCEs if a system BW is 20 MHz. Theses are examples, by which the number of CCEs according to a system BW is non-limited. Alternatively, it is able to consider a method of using a fixed number of CCEs per system BW. In particular, it is able to allocate RS using N CCEs if a system BW is 5 MHz. It is able to allocate RS using M CCEs if a system BW is 10 MHz. And, it is able to allocate RS using L CCEs if a system BW is 20 MHz.

Moreover, it is able to consider defining multiple RS patterns available. In particular, multiple RS patterns, of which CCE indexes are set in advance using the above scheme, are defined and it is then able to consider using one of the multiple RS patterns. If the multiple RS patterns are defined, it is able to prevent RS from colliding between cells or sectors. And, the following examples can be taken into consideration.

TABLE 4

| Pattern 1-1 | PCFICH = 1 => CCE set index = L;<br>PCFICH = 2 => CCE set index = L + 1; and<br>PCFICH = 3 => CCE set index = L + 2. |
|---|---|
| Pattern 1-2 | PCFICH = 1 => CCE set index = M;<br>PCFICH = 2 => CCE set index = M + 1; and<br>PCFICH = 3 => CCE set index = M + 2. |
| Pattern 1-3 | PCFICH = 1 => CCE set index = N;<br>PCFICH = 2 => CCE set index = N + 1; and<br>PCFICH = 3 => CCE set index = N + 2. |

TABLE 5

| Pattern 2-1 | PCFICH = 1 => CCE set index = L;<br>PCFICH = 2 => CCE set index = M; and<br>PCFICH = 3 => CCE set index = N. |
|---|---|
| Pattern 2-2 | PCFICH = 1 => CCE set index = L + 1;<br>PCFICH = 2 => CCE set index = M + 1; and<br>PCFICH = 3 => CCE set index = N + 1. |
| Pattern 2-3 | PCFICH = 1 => CCE set index = L + 2;<br>PCFICH = 2 => CCE set index = M + 2; and<br>PCFICH = 3 => CCE set index = N + 2. |

TABLE 6

| Pattern 3-1 | PCFICH = 1 => CCE set index = L;<br>PCFICH = 2 => CCE set index = M; and<br>PCFICH = 3 => CCE set index = N. |
|---|---|
| Pattern 3-2 | PCFICH = 1 => CCE set index = P;<br>PCFICH = 2 => CCE set index = Q; and<br>PCFICH = 3 => CCE set index = R. |
| Pattern 3-3 | PCFICH = 1 => CCE set index = S;<br>PCFICH = 2 => CCE set index = T; and<br>PCFICH = 3 => CCE set index = U. |

C. Method of Utilizing RSs for Antennas #4 to #7

C-1) Case of not Decoding PCFICH Information (Optional)

LTE-A system is able to apply TxD, MIMO precoding, SM, beamforming and the like, which use all RSs of 8 antenna ports to a downlink control channel (e.g., PHICH, PCFICH, and PDCCH of LTE Rel-8). For this, channel estimation and CQI measurement are performed using RS of LTE Rel-8 for antennas #0 to #3 and channel estimation and CQI measurement are performed using RS newly designed based on CCE in LTE-A for antennas #4 to #7. Thus, all RSs of 8 antenna ports can be used. By using information channel-estimated and channel-measured by RS and performing channel estimation in consideration of added RS together, it is able to utilize TxD, MIMO precoding and SM schemes, which use RSs of 8 antenna ports, for data channel) e.g., PDSCH of LTE Rel-8). In doing so, in order to meet insufficient channel estimation accuracy or time-varying property on a time axis, it is able to apply an MIMO scheme using dedicated RS multiplexed/embedded with/in data in addition. In a manner similar to that of the above-proposed control channel, by performing channel estimation and CQI measurement on antennas #0 to #3 using RS used by LTE Rel-8 and performing channel estimation and CQI measurement on antennas #4 to #7 using an additional RS (i.e., RS allocated to a control channel or RS allocated to a data channel) designed by LTE-A, the TxD, MIMO precoding, SM or beamforming scheme, which use RSs of 8 antenna ports, to a downlink data channel.

As a method of applying MIMO technique, which use a plurality of antenna, to the control channel and the data channel, proposed is to use the same MIMO scheme for the control channel and the data channel in each subframe. For instance, 8TxD is usable for the control channel and the data channel. Alternatively, a precoding scheme is usable for the control channel and the data channel. Moreover, proposed is a method of applying different MIMO schemes to a control channel and a data channel within a subframe in each subframe, respectively. For instance, 8TxD is usable for a control channel (e.g., PHICH, PCFICH, and PDCCH). For another instance, one of TxD, SM, precoding and beamforming is usable for a data channel (e.g., PDCCH). Moreover, it is able t consider a method of applying a different MIMO technique in accordance with a type of a control channel. Moreover, although a user equipment of LTE Rel-8/9 utilizes the MIMO technique for a control/data channel within 4Tx, a user equipment by Rel-10 or the following is ale consider such a hybrid structure as using MIMO scheme that uses 8Tx.

C-2) Case of Decoding PCFICH Information (Mandatory)

If an RS position is not fixed independently from PCFICH information or control channel (e.g., PHICH, PCFICH, PDCCH, etc.) on time and frequency axes, LTE-A applies 2Tx or 4Tx transmitting antenna diversity, MIMO precoding, SM or beamforming scheme of LTE Rel-8 to a downlink control channel (e.g., PHICH, PCFICH or PDCCH of LTE Rel-8) by applying an antenna virtualization scheme in a manner of using 2 or 4 physical antennas via RSs of 2 or 4 antenna ports used by LTE Rel-8 or binding 8 physical antennas by a unit of 4 or 2 physical antennas. The present invention proposes a method of transmitting the remaining PDSCH using TxD or precoding using RSs of 8 antenna ports entirely or in part or a series of beamforming. Since a receiving stage of LTE-A system is unable to acquire information indicating whether a control channel (e.g., PHICH, PCFICH, PDCCH, etc.) is transmitted using 8 transmitting antennas, it preferentially performs decoding of the control channel (e.g., PHICH, PCFICH, PDCCH, etc.) using RS corresponding to each of the antenna ports used by LTE Rel-8. After reception of the control channel information, position information on RS for supporting physical antennas #4 to #7 or antenna ports allocated to time and frequency axes is acquired. By acquiring the position information of the RS and using channel estimation information and channel measurement information, it is able to decode a data channel (e.g., PDSCH of LTE Rel-8) by TxD, MIMO precoding, SM or beamforming scheme using RSs of 8 antenna ports.

Moreover, the present invention proposes a method of transmitting PCFICH by a TxD scheme in a manner of applying 2Tx or 4Tx transmitting antenna diversity scheme of LTE Rel-8 by applying an antenna virtualization scheme in a manner of using 2 or 4 physical antennas via RSs of 2 or 4 antenna ports used by LTE Rel-8 or binding 8 physical antennas by a unit of 4 or 2 physical antennas and also transmitting the remaining PDCCH and PDSCH by TxD using 8 transmitting antennas. In doing so, each user equipment acquires information on PCFICH by channel estimation via RS corresponding to each antenna port used by LTE Rel-8. After acquisition of the information on the PCFICH, position information on RS for supporting physical antennas #4 to #7 or antenna ports allocated on time and frequency axes is obtained. Thereafter, a user equipment acquires information on a control information (e.g., PDCCH) and information on a data channel (e.g., PDSCH) by estimating channels for antennas #4 to #7 via RSs for supporting the antennas #4 to #7 and then applying the channel estimation values to receptions signals of PDCCH and PDSCH, which use TxD, using RSs (e.g., 'common RS of 4 antenna ports previously designated by LTE Rel-8'+'CCE based RSs proposed for antennas #4 to 47 added by LTE-A') of the remaining 8 antenna ports or a reception signal of PDSCH transmitted by precoding or a series of beamforming using the corresponding RSs.

In the method of applying MIMO technique of using a plurality of antennas to the above-described control and data channels, the present invention proposes a method of using the same MIMO scheme for each of the control channel and the data channel in each subframe. For instance, it is able to apply TxD of using 4 antennas to a control channel and a data channel. Alternatively, a same precoding scheme is usable for a control channel and a data channel. Moreover, the present invention proposes to apply different MIMO schemes to a control channel and a data channel within a subframe in each subframe. In particular, TxD using 4 antennas is applicable to a control channel (e.g., PHICH, PCFICH, and PDCCH), while one of TxD using 8 transmitting antennas, precoding, SM and beamforming is applicable to a data channel. Moreover, a method of applying a different MIMO technique in accordance with a type of a control channel can be taken into consideration as well.

Detailed Example 4

RS Transmission Using Traffic Resource

In case of a traffic resource, a method of allocating a resource to be used as RS by a base station can be implemented with ease. Yet, it is unable to change a structure of a traffic resource used by a conventional legacy user equipment (e.g., LTE Rel-8 user equipment). On the contrary, in case of a traffic channel used by a new user equipment (e.g., LTE-A user equipment), it can be transmitted in a manner of determining a structure of the traffic channel advance. For instance, if a structure of PDSCH is defined as a current structure, a series of localized/distributed RBs (e.g., both virtual RBs and physical RBs are possible.) are determined in advance and an RS structure can be then newly defined within the corresponding RB. Yet, since the structure of the localized/distributed RBs is based on the already-existing legacy RS, the localized/distributed RBs are not evenly distributed over a whole band. Therefore, in defining RB for LTE-A in consideration of such a structure, the previous localized/distributed RBs are allocated in advance and a new allocation structure can be then defined within the corresponding RBs. A set is generated from selecting RBs evenly distributed within a carrier band, RS subcarriers are defined in a manner that RSs are arranged within the set as evenly as they can (e.g., RS subcarriers can be defined across at least one or more OFDM symbols), and the rest of the RBs can be redefined in a localized/distributed structure.

In case of considering multiple carriers in downlink, a specific component carrier in downlink can be just allocated as an LTE-A only carrier. Therefore, RSs for antenna ports #4 to #7 are allocated using $N(\geq 1)$ OFDM symbols at fixed positions, which are allocated for data transmission in each subframe per component carrier or for subframe duration of a specific period, additionally. If this method is used, a multiplexing scheme for the antenna ports #4 to #7 can be performed by CDM or FDM. For example of the CDM scheme, orthogonal property per antenna can be obtained in a manner of allocating CAZAC sequence and then allocating a different cyclic shift as an RS sequence. For example of the FDM scheme, it is able to apply RPF configuring with a multiple of 4 is applicable to allocate RSs for antennas #4 to #7. For instance, the RS for the antenna #4 can be allocated if (freq._index mod 4)=0. For instance, the RS for the antenna #5 can be allocated if (freq._index mod 4)=1. For instance, the RS for the antenna #6 can be allocated if (freq._index mod 4)=1. For instance, the RS for the antenna #7 can be allocated if (freq._index mod 4)=1. In a configuration similar to this, an RS for a different antenna is allocated to a different component carrier for the same time.

RS multiplexing schemes among component carriers can include CDM, TD< and FDM schemes. Moreover, a multiplexing scheme of FDM-CDM hybrid type is available as the RS multiplexing scheme. The FDM scheme can be configured in a manner of depending on the number of total component carriers using RPF. For instance, in case that there are 2 DL component carriers available in downlink, multiplexing among component carriers can be performed in a manner of allocating RS to a whole band with a 2-space interval or a band to be schedule. According to one embodiment, if an RS multiplexing method between component carriers and antennas, multiplexing is performed among component carriers by CDM and multiplexing is performed among antennas by FDM. Moreover, multiplexing can be performed among antennas by CDM and multiplexing can be performed among component carriers by FDM.

In the following description, cases of allocating RS using OFDM symbol additionally on PDSCH are explained in detail. In case of LTE Rel-8, a subframe is constructed with a control region and a data region and PDSCH is set on the rest of the data region except reference signals for antenna ports 0~3. In case that LTE Rel-8 operates in a closed loop rank 1 transmission mode, PDSCH is set on the rest of the data region except the reference signal for the antenna port 5. The details of the structure of the subframe can refer to FIGS. 2 to 4. In the drawings, a box represented by a bold line indicates a resource block and each space indicates a resource element (RE) defined by one OFDM symbol and one subcarrier. The resource block is exemplarily represented as including 7 OFDM symbols×12 subcarriers. The RE, to which a reference signal is allocated, in a subframe can be represented as a combination of an OFDM symbol index and a subcarrier index [e.g., $(1, k)_s$]. In this case, the 'l' is the OFDM symbol index and increases left to right. The 'k' is the subcarrier index and increases bottom to top. The subscript 's' is a slot index and includes 1 or 2. In the resource block, the 'l' is set to 0~6 or 0~5 and the 'k' is set to 0~12.

Table 7 and Table 8 show patterns of allocating reference signals for the previous antenna ports 0~3 within a subframe, respectively. Table 7 shows a case of using a normal CP, while Table 8 shows a case of using an extended CP.

TABLE 7

|  | slot 1 | | | slot 2 | | |
| --- | --- | --- | --- | --- | --- | --- |
|  | l = 0 | l = 1 | l = 4 | l = 0 | l = 1 | l = 4 |
| k = 9 | R1 | R3 | R0 | R1 | R2 | R0 |
| k = 6 | R0 | R2 | R1 | R0 | R3 | R1 |
| k = 3 | R1 | R3 | R0 | R1 | R2 | R0 |
| k = 0 | R0 | R2 | R1 | R0 | R3 | R1 |

TABLE 8

|  | slot 1 | | | slot 2 | | |
| --- | --- | --- | --- | --- | --- | --- |
|  | l = 0 | l = 1 | l = 3 | l = 0 | l = 1 | l = 3 |
| k = 9 | R1 | R3 | R0 | R1 | R2 | R0 |
| k = 6 | R0 | R2 | R1 | R0 | R3 | R1 |
| k = 3 | R1 | R3 | R0 | R1 | R2 | R0 |
| k = 0 | R0 | R2 | R1 | R0 | R3 | R1 |

Table 9 and Table 10 show patterns of allocating reference signals for the previous antenna port 5 within a subframe, respectively. Table 9 shows a case of using a normal CP, while Table 10 shows a case of using an extended CP.

TABLE 9

|  | slot 1 | | Slot 2 | |
| --- | --- | --- | --- | --- |
|  | l = 3 | l = 6 | l = 2 | l = 5 |
| k = 10 | — | R5 | — | R5 |
| k = 8 | R5 | — | R5 | — |
| k = 6 | — | R5 | — | R5 |
| k = 4 | R5 | — | R5 | — |
| k = 2 | — | R5 | — | R5 |
| k = 0 | R5 | — | R5 | — |

TABLE 10

|  | slot 1 | Slot 2 | |
| --- | --- | --- | --- |
|  | l = 4 | l = 1 | l = 4 |
| k = 11 |  | R5 |  |
| k = 9 | R5 |  | R5 |
| k = 8 |  | R5 |  |
| k = 6 | R5 |  | R5 |
| k = 5 |  | R5 |  |
| k = 3 | R5 |  | R5 |
| k = 2 |  | R5 |  |
| k = 0 | R5 |  | R5 |

FIGS. 29 to 32 show examples of allocating RS for antenna ports 6~9 (R6~R9) using four OFDM symbols in addition. In the drawings, a left part indicates a case of using a normal CP, while a right part indicates a case of using an extended CP. The drawings assume a case that a control region includes first one or 2 OFDM symbols of a subframe.

Patterns A-1 to A-4 are designed to maintain 4-space interval on a frequency axis for an extended antenna port. Each of the pattern A-1 and the pattern A-3 shows a case that RSs for the extended antenna ports are allocated to 4 additional OFDM symbols, respectively. Each of the pattern A-2 and the pattern A-4 shows a case that RSs for antenna ports are allocated over two OFDM symbols to reflect channel variation on a time axis.

Patterns A-5 to A-8 indicate cases that RS for an extended antenna port is designed to have the same overhead of RS of LTE Rel-8. The RSs for each of the extended antenna ports are designed to have a 3-space interval on a frequency axis. The pattern A-5 indicates a case that RSs for the extended antenna ports are allocated to 4 additional OFDM symbols, respectively. Each of the pattern A-6 and the pattern A-7 shows a case that RSs for the antenna ports are allocated across 4 OFDM symbols to reflect channel variation on a time axis. And, the pattern A-8 shows a case that RSs for the antenna ports are allocated across two OFDM symbols to reflect channel variations on the time and frequency axes.

In the patterns A-1 to A-8, positions of the extended antenna ports 6~9 (R6~R9) can be switched to one another. Moreover, v_shift(v_shift=cell_id mod 3) applied to the previous antenna port 5 and the position shift on the frequency axis used to reduce inter-cell RS interference can be identically applicable to the RS for the extended antenna port.

The RS positions of R6~R9 according to the patterns A-1 to A-8 can be represented as follows. For clarity, position of RS for a normal CP is indicated only. The case of an extended CP has the same RS overhead and pattern of the case of the normal CP. As the number of OFDM symbols in a subframe varies, the position of the RS allocated OFDM symbols varies only.

The following tables correspond to the pattern A-1 (FIG. 29), the pattern A-2 (FIG. 29), the pattern A-3 (FIG. 30), the pattern A-4 (FIG. 30), the pattern A-5 (FIG. 31), the pattern A-6 (FIG. 31), the pattern A-7 (FIG. 32), and the pattern A-8 (FIG. 32), respectively.

Figure 29:
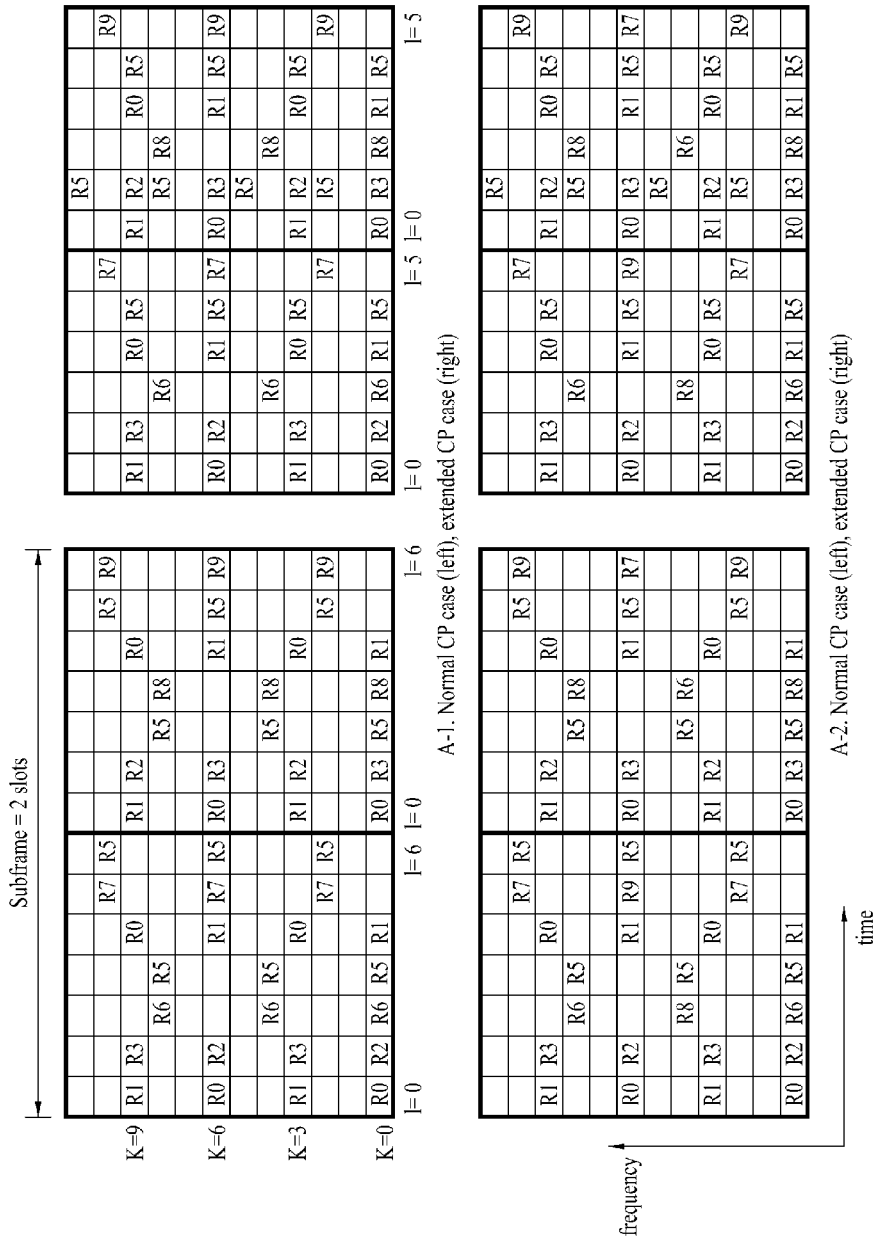
FIGS. 29 to 32 exemplarily show a method of allocating RSs for antennas #4 to #7 on PDSCH using 4 OFDM symbols in addition.

A-1 Pattern (FIG. 29)

| | |
|---|---|
| $R6\,(1, k)_s = \{(2, 0)_1, (2, 4)_1, (2, 8)_1\}$; | $R7\,(1, k)_s = \{(5, 2)_1, (5, 6)_1, (5, 10)_1\}$ |
| $R8\,(1, k)_s = \{(3, 0)_2, (3, 4)_2, (3, 8)_2\}$; | $R9\,(1, k)_s = \{(6, 2)_2, (6, 6)_2, (6, 10)_2\}$ |

A-2 Pattern (FIG. 29)

| | |
|---|---|
| $R6\,(1, k)_s = \{(2, 0)_1, (2, 8)_1, (3, 4)_2\}$; | $R7\,(1, k)_s = \{(5, 2)_1, (5, 10)_1, (6, 6)_2\}$ |
| $R8\,(1, k)_s = \{(2, 4)_1, (3, 0)_2, (3, 8)_2\}$; | $R9\,(1, k)_s = \{(5, 6)_1, (6, 2)_2, (6, 10)_2\}$ |

Figure 30:
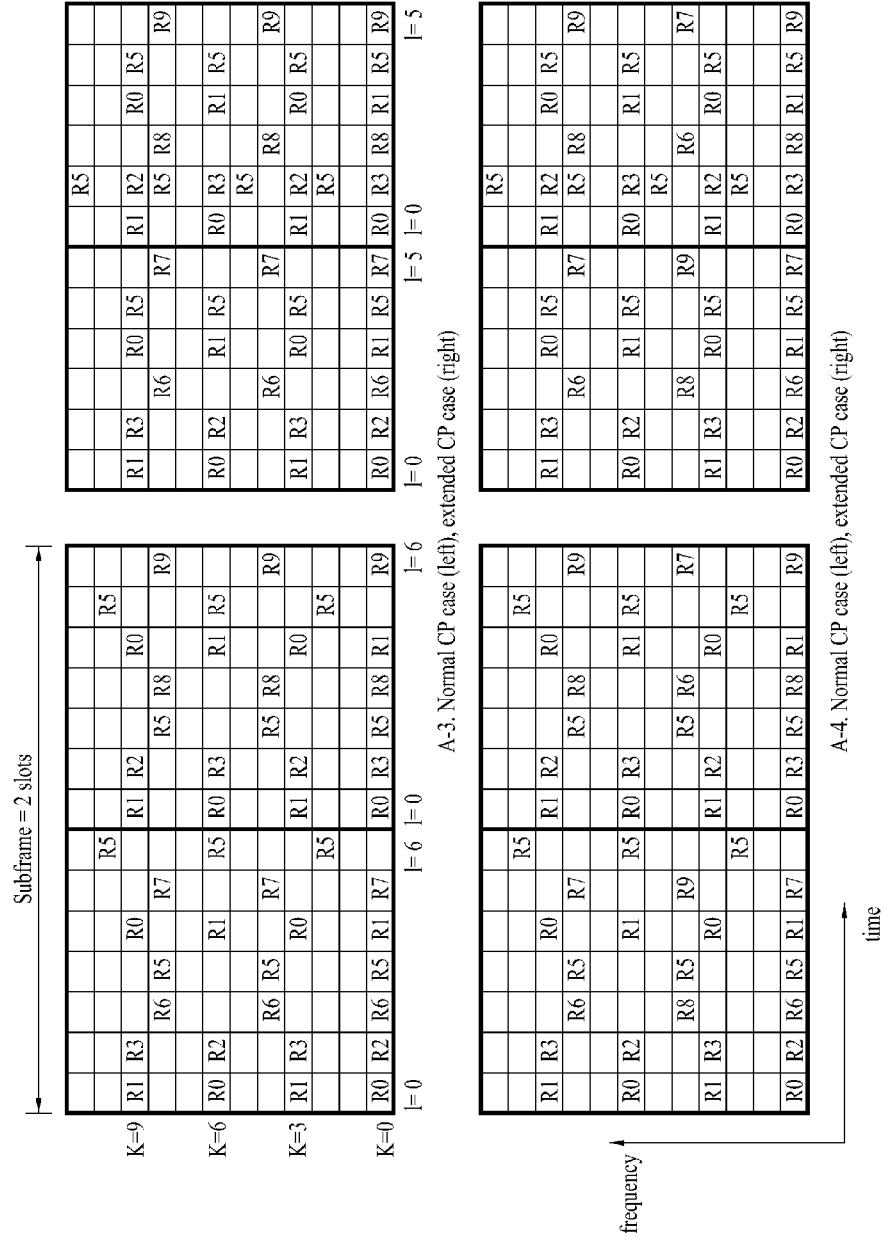

A-3 Pattern (FIG. 30)

| | |
|---|---|
| $R6\,(1, k)_s = \{(2, 0)_1, (2, 4)_1, (2, 8)_1\}$; | $R7\,(1, k)_s = \{(5, 0)_1, (5, 4)_1, (5, 8)_1\}$ |
| $R8\,(1, k)_s = \{(3, 0)_2, (3, 4)_2, (3, 8)_2\}$; | $R9\,(1, k)_s = \{(6, 0)_2, (6, 4)_2, (6, 8)_2\}$ |

A-4 Pattern (FIG. 30)

| | |
|---|---|
| $R6\,(1, k)_s = \{(2, 0)_1, (2, 8)_1, (3, 4)_2\}$; | $R7\,(1, k)_s = \{(5, 0)_1, (5, 8)_1, (6, 4)_2\}$ |
| $R8\,(1, k)_s = \{(2, 4)_1, (3, 0)_2, (3, 8)_2\}$; | $R9\,(1, k)_s = \{(5, 4)_1, (6, 0)_2, (6, 8)_2\}$ |

Figure 31:
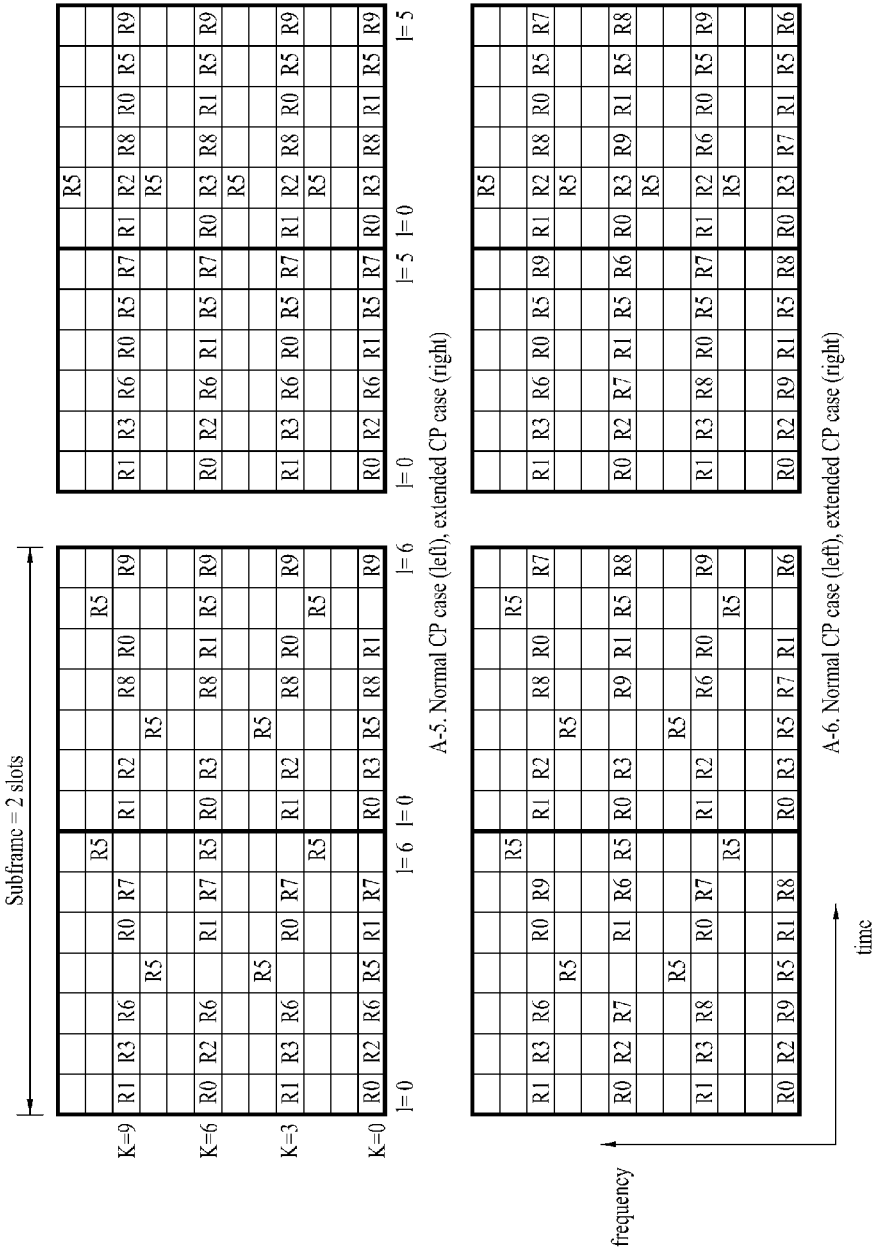

A-5 Pattern (FIG. 31)

| | |
|---|---|
| $R6\,(1, k)_s = \{(2, 0)_1, (2, 3)_1, (2, 6)_1, (2, 9)_1\}$; | $R7\,(1, k)_s = \{(5, 0)_1, (5, 3)_1, (5, 6)_1, (5, 9)_1\}$ |
| $R8\,(1, k)_s = \{(3, 0)_2, (3, 3)_2, (3, 6)_2, (3, 9)_2\}$; | $R9\,(1, k)_s = \{(6, 0)_2, (6, 3)_2, (6, 6)_2, (6, 9)_2\}$ |

A-6 Pattern (FIG. 31)

| | |
|---|---|
| $R6\,(1, k)_s = \{(2, 9)_1, (5, 6)_1, (3, 3)_2, (6, 0)_2\}$; | $R7\,(1, k)_s = \{(2, 6)_1, (5, 3)_1, (3, 0)_2, (6, 9)_2\}$ |
| $R8\,(1, k)_s = \{(2, 3)_1, (5, 0)_1, (3, 9)_2, (6, 6)_2\}$; | $R9\,(1, k)_s = \{(2, 0)_1, (5, 9)_1, (3, 6)_2, (6, 3)_2\}$ |

Figure 33:
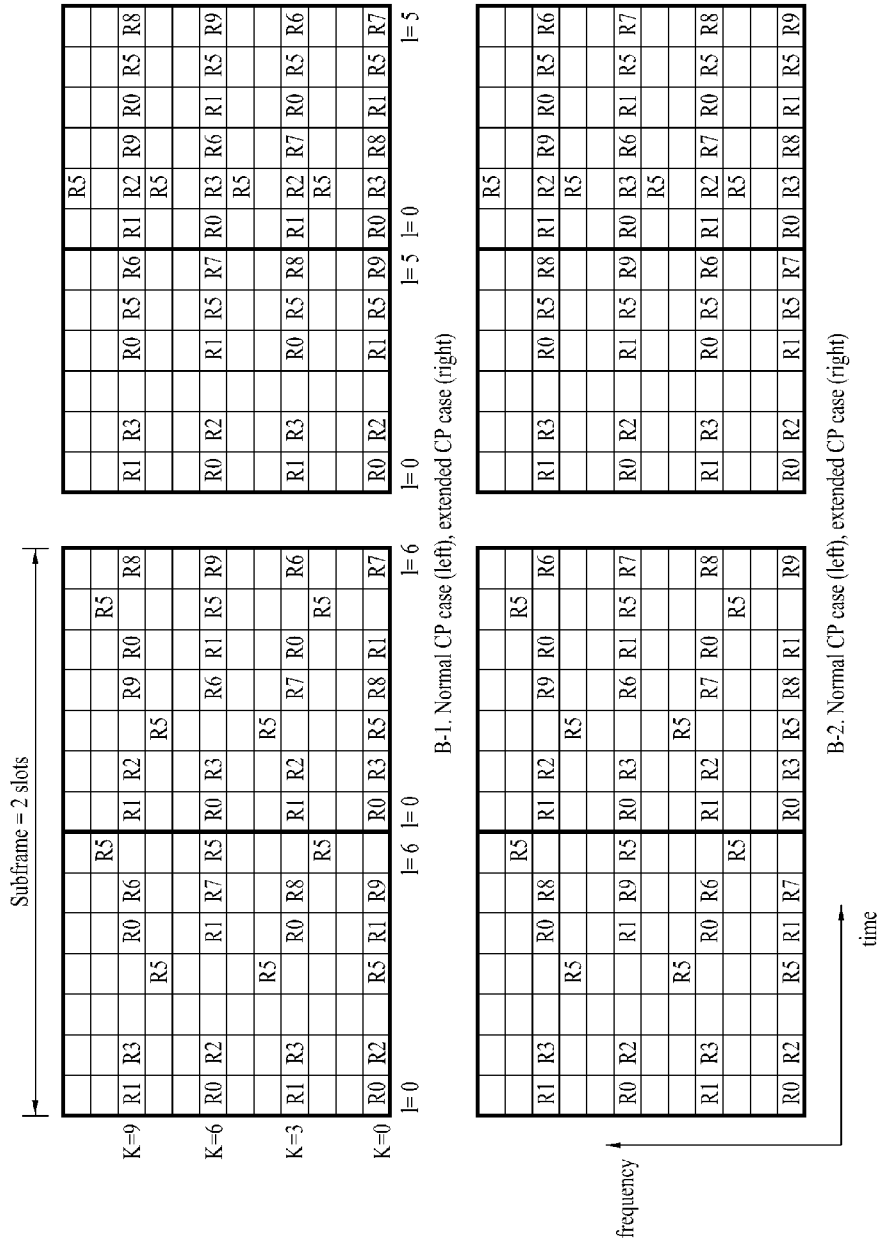
FIG. 33 and FIG. 34 exemplarily show a method of allocating RSs for antennas #4 to #7 on PDSCH using 3 OFDM symbols in addition.

A-7 Pattern (FIG. 33)

| | |
|---|---|
| $R6\,(1, k)_s = \{(2, 0)_1, (5, 3)_1, (3, 6)_2, (6, 9)_2\}$; | $R7\,(1, k)_s = \{(2, 9)_1, (5, 0)_1, (3, 3)_2, (6, 6)_2\}$ |
| $R8\,(1, k)_s = \{(2, 6)_1, (5, 9)_1, (3, 0)_2, (6, 3)_2\}$; | $R9\,(1, k)_s = \{(2, 3)_1, (5, 6)_1, (3, 9)_2, (6, 0)_2\}$ |

A-8 Pattern (FIG. 33)

| | |
|---|---|
| $R6\,(1, k)_s = \{(2, 3)_1, (2, 9)_1, (3, 0)_2, (3, 6)_2\}$; | $R7\,(1, k)_s = \{(5, 3)_1, (5, 9)_1, (6, 0)_2, (6, 6)_2\}$ |
| $R8\,(1, k)_s = \{(2, 0)_1, (2, 6)_1, (3, 3)_2, (3, 9)_2\}$; | $R9\,(1, k)_s = \{(5, 0)_1, (5, 6)_1, (6, 3)_2, (6, 9)_2\}$ |

Figure 34:
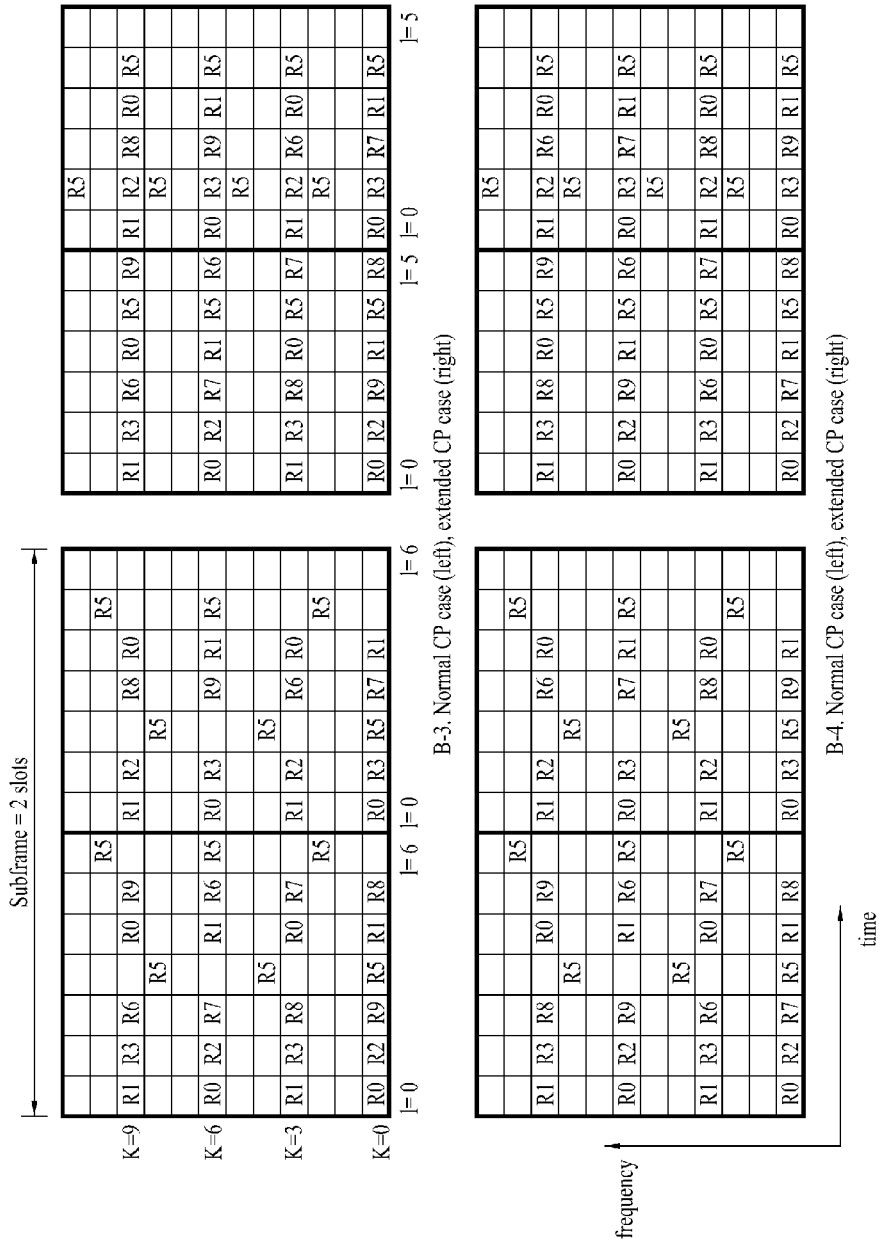

FIG. 33 and FIG. 34 show examples of allocating RS for antenna ports 6~9 (R6~R9) using three OFDM symbols in addition. In the drawings, a left part indicates a case of using a normal CP, while a right part indicates a case of using an extended CP.

Patterns B-1 to B-4 are designed to maintain a 3-space interval or an interval of a multiple of 3 on a frequency axis for an extended antenna port. Each of the patterns B-1 to B-4 shows a case that RSs for the antenna ports are allocated across 3 OFDM symbols, respectively. In particular, each of the pattern B-1 and the pattern B-2 shows a case that a control region includes first 3 OFDM symbols of a subframe. In this case, since the third OFDM symbol in the subframe is used as a resource of the control region, the RSs for the extended antenna port can be allocated in a manner of starting with the first $6^{th}$ OFDM symbol of the subframe. In case that the control region includes first 2 OFDM symbols or less, all of the patterns B-1 to B-4 are applicable.

In the patterns B-1 to B-4, positions of the extended antenna ports 6~9 (R6~R9) can be switched to one another. Moreover, v_shift(v_shift=cell_id mod 3) applied to the previous antenna port 5 and the position shift on the frequency axis used to reduce inter-cell RS interference can be identically applicable to the RS for the extended antenna port.

The RS positions of R6~R9 according to the patterns B-1 to B-4 can be represented as follows. For clarity, position of RS for a normal CP is indicated only. The case of an extended CP has the same RS overhead and pattern of the case of the normal CP. As the number of OFDM symbols in a subframe varies, the position of the RS allocated OFDM symbols varies only.

The following tables correspond to the pattern B-1 (FIG. 32), the pattern B-2 (FIG. 32), the pattern B-3 (FIG. 33), and the pattern B-4 (FIG. 33), respectively.

Figure 32:
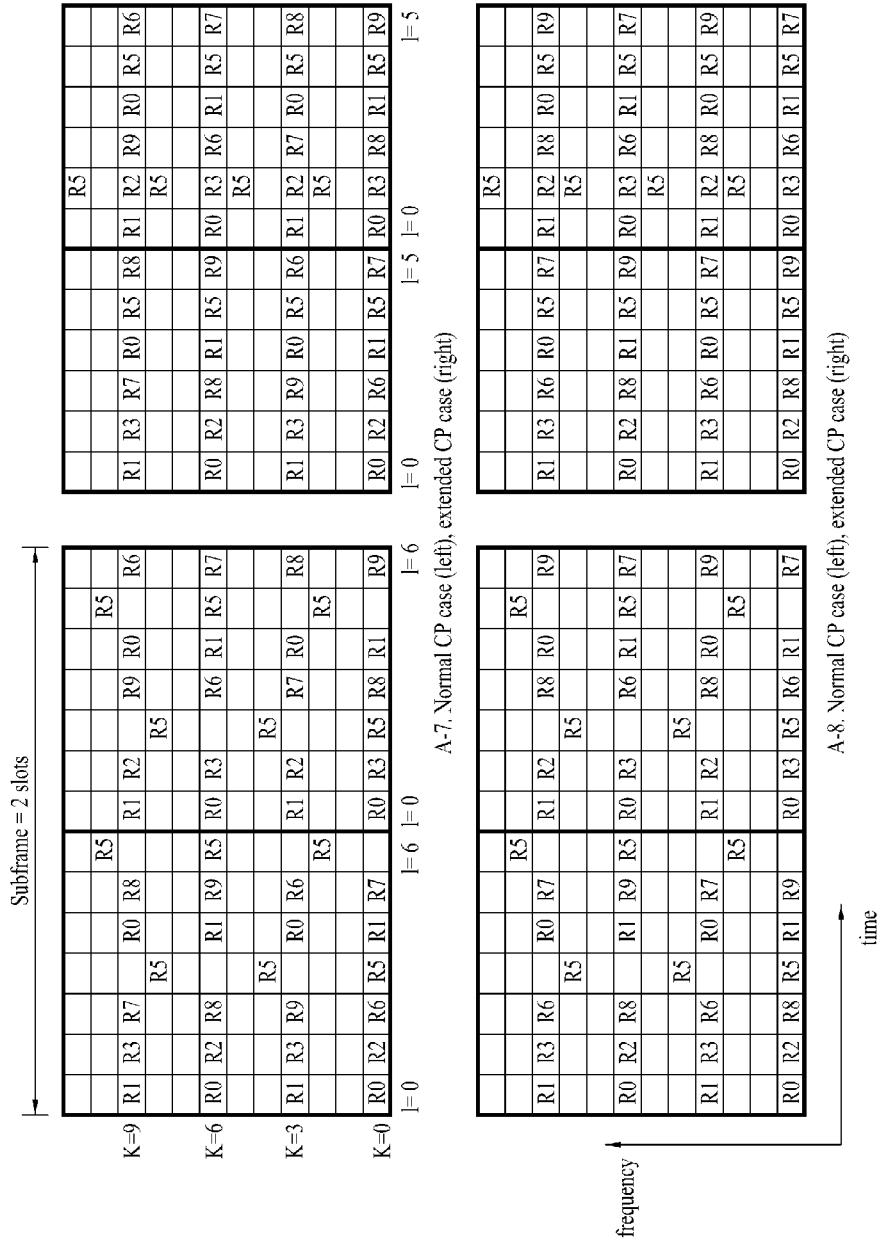

B-1 Pattern (FIG. 32)

| | |
|---|---|
| $R6\,(1, k)_s = \{(5, 9)_1, (3, 6)_2, (6, 3)_2\}$; | $R7\,(1, k)_s = \{(5, 6)_1, (3, 3)_2, (6, 0)_2\}$ |
| $R8\,(1, k)_s = \{(5, 3)_1, (3, 0)_2, (6, 9)_2\}$; | $R9\,(1, k)_s = \{(5, 0)_1, (3, 9)_2, (6, 6)_2\}$ |

B-2 Pattern (FIG. 32)

| | |
|---|---|
| $R6\,(1, k)_s = \{(5, 3)_1, (3, 6)_2, (6, 9)_2\}$; | $R7\,(1, k)_s = \{(5, 0)_1, (3, 3)_2, (6, 6)_2\}$ |
| $R8\,(1, k)_s = \{(5, 9)_1, (3, 0)_2, (6, 3)_2\}$; | $R9\,(1, k)_s = \{(5, 6)_1, (3, 9)_2, (6, 0)_2\}$ |

B-3 Pattern (FIG. 33)

| | |
|---|---|
| $R6 (1, k)_s = \{(2, 9)_1, (5, 6)_1, (3, 3)_2\};$ | $R7 (1, k)_s = \{(2, 6)_1, (5, 3)_1, (3, 0)_2\}$ |
| $R8 (1, k)_s = \{(2, 3)_1, (5, 0)_1, (3, 9)_2\};$ | $R9 (1, k)_s = \{(2, 0)_1, (5, 9)_1, (3, 6)_2\}$ |

B-4 Pattern (FIG. 33)

| | |
|---|---|
| $R6 (1, k)_s = \{(2, 3)_1, (5, 6)_1, (3, 9)_2\};$ | $R7 (1, k)_s = \{(2, 0)_1, (5, 3)_1, (3, 6)_2\}$ |
| $R8 (1, k)_s = \{(2, 9)_1, (5, 0)_1, (3, 3)_2\};$ | $R9 (1, k)_s = \{(2, 6)_1, (5, 9)_1, (3, 3)_2\}$ |

FIGS. 35 to 42 show examples of allocating RS for antenna ports 6~9 (R6~R9) using 2 OFDM symbols in addition. In the drawings, a left part indicates a case of using a normal CP, while a right part indicates a case of using an extended CP. The drawings assume a case that a control region includes first one or 2 OFDM symbols of a subframe.

Patterns C-1 to C-16 are designed to maintain 4-space interval on a frequency axis for an extended antenna port. Each of the pattern C-1, the pattern C-3, the pattern C-5, the pattern C-7 and the pattern C-9 shows a case that RSs for the extended antenna ports are allocated to 2 additional OFDM symbols, respectively. Each of the pattern C-2, the pattern C-4, the pattern C-6, the pattern C-8 and the pattern C-10 shows a case that RSs for antenna ports are allocated over two OFDM symbols to reflect channel variation on a time axis. The patterns C-11 to C-16 indicate cases that RS for an extended antenna port is designed to have the same overhead of RS of LTE Rel-8. In particular, each of the patterns C-1 to C-6 shows a case that a control region includes first 3 OFDM symbols of a subframe. In this case, since the third OFDM symbol in the subframe is used as a resource of the control region, the RSs for the extended antenna port can be allocated in a manner of starting with the first $6^{th}$ OFDM symbol of the subframe. In case that the control region includes first 2 OFDM symbols or less, all of the patterns C-1 to C-16 are applicable. In the patterns C-1 to C-16, positions of the extended antenna ports 6~9 (R6-R9) can be switched to one another. Moreover, v_shift(v_shift=cell_id mod 3) applied to the previous antenna port 5 and the position shift on the frequency axis used to reduce inter-cell RS interference can be identically applicable to the RS for the extended antenna port.

The RS positions of R6~R9 according to the patterns C-1 to C-16 can be represented as follows. For clarity, position of RS for a normal CP is indicated only. The case of an extended CP has the same RS overhead and pattern of the case of the normal CP. As the number of OFDM symbols in a subframe varies, the position of the RS allocated OFDM symbols varies only.

The following tables correspond to the pattern C-1 (FIG. 35), the pattern C-2 (FIG. 35), the pattern C-3 (FIG. 36), the pattern C-4 (FIG. 36), the pattern C-5 (FIG. 37), the pattern C-6 (FIG. 37), the pattern C-7 (FIG. 38), the pattern C-8 (FIG. 38), the pattern C-9 (FIG. 39), the pattern C-10 (FIG. 39), the pattern C-11 (FIG. 40), the pattern C-12 (FIG. 40), the pattern C-13 (FIG. 41), the pattern C-14 (FIG. 41), the pattern C-15 (FIG. 42), and the pattern C-16 (FIG. 42), respectively.

Figure 35:
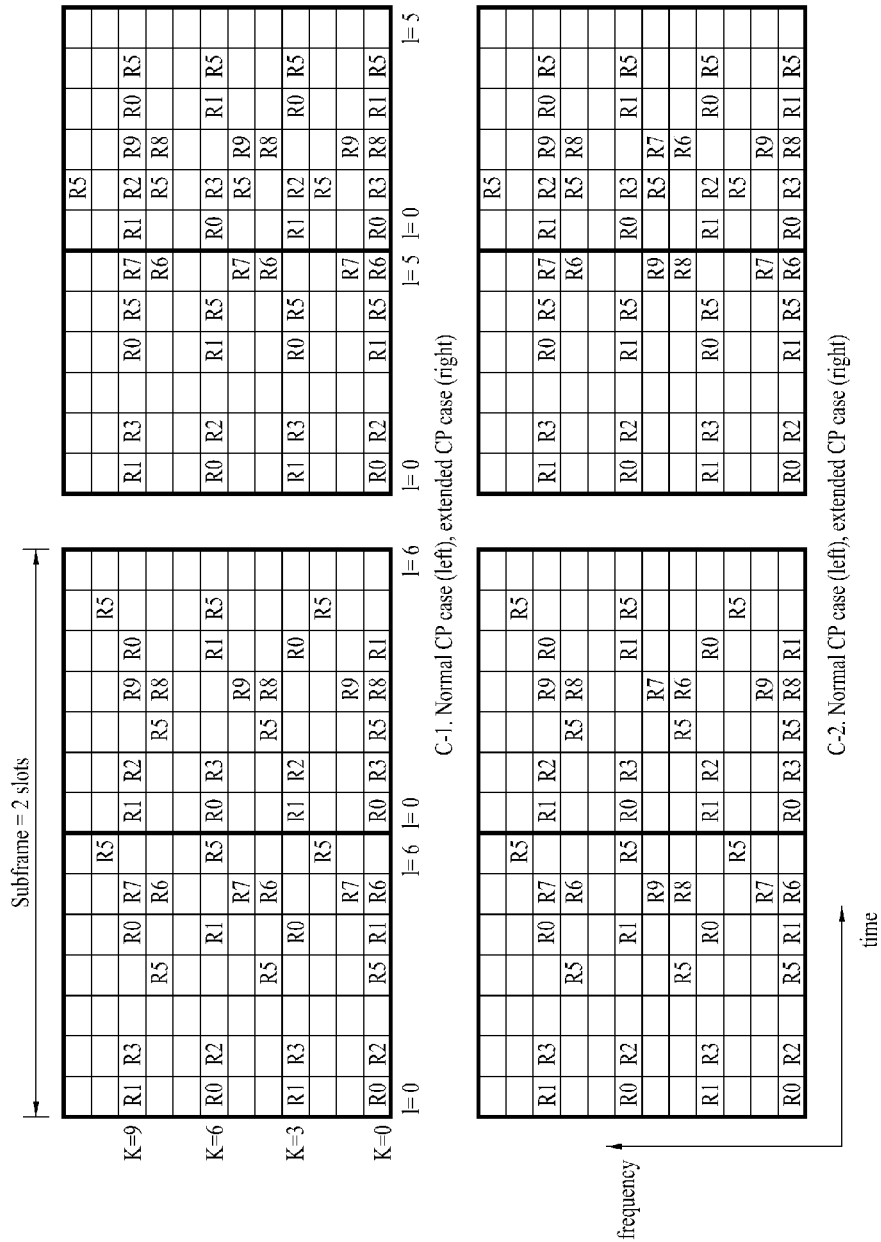
FIGS. 35 to 42 exemplarily show a method of allocating RSs for antennas #4 to #7 on PDSCH using 2 OFDM symbols in addition.

C-1 Pattern (FIG. 35)

| | |
|---|---|
| $R6 (1, k)_s = \{(5, 0)_1, (5, 4)_1, (5, 8)_1\};$ | $R7 (1, k)_s = \{(5, 1)_1, (5, 5)_1, (5, 9)_1\}$ |
| $R8 (1, k)_s = \{(3, 0)_2, (3, 4)_2, (3, 8)_2\};$ | $R9 (1, k)_s = \{(3, 1)_2, (3, 5)_2, (3, 9)_2\}$ |

C-2 Pattern (FIG. 35)

| | |
|---|---|
| $R6 (1, k)_s = \{(5, 0)_1, (5, 8)_1, (3, 4)_2\};$ | $R7 (1, k)_s = \{(5, 1)_1, (5, 9)_1, (3, 5)_2\}$ |
| $R8 (1, k)_s = \{(5, 4)_1, (3, 0)_2, (3, 8)_2\};$ | $R9 (1, k)_s = \{(5, 5)_1, (3, 1)_2, (3, 9)_2\}$ |

Figure 36:
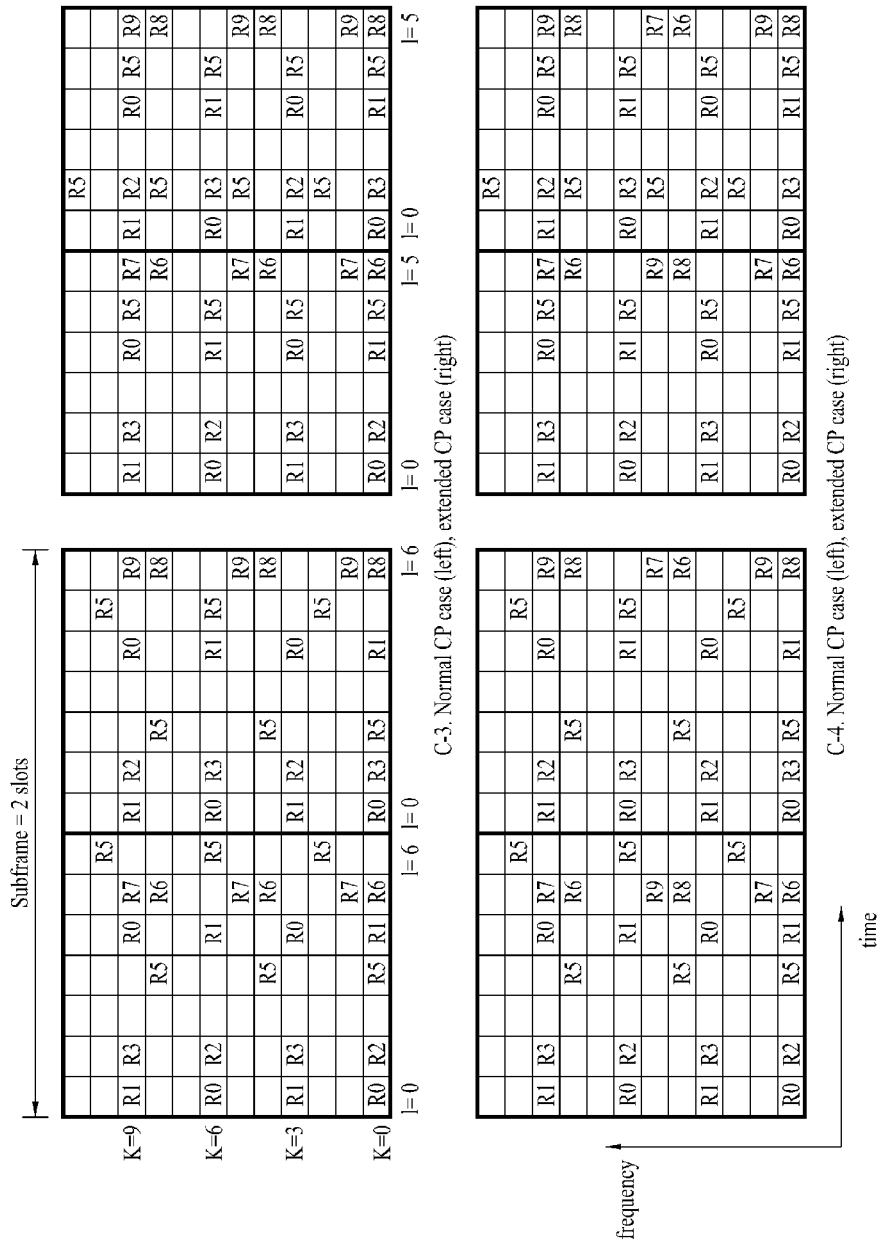

C-3 Pattern (FIG. 36)

| | |
|---|---|
| $R6 (1, k)_s = \{(5, 0)_1, (5, 4)_1, (5, 8)_1\};$ | $R7 (1, k)_s = \{(5, 1)_1, (5, 5)_1, (5, 9)_1\}$ |
| $R8 (1, k)_s = \{(6, 0)_2, (6, 4)_2, (6, 8)_2\};$ | $R9 (1, k)_s = \{(6, 1)_2, (6, 5)_2, (6, 9)_2\}$ |

C-4 Pattern (FIG. 36)

| | |
|---|---|
| $R6 (1, k)_s = \{(5, 0)_1, (5, 8)_1, (6, 4)_2\};$ | $R7 (1, k)_s = \{(5, 1)_1, (5, 9)_1, (6, 5)_2\}$ |
| $R8 (1, k)_s = \{(5, 4)_1, (6, 0)_2, (6, 8)_2\};$ | $R9 (1, k)_s = \{(5, 5)_1, (6, 1)_2, (6, 9)_2\}$ |

Figure 37:
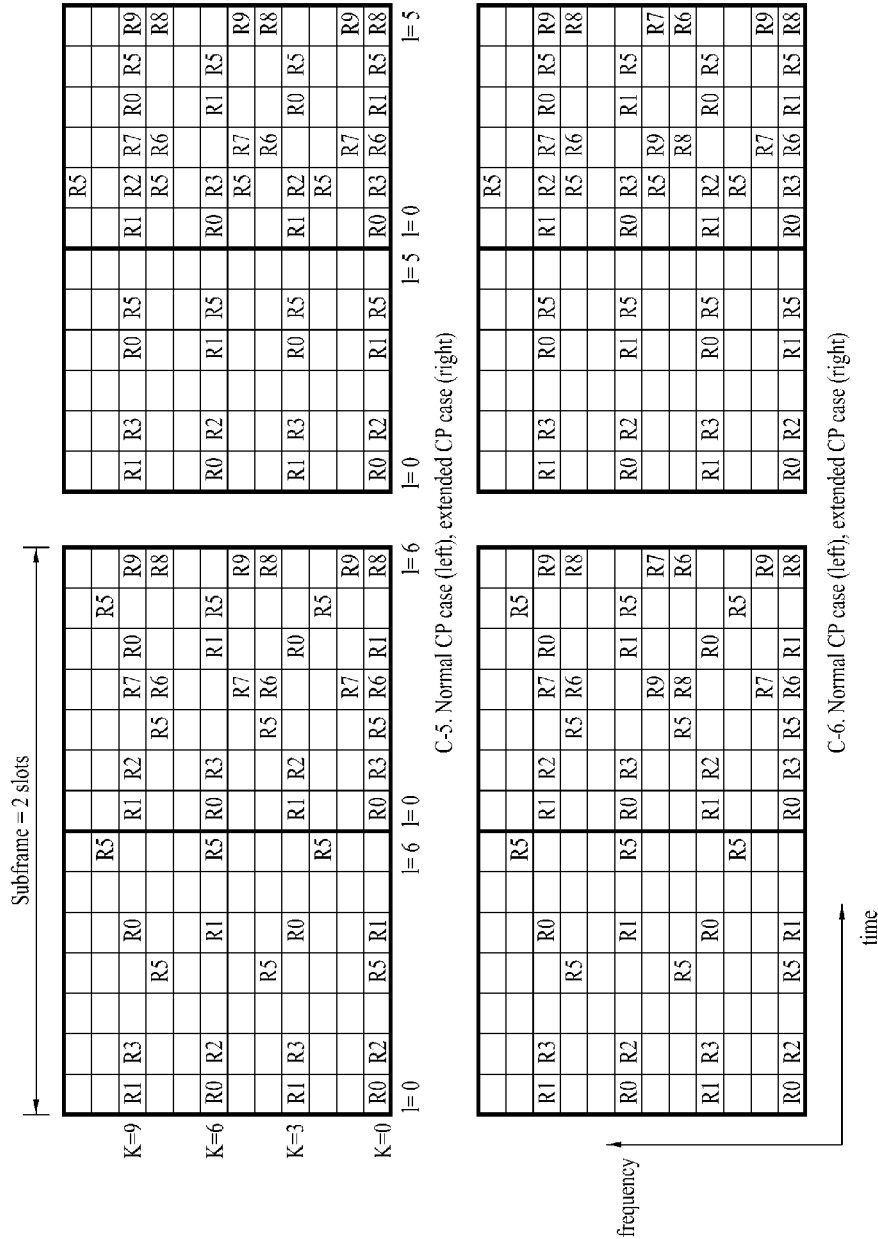

C-5 Pattern (FIG. 37)

| | |
|---|---|
| $R6 (1, k)_s = \{(3, 0)_2, (3, 4)_2, (3, 8)_2\};$ | $R7 (1, k)_s = \{(3, 1)_2, (3, 5)_2, (3, 9)_2\}$ |
| $R8 (1, k)_s = \{(6, 0)_2, (6, 4)_2, (6, 8)_2\};$ | $R9 (1, k)_s = \{(6, 1)_2, (6, 5)_2, (6, 9)_2\}$ |

C-6 Pattern (FIG. 37)

| | |
|---|---|
| $R6 (1, k)_s = \{(3, 0)_2, (3, 8)_2, (6, 4)_2\};$ | $R7 (1, k)_s = \{(3, 1)_2, (3, 9)_2, (6, 5)_2\}$ |
| $R8 (1, k)_s = \{(3, 4)_2, (6, 0)_2, (6, 8)_2\};$ | $R9 (1, k)_s = \{(3, 5)_2, (6, 1)_2, (6, 9)_2\}$ |

Figure 38:
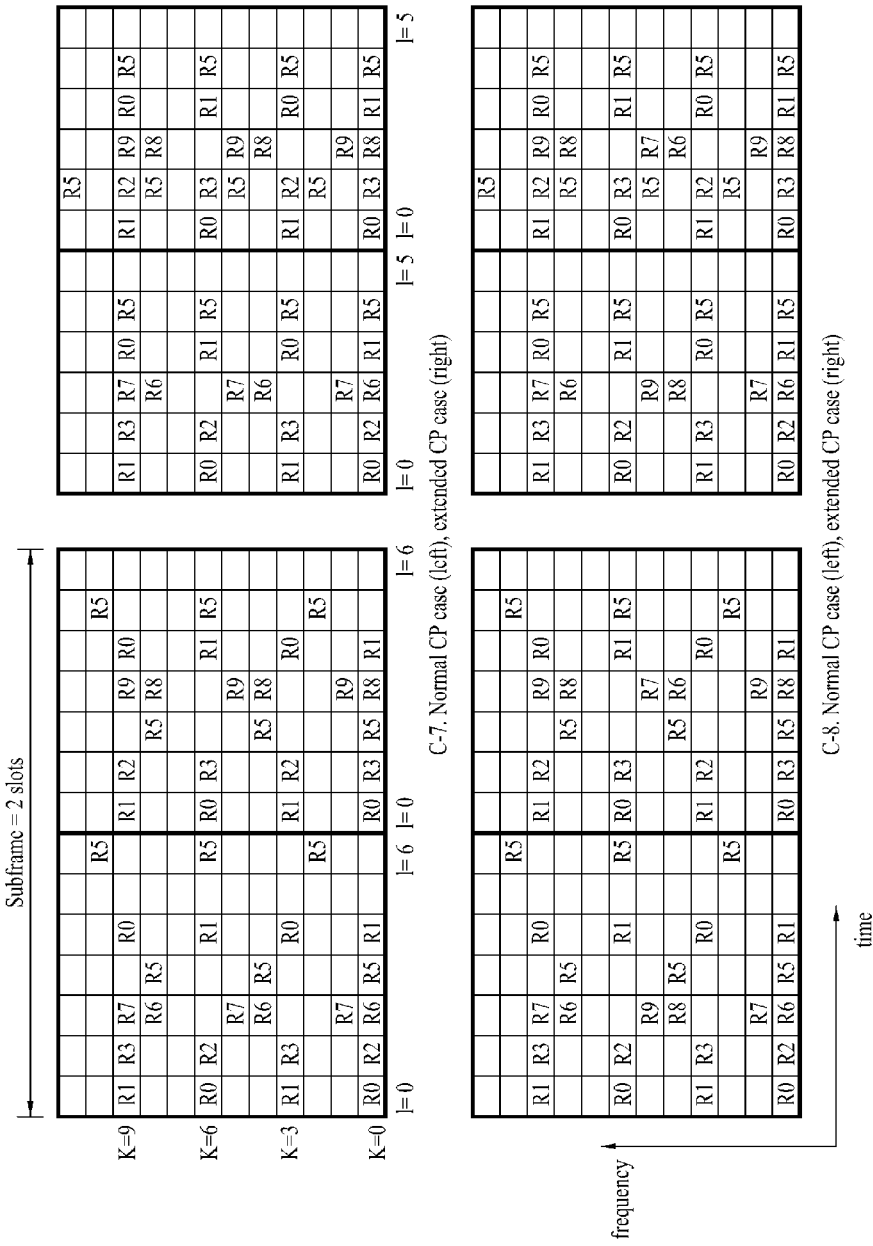

C-7 Pattern (FIG. 38)

| | |
|---|---|
| $R6 (1, k)_s = \{(2, 0)_1, (2, 4)_1, (2, 8)_1\};$ | $R7 (1, k)_s = \{(2, 1)_1, (2, 5)_1, (2, 9)_1\}$ |
| $R8 (1, k)_s = \{(3, 0)_2, (3, 4)_2, (3, 8)_2\};$ | $R9 (1, k)_s = \{(3, 1)_2, (3, 5)_2, (3, 9)_2\}$ |

C-8 Pattern (FIG. 38)

| | |
|---|---|
| $R6 (1, k)_s = \{(2, 0)_1, (2, 8)_1, (3, 4)_2\};$ | $R7 (1, k)_s = \{(2, 1)_1, (2, 9)_1, (3, 5)_2\}$ |
| $R8 (1, k)_s = \{(2, 4)_1, (3, 0)_2, (3, 8)_2\};$ | $R9 (1, k)_s = \{(2, 5)_1, (3, 1)_2, (3, 9)_2\}$ |

Figure 39:
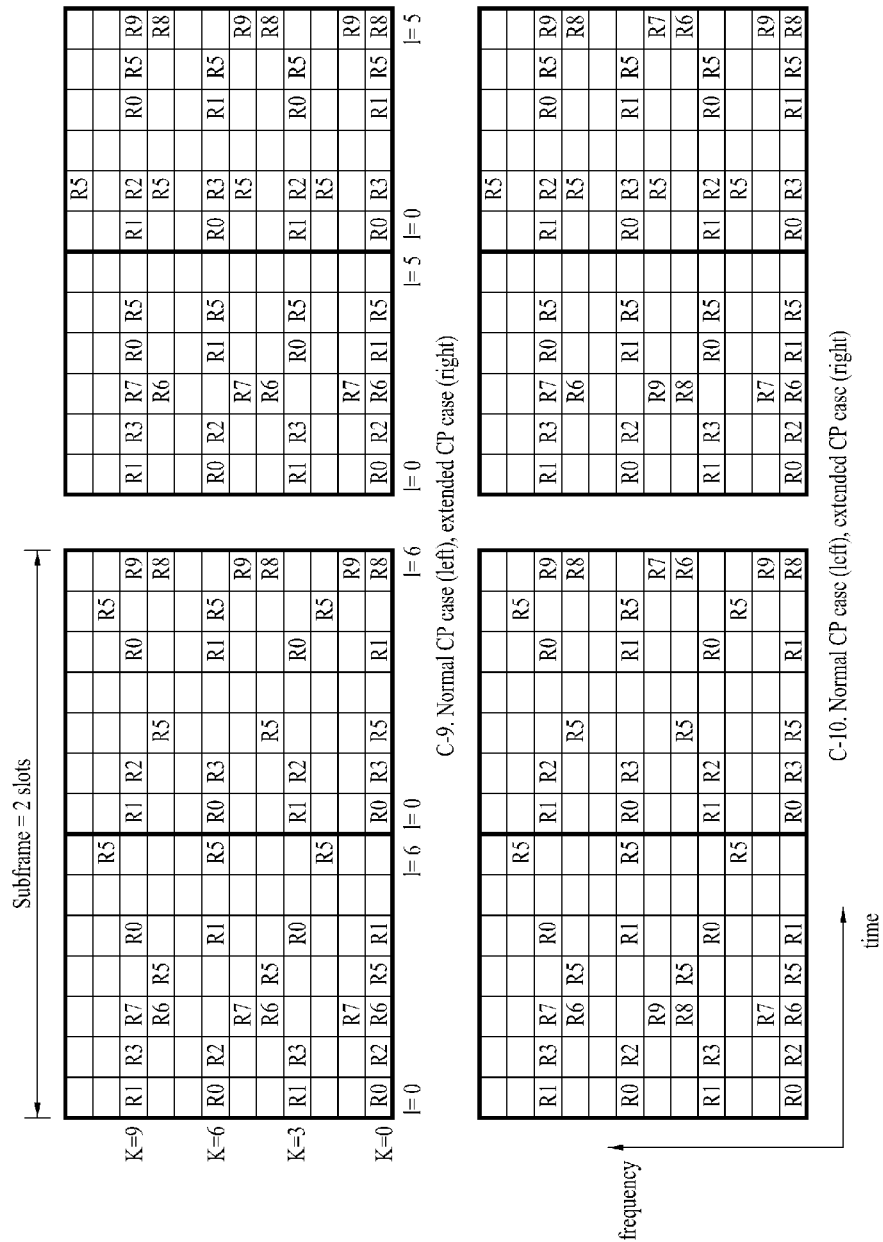

C-9 Pattern (FIG. 39)

| | |
|---|---|
| $R6\ (1, k)_s = \{(2, 0)_1, (2, 4)_1, (2, 8)_1\};$ | $R7\ (1, k)_s = \{(2, 1)_1, (2, 5)_1, (2, 9)_1\}$ |
| $R8\ (1, k)_s = \{(6, 0)_2, (6, 4)_2, (6, 8)_2\};$ | $R9\ (1, k)_s = \{(6, 1)_2, (6, 5)_2, (6, 9)_2\}$ |

C-10 Pattern (FIG. 39)

| | |
|---|---|
| $R6\ (1, k)_s = \{(2, 0)_1, (2, 8)_1, (6, 4)_2\};$ | $R7\ (1, k)_s = \{(2, 1)_1, (2, 9)_1, (6, 5)_2\}$ |
| $R8\ (1, k)_s = \{(2, 4)_1, (6, 0)_2, (6, 8)_2\};$ | $R9\ (1, k)_s = \{(2, 5)_1, (6, 1)_2, (6, 9)_2\}$ |

Figure 40:
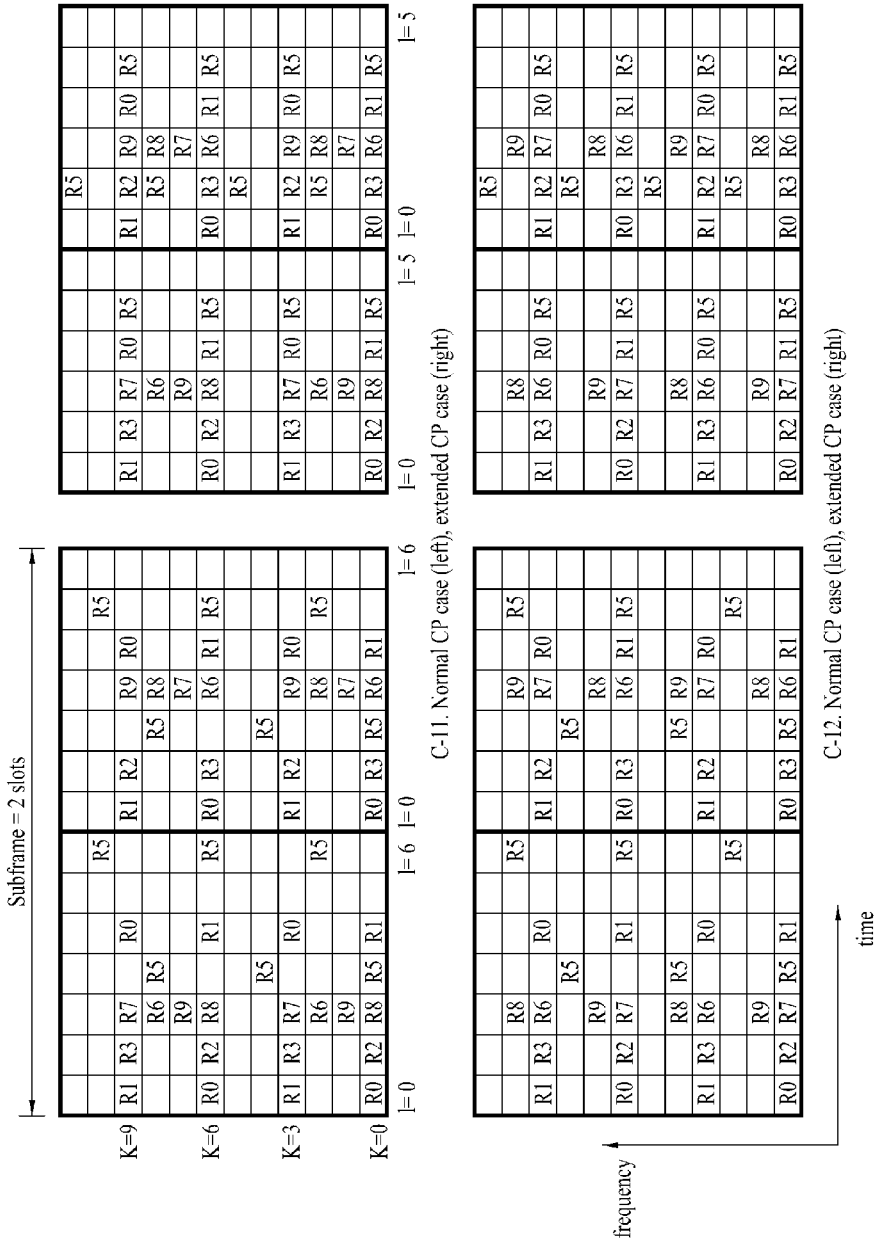

C-11 Pattern (FIG. 40)

| | |
|---|---|
| $R6\ (1, k)_s = \{(2, 2)_1, (2, 8)_1, (3, 0)_2, (3, 6)_2\};$ | $R7\ (1, k)_s = \{(2, 3)_1, (2, 9)_1, (3, 1)_2, (3, 7)_2\}$ |
| $R8\ (1, k)_s = \{(2, 0)_1, (2, 6)_1, (3, 2)_2, (3, 8)_2\};$ | $R9\ (1, k)_s = \{(2, 1)_1, (2, 7)_1, (3, 3)_2, (3, 9)_2\}$ |

C-12 Pattern (FIG. 40)

| | |
|---|---|
| $R6\ (1, k)_s = \{(2, 3)_1, (2, 9)_1, (3, 0)_2, (3, 6)_2\};$ | $R7\ (1, k)_s = \{(2, 0)_1, (2, 6)_1, (3, 3)_2, (3, 9)_2\}$ |
| $R8\ (1, k)_s = \{(2, 4)_1, (2, 10)_1, (3, 1)_2, (3, 7)_2\};$ | $R9\ (1, k)_s = \{(2, 1)_1, (2, 7)_1, (3, 4)_2, (3, 10)_2\}$ |

Figure 41:
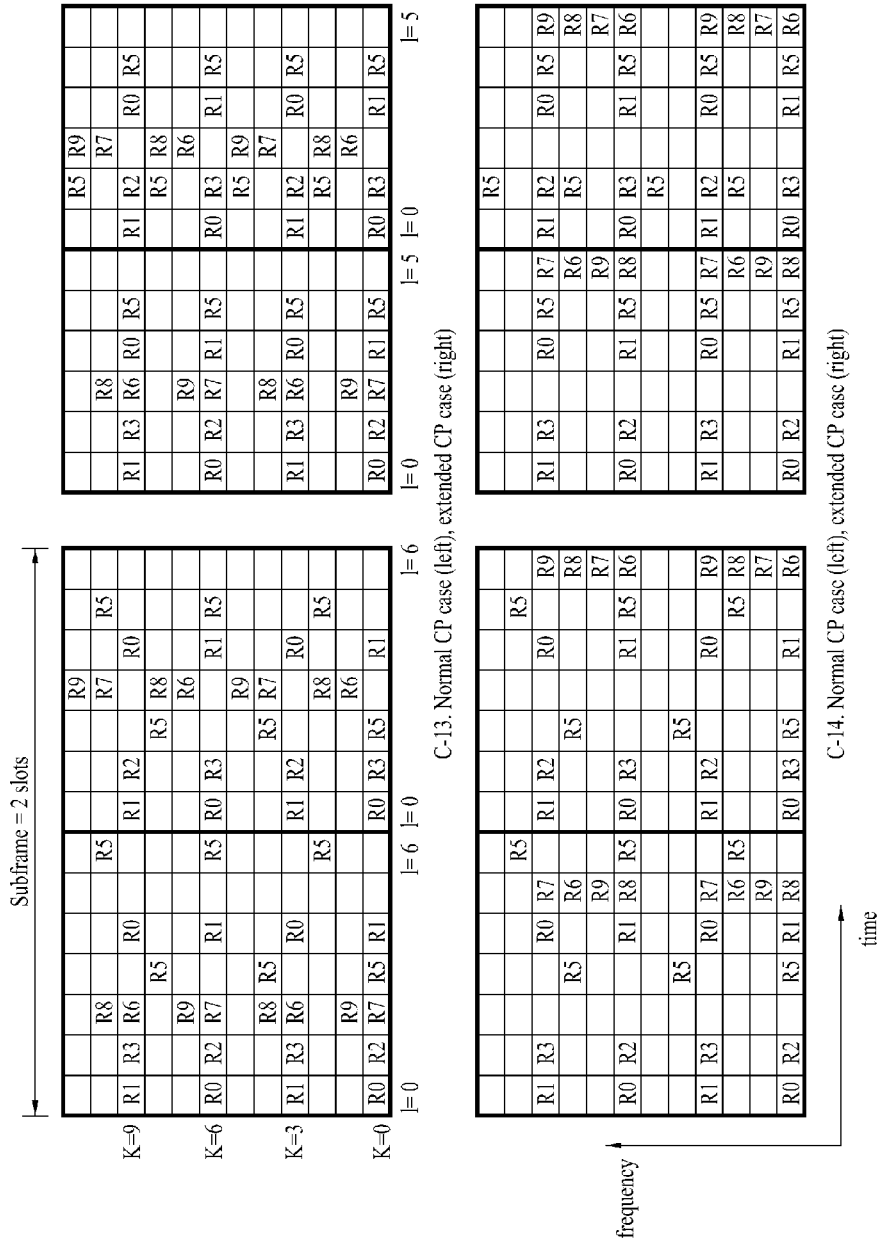

C-13 Pattern (FIG. 41)

| | |
|---|---|
| $R6\ (1, k)_s = \{(2, 3)_1, (2, 9)_1, (3, 1)_2, (3, 7)_2\};$ | $R7\ (1, k)_s = \{(2, 0)_1, (2, 6)_1, (3, 4)_2, (3, 10)_2\}$ |
| $R8\ (1, k)_s = \{(2, 4)_1, (2, 10)_1, (3, 2)_2, (3, 8)_2\};$ | $R9\ (1, k)_s = \{(2, 1)_1, (2, 7)_1, (3, 5)_2, (3, 11)_2\}$ |

C-14 Pattern (FIG. 41)

| | |
|---|---|
| $R6\ (1, k)_s = \{(5, 2)_1, (5, 8)_1, (6, 0)_2, (6, 6)_2\};$ | $R7\ (1, k)_s = \{(5, 3)_1, (5, 9)_1, (6, 1)_2, (6, 7)_2\}$ |
| $R8\ (1, k)_s = \{(5, 0)_1, (5, 6)_1, (6, 2)_2, (6, 8)_2\};$ | $R9\ (1, k)_s = \{(5, 1)_1, (5, 7)_1, (6, 3)_2, (6, 9)_2\}$ |

Figure 42:
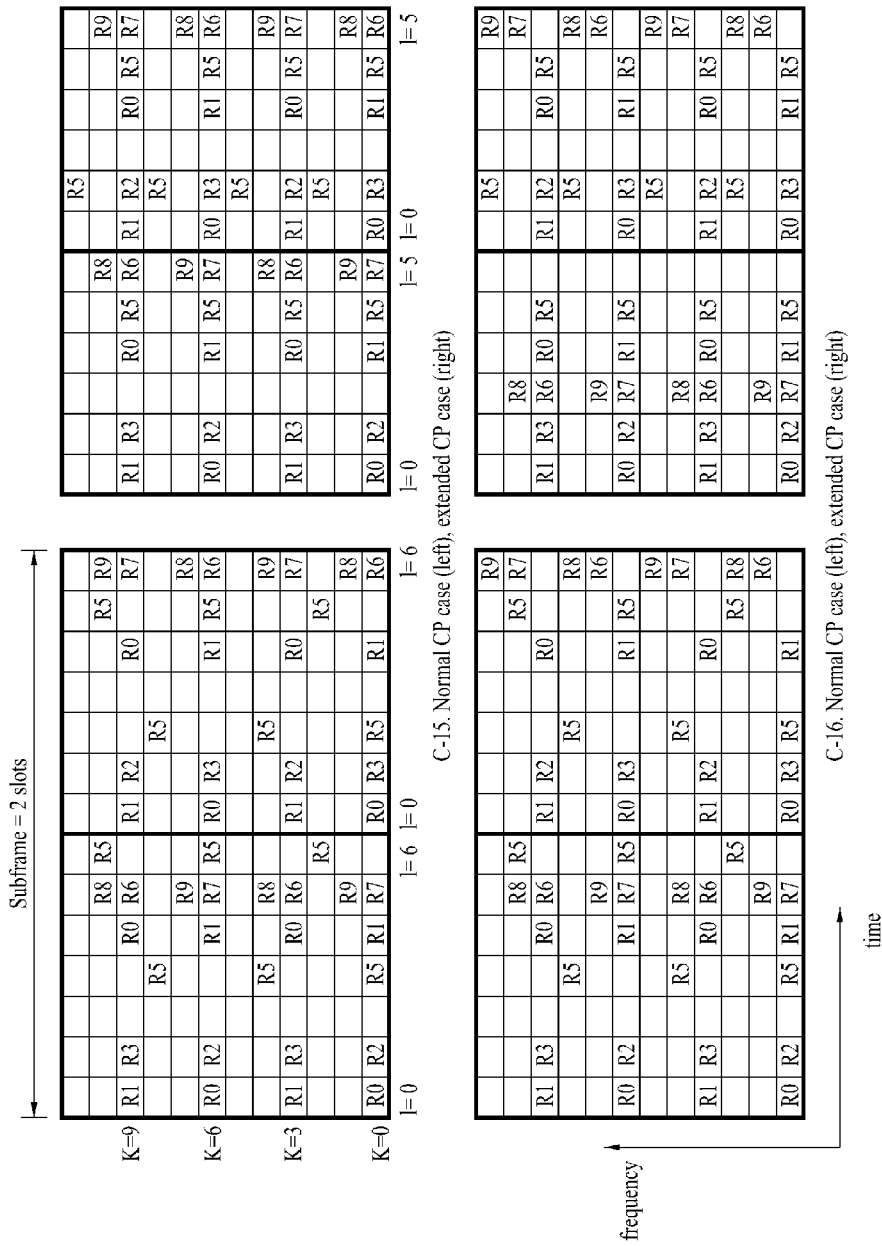

C-15 Pattern (FIG. 42)

| | |
|---|---|
| $R6\ (1, k)_s = \{(5, 3)_1, (5, 9)_1, (6, 0)_2, (6, 6)_2\};$ | $R7\ (1, k)_s = \{(5, 0)_1, (5, 6)_1, (6, 3)_2, (6, 9)_2\}$ |
| $R8\ (1, k)_s = \{(5, 4)_1, (5, 10)_1, (6, 1)_2, (6, 7)_2\};$ | $R9\ (1, k)_s = \{(5, 1)_1, (5, 7)_1, (6, 4)_2, (6, 10)_2\}$ |

C-16 Pattern (FIG. 42)

| | |
|---|---|
| $R6\ (1, k)_s = \{(5, 3)_1, (5, 9)_1, (6, 1)_2, (6, 7)_2\};$ | $R7\ (1, k)_s = \{(5, 0)_1, (5, 6)_1, (6, 4)_2, (6, 10)_2\}$ |
| $R8\ (1, k)_s = \{(5, 4)_1, (5, 10)_1, (6, 2)_2, (6, 8)_2\};$ | $R9\ (1, k)_s = \{(5, 1)_1, (5, 7)_1, (6, 5)_2, (6, 11)_2\}$ |

Figure 43:
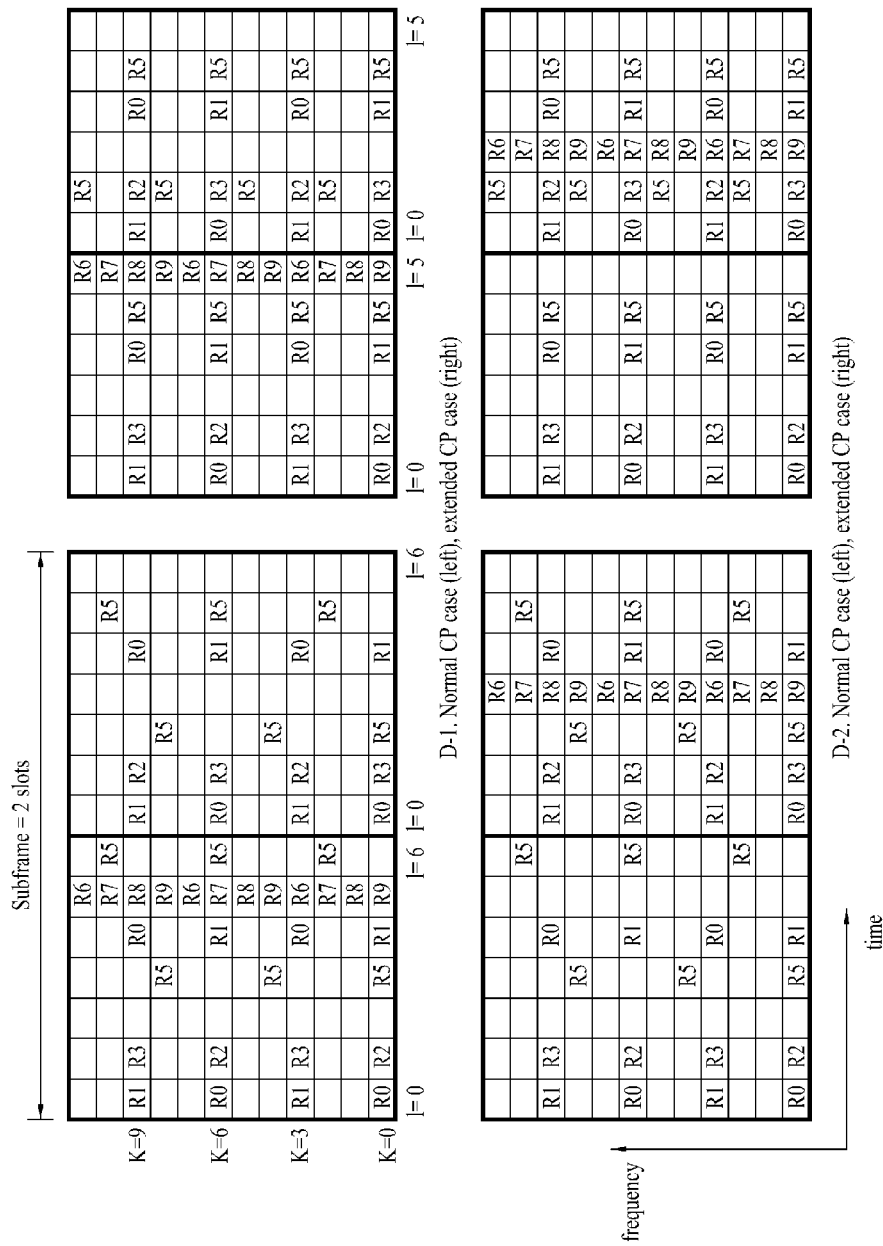
FIG. 43 and FIG. 44 exemplarily show a method of allocating RSs for antennas #4 to #7 on PDSCH using 1 OFDM symbol in addition.
Figure 44:
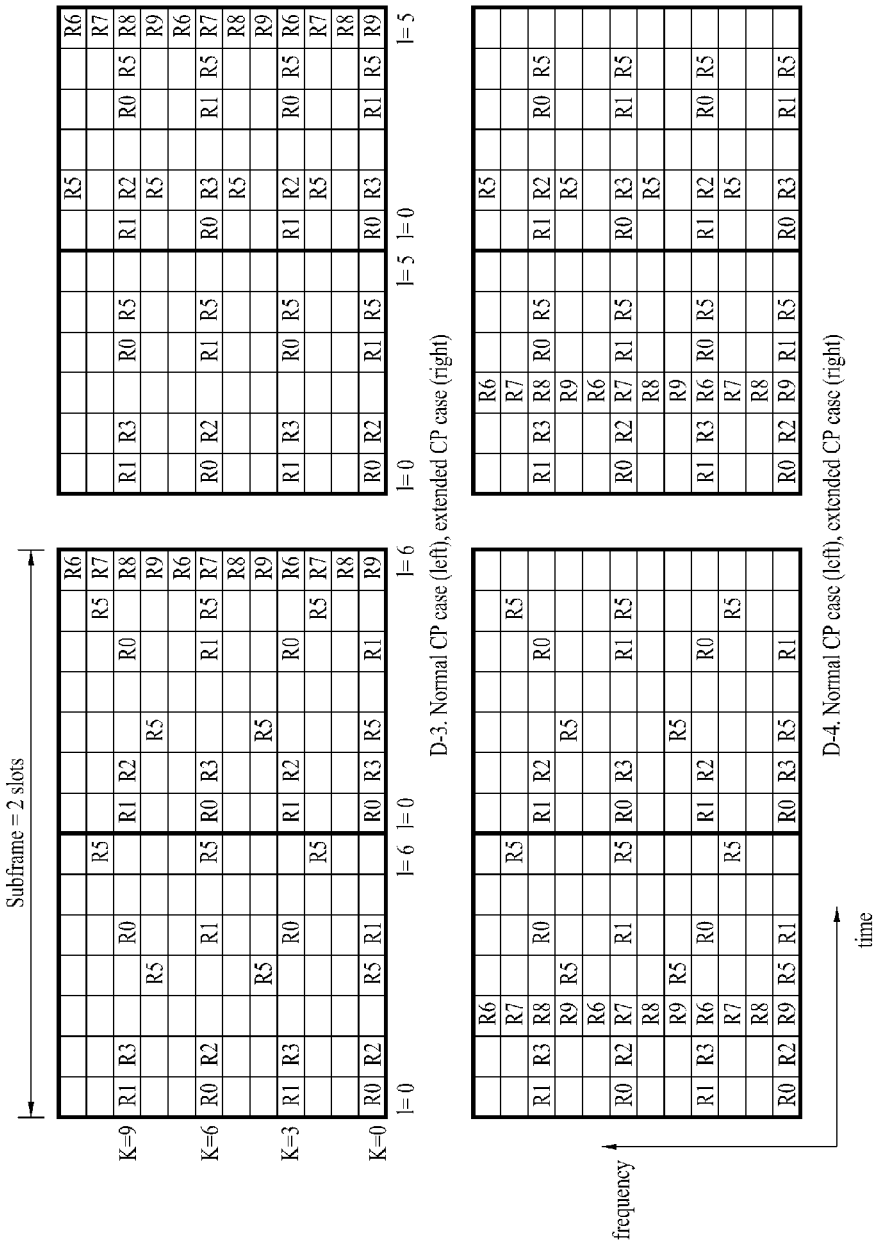

FIG. 43 and FIG. 44 show examples of allocating RS for antenna ports 6~9 (R6~R9) using 1 OFDM symbol in addition. In the drawings, a left part indicates a case of using a normal CP, while a right part indicates a case of using an extended CP.

Patterns D-1 to D-4 are designed to maintain a 4-space interval on a frequency axis for an extended antenna port. In particular, each of the pattern D-1 and the pattern D-3 shows a case that a control region includes first 3 OFDM symbols of a subframe. In this case, since the third OFDM symbol in the subframe is used as a resource of the control region, the RSs for the extended antenna port can be allocated in a manner of starting with the first $6^{th}$ OFDM symbol of the subframe. In case that the control region includes first 2 OFDM symbols or less, all of the patterns D-1 to D-4 are applicable.

In the patterns D-1 to D-4, positions of the extended antenna ports 6~9 (R6~R9) can be switched to one another. Moreover, v_shift(v_shift=cell_id mod 3) applied to the previous antenna port 5 and the position shift on the frequency axis used to reduce inter-cell RS interference can be identically applicable to the RS for the extended antenna port. In particular, the pattern D-1 shows a case that a control region includes first 3 OFDM symbols of a subframe. In this case, since the third OFDM symbol in the subframe is used as a resource of the control region, the RSs for the extended antenna port can be allocated in a manner of starting with the first $6^{th}$ OFDM symbol of the subframe. In case that the control region includes first 2 OFDM symbols or less, all of the patterns D-1 to D-4 are applicable.

The RS positions of R6~R9 according to the patterns D-1 to D-4 can be represented as follows. For clarity, position of RS for a normal CP is indicated only. The case of an extended CP has the same RS overhead and pattern of the case of the normal CP. As the number of OFDM symbols in a subframe varies, the position of the RS allocated OFDM symbols varies only.

The following tables correspond to the pattern D-1 (FIG. 43), the pattern D-2 (FIG. 43), the pattern D-3 (FIG. 44), and the pattern D-4 (FIG. 44), respectively.

D-1 Pattern (FIG. 43)

| | |
|---|---|
| $R6\ (1, k)_s = \{(5, 3)_1, (5, 7)_1, (5, 11)_1\};$ | $R7\ (1, k)_s = \{(5, 2)_1, (5, 6)_1, (5, 10)_1\}$ |
| $R8\ (1, k)_s = \{(5, 1)_1, (5, 5)_1, (5, 9)_1\};$ | $R9\ (1, k)_s = \{(5, 0)_1, (5, 4)_1, (5, 8)_1\}$ |

D-2 Pattern (FIG. 43)

| | |
|---|---|
| $R6\ (1, k)_s = \{(3, 3)_2, (3, 7)_2, (3, 11)_2\};$ | $R7\ (1, k)_s = \{(3, 2)_2, (3, 6)_2, (3, 10)_2\}$ |
| $R8\ (1, k)_s = \{(3, 1)_2, (3, 5)_2, (3, 9)_2\};$ | $R9\ (1, k)_s = \{(3, 0)_2, (3, 4)_2, (3, 8)_2\}$ |

D-3 Pattern (FIG. 44)

| | |
|---|---|
| $R6\ (1, k)_s = \{(6, 3)_2, (6, 7)_2, (6, 11)_2\};$ | $R7\ (1, k)_s = \{(6, 2)_2, (6, 6)_2, (6, 10)_2\}$ |
| $R8\ (1, k)_s = \{(6, 1)_2, (6, 5)_2, (6, 9)_2\};$ | $R9\ (1, k)_s = \{(6, 0)_2, (6, 4)_2, (6, 8)_2\}$ |

D-4 Pattern (FIG. 44)

| | |
|---|---|
| $R6\ (1, k)_s = \{(2, 3)_1, (2, 7)_1, (2, 11)_1\};$ | $R7\ (1, k)_s = \{(2, 2)_1, (2, 6)_1, (2, 10)_1\}$ |
| $R8\ (1, k)_s = \{(2, 1)_1, (2, 5)_1, (2, 9)_1\};$ | $R9\ (1, k)_s = \{(2, 0)_1, (2, 4)_1, (2, 8)_1\}$ |

Figure 45:
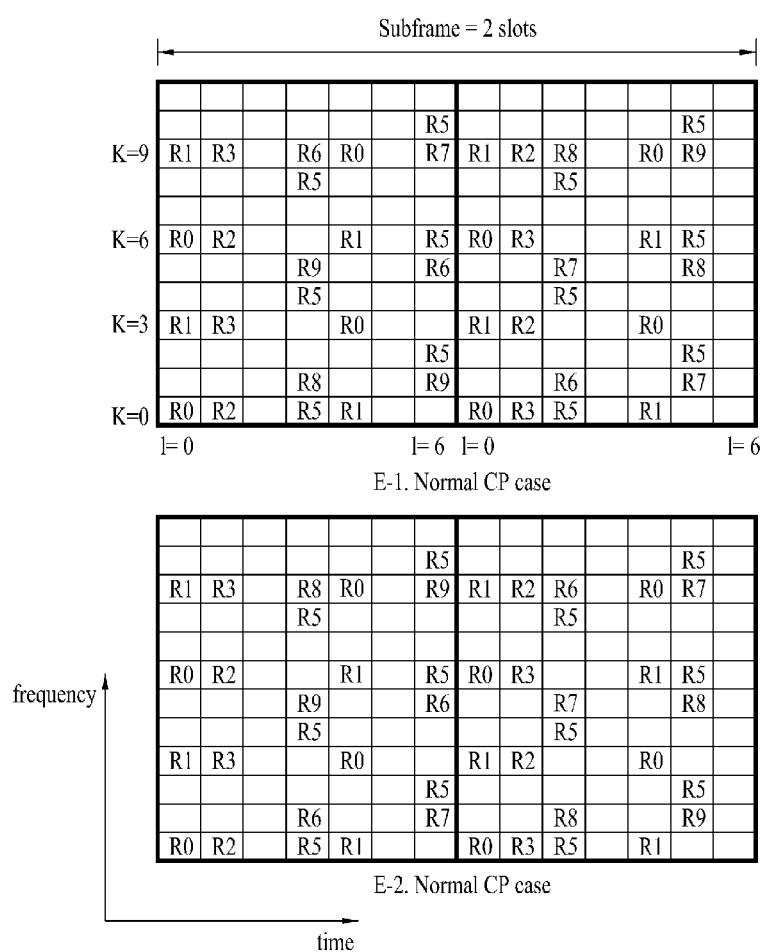
FIG. 45 exemplarily shows a method of allocating RSs for antennas #4 to #7 on PDSCH in addition using OFDM symbol to which RS for antennas #0 to #3 is allocated.

FIG. 45 shows one example of allocating RSs for extended antenna ports 6~9 (R6~R9) using previously RS allocated OFDM symbols.

A pattern E-1 and a pattern E-2 are designed to maintain a 4-space interval on a frequency axis for an extended antenna port and indicates a case that RSs for antenna ports are allocated over 3 OFDM symbols to reflect channel variation on a time axis.

The positions of the extended antenna ports 6~9 (R6~R9) according to the pattern E-1 and the pattern E-2 can be switched to one another. Moreover, the case of an extended CP has the same RS overhead and pattern of the case of the normal CP. As the number of OFDM symbols in a subframe varies, the position of the RS allocated OFDM symbols varies only.

The following tables correspond to the pattern E-1 (FIG. 45) and the pattern E-2 (FIG. 45), respectively.

E-1 Pattern (FIG. 45)

| | |
|---|---|
| $R6 (1, k)_s = \{(3, 9)_1, (6, 5)_1, (2, 1)_2\};$ | $R7 (1, k)_s = \{(6, 9)_1, (2, 5)_2, (5, 1)_2\}$ |
| $R8 (1, k)_s = \{(3, 1)_1, (2, 9)_2, (5, 5)_2\};$ | $R9 (1, k)_s = \{(3, 5)_1, (6, 1)_1, (5, 9)_2\}$ |

E-2 Pattern (FIG. 45)

| | |
|---|---|
| $R6 (1, k)_s = \{(3, 1)_1, (6, 5)_1, (2, 9)_2\};$ | $R7 (1, k)_s = \{(6, 1)_1, (2, 5)_2, (5, 9)_2\}$ |
| $R8 (1, k)_s = \{(3, 9)_1, (2, 1)_2, (5, 5)_2\};$ | $R9 (1, k)_s = \{(3, 5)_1, (6, 9)_1, (5, 1)_2\}$ |

The patterns A~E according to the embodiment of the present invention show the case of multiplexing RSs for 4 extended antennas in forms of FDM and TDM. Yet, the formerly described RS patterns are just exemplary. And, it is able to multiplex subsets of resource for allocating RSs for the antenna ports 6~9 in form of CDM. For instance, referring to the pattern A-1, it can be observed that total 6 REs are used for the RS of the antenna port #6 and the RS of the antenna port #8 [i.e., 3 each]. In this case, by allocating 6 RSs to the 6 REs for each of the antenna port 6 and the antenna port 8 doubly and allocating a different code or sequence to each of the antenna ports, RSs for the extended antenna can be multiplexed in form of CDM. Moreover, it is able to multiplex the RS for the extended antenna using all of the REs to which the RSs for the extended antenna are allocated. For instance, referring to the pattern A-1, it can be observed that total 12 REs are used for RSs of the antenna ports 6~9 [i.e., 3 each]. In this case, by allocating 12 RSs to the 12 REs for each of the antenna ports doubly and allocating a different code or sequence to each of the antenna ports, RSs for the 4 extended antennas can be multiplexed in form of CDM. Moreover, the scheme of multiplexing the RS for the extended antenna by CDM is applicable to all the patterns A~E.

The detailed example 4 is utilized to transmit RSs for the antennas #4 to #7 independently and is usable in addition to the RS transmitting scheme mentioned in the description of the detailed example 1.

For instance, it is able to consider using both of the method of the detailed example 1 and the method of the detailed example 4 for the antennas to transmit the RSs for the antennas #4 to #8 together. For instance, it is able to consider a method of transmitting RS in a manner of allocating reserved CCEs of PDCCH in case of the RSs for the antenna #4 and the antenna #5 and using additional OFDM symbol in a downlink data channel or predetermined RB in a frequency domain in case of the RSs for the antenna #6 and the antenna #7. In a similar manner, there is a method of transmitting RS in a manner of allocating reserved CCE of PDCCH for RS of a specific antenna and allocating OFDM symbol in the downlink data channel or predetermined RB in frequency domain of LTE Rel-8 according to the detailed example 4 for RS of the rest of the antennas.

For another instance, it is able to consider a method of allocating RSs for antennas #4 to #7 per subframe in a manner of allocating the RSs for the antennas #4 to #7 to a specific subframe and allocating the RSs to OFDM symbol in a DL data channel, predetermined RB in a frequency domain, or a subframe uniquely used for LTE-A after a predetermined period by FDM, TDM or CDM among antennas.

Detailed Example 5

Using RS Pattern of Antenna Port 5 as RS Resource for Antennas #4 to #7

In case that an RS pattern for classical beamforming is applied to RSs of antennas #4 to #7, proposed is a method of reusing the RS pattern of the antenna port 5 defined in LTE Rel-8 or a symbol used by the antenna port 5 intactly for the RSs for the antennas #4 to #7 of LTE-A on the assumption that the antenna port 5 is not used for the classical beamforming. Multiplexing can be performed by TDM, FDM or CDM scheme among antennas #4 to #7 with the same density. Moreover, the method of the detailed example 5 relates to a method of applying RS to antennas #4 to #7 and can be considered as a method additional to the detailed example 1 in the same manner of the detailed example 5. And, the method according to the detailed example 5 proposes RS to be usable as CSI-RS for channel measurement or DM-RS for data demodulation.

For instance, it is able to consider using both of the method according to the detailed example 1 and the method according to the detailed example 5 among antennas to transmit RSs for the antennas #4 to #7 together. For example, reserved CCE on PDCCH is allocated in case of the RSs for the antenna #4 and the antenna #5. The RS pattern of the antenna port 5 is reusable for the antenna #6 and the antenna #7 intactly in case of the RSs for the antenna #6 and the antenna #7. And, OFDM symbol used by the antenna port 5 is reusable for the antenna #6 and the antenna #7. In a similar form, the reserved CCE of PDCCH is allocated to RS of a specific antenna and the method according to the detailed example 5 is usable for RSs of the rest of the antennas.

For another instance, RSs for antennas #4 to #7 are allocated to a PDCCH allocated region of a specific subframe, as proposed in the detailed example 1, per subframe. After a predetermined period for transmitting RS, the RS pattern of the antenna port 5 in the downlink data channel is reused for the RSs for the antennas #4 to #7 intactly or the OFDM symbol used by the antenna port 5 is reusable. The RSs for the antennas #4 to #7 in the subframe can be allocated in form of FDM, TDM or CDM among antennas.

Figure 46:
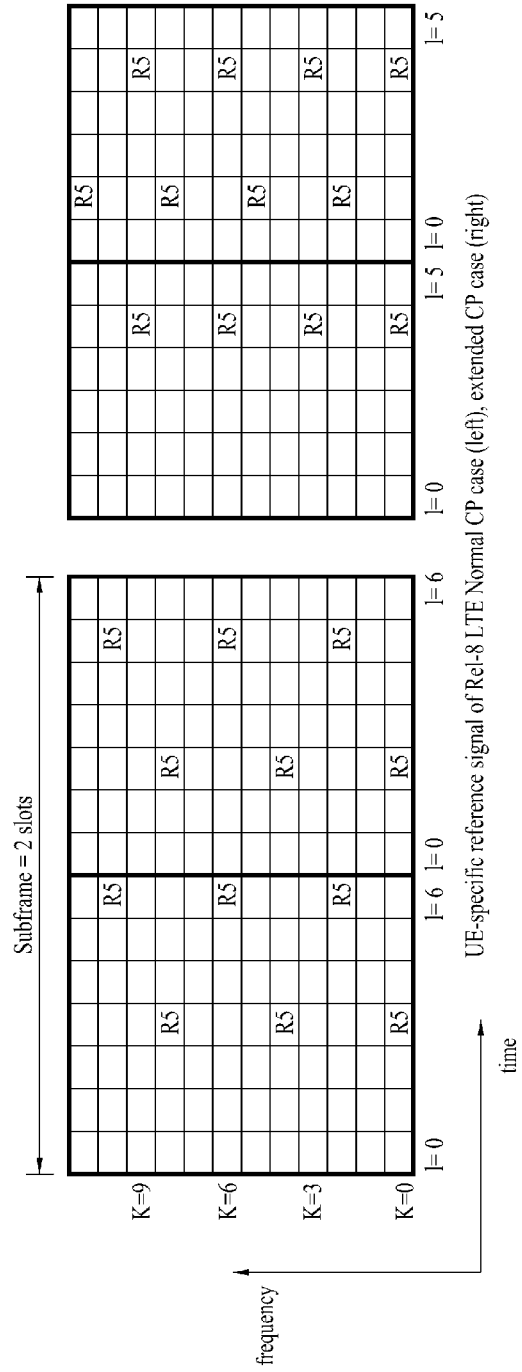
FIG. 46 shows a pattern of RS for an antenna port 5 within a subframe.

FIG. 46 shows a pattern of RS for an antenna port 5 within a subframe. LTE Rel-8 defines to use an antenna port 5 in a closed loop rank 1 transmission mode. In the drawing, a box represented by a bold line indicates a resource block and each space indicates a resource element (RE) defined by one OFDM symbol and one subcarrier. An allocation pattern of RS for the antenna port 5 can refer to Table 9 and Table 10 together.

In the following description, a case of allocating RS for an extended antenna port by reusing RS pattern of an antenna port 5 is explained in detail. As resource elements occupied by the antenna port 5 defined by LTE Rel-8 are reused, a new system (e.g., LTE-A) evolved from LTE Rel-8 is able to maintain backward compatibility with LTE Rel-8 despite having an extended antenna structure.

Patterns P-1 to P-8 are designed to enable RSs for an extended antenna port to maintain a 4-space interval in-between on a frequency axis. The patterns P-1 to P-4 exemplarily shows a case of using a normal CP. In particular, the pattern P-1 corresponds to a case that RSs for each extended antenna port are allocated to one OFDM symbol. The pattern p-2 shows a case that RSs for each antenna port are allocated across 2 OFDM symbols to reflect channel variation on a time axis. Each of the pattern P-3 and the pattern P-4 has a hybrid configuration of the pattern P-1 and the pattern P-2. Meanwhile, the patterns P-5 to P-8 exemplarily show a case of using an extended CP. The patterns P-5 to P-8 show cases that RSs for each antenna port are allocated across 3 OFDM symbols to reflect channel variation on a time axis, respectively.

In the patterns P-1 to P-8, positions of the extended antenna ports 6~9 (R6~R9) can be switched to one another. Moreover, v_shift(v_shift=cell_id mod 3) applied to the previous antenna port 5 and the position shift on the frequency axis used to reduce inter-cell RS interference can be identically applicable to the RS for the extended antenna port.

Figure 47:
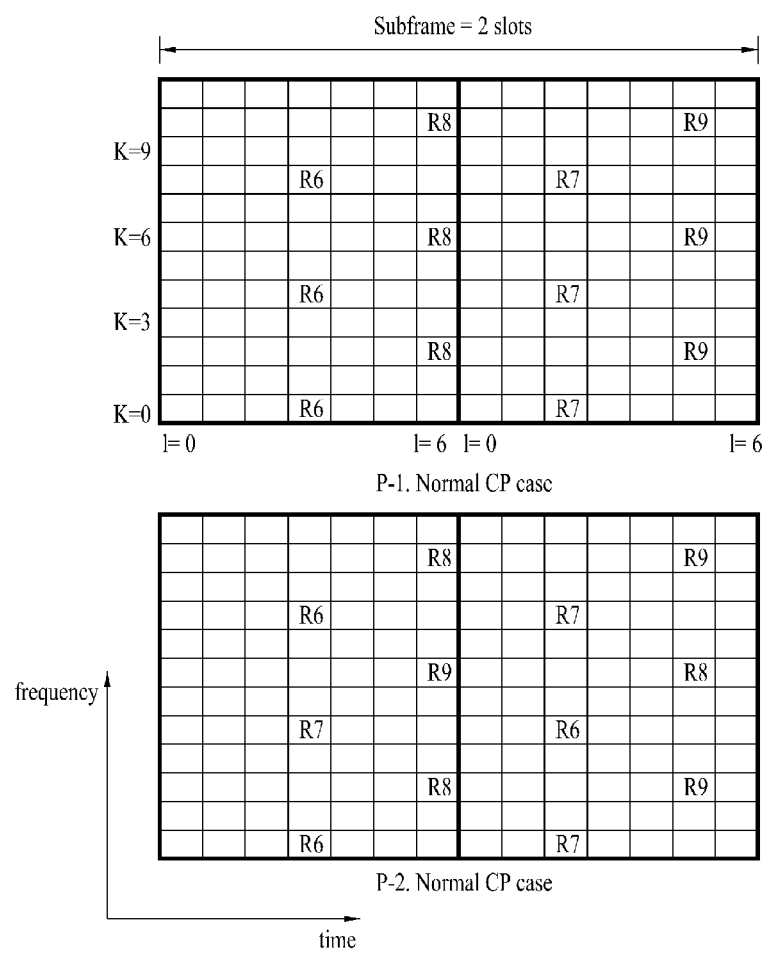
FIGS. 47 to 52 show a method of allocating RSs for antennas #4 to #7 by reusing the RS pattern of an antenna port 5.

The following tables correspond to the pattern P-1 (FIG. 47), the pattern P-2 (FIG. 48), the pattern P-3 (FIG. 48), the pattern P-4 (FIG. 48), the pattern P-5-1 (FIG. 49), the pattern P-5-2 (FIG. 49), the pattern P-5-3 (FIG. 49), the pattern P-6-1 (FIG. 50), the pattern P-6-2 (FIG. 50), the pattern P-6-3 (FIG. 50), the pattern P-7-1 (FIG. 51), the pattern P-7-2 (FIG. 51), the pattern P-7-3 (FIG. 51), the pattern P-8-1 (FIG. 52), the pattern P-8-2 (FIG. 52), and the pattern P-8-3 (FIG. 52), respectively.

P-1 Pattern (FIG. 47)
P-1 패턴 (도 47)

| | |
|---|---|
| $R6 (1, k)_s = \{(3, 0)_1, (3, 4)_1, (3, 8)_1\};$ | $R7 (1, k)_s = \{(2, 0)_2, (2, 4)_2, (2, 8)_2\}$ |
| $R8 (1, k)_s = \{(6, 2)_1, (6, 6)_1, (6, 10)_1\};$ | $R9 (1, k)_s = \{(5, 2)_2, (5, 6)_2, (5, 10)_2\}$ |

P-2 패턴 (도 48)

| | |
|---|---|
| $R6 (1, k)_s = \{(3, 0)_1, (3, 8)_1, (2, 4)_2\};$ | $R7 (1, k)_s = \{(3, 4)_1, (2, 0)_2, (2, 8)_2\}$ |
| $R8 (1, k)_s = \{(6, 2)_1, (6, 10)_1, (5, 6)_2\};$ | $R9 (1, k)_s = \{(6, 6)_1, (5, 2)_2, (5, 10)_2\}$ |

P-3 패턴 (도 48)
P-2 Pattern (FIG. 48)
P-1 패턴 (도 47)

| | |
|---|---|
| $R6 (1, k)_s = \{(3, 0)_1, (3, 4)_1, (3, 8)_1\};$ | $R7 (1, k)_s = \{(2, 0)_2, (2, 4)_2, (2, 8)_2\}$ |
| $R8 (1, k)_s = \{(6, 2)_1, (6, 6)_1, (6, 10)_1\};$ | $R9 (1, k)_s = \{(5, 2)_2, (5, 6)_2, (5, 10)_2\}$ |

P-2 패턴 (도 48)

| | |
|---|---|
| $R6 (1, k)_s = \{(3, 0)_1, (3, 8)_1, (2, 4)_2\};$ | $R7 (1, k)_s = \{(3, 4)_1, (2, 0)_2, (2, 8)_2\}$ |
| $R8 (1, k)_s = \{(6, 2)_1, (6, 10)_1, (5, 6)_2\};$ | $R9 (1, k)_s = \{(6, 6)_1, (5, 2)_2, (5, 10)_2\}$ |

Figure 48:
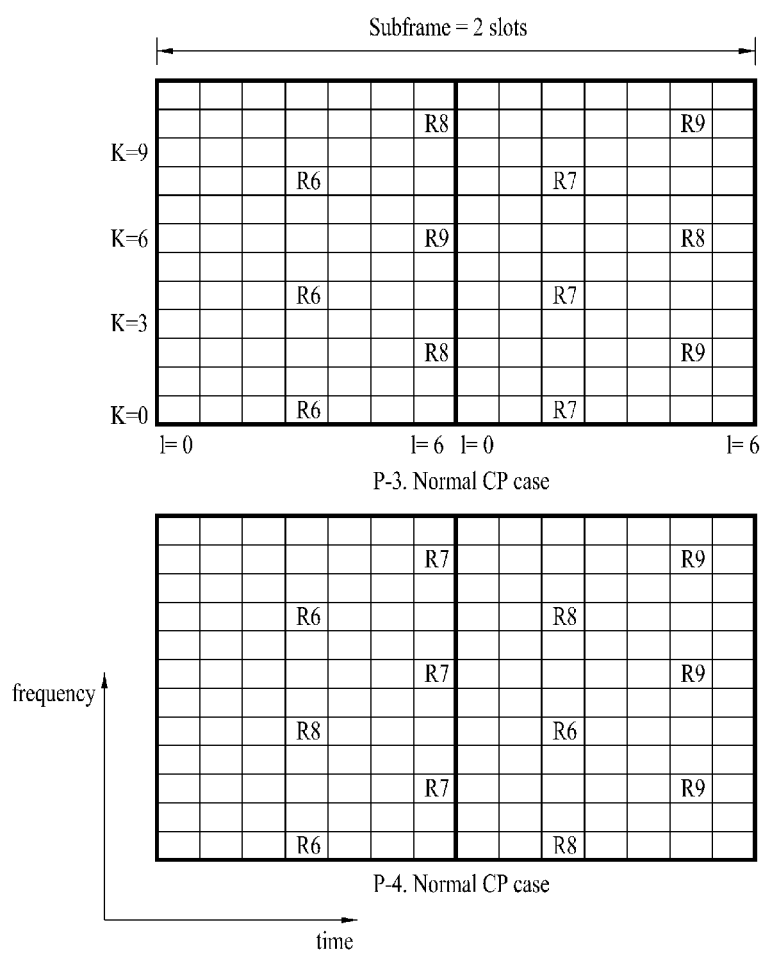

P-3 패턴 (도 48)
P-3 Pattern (FIG. 48)

| | |
|---|---|
| $R6 (1, k)_s = \{(3, 0)_1, (3, 4)_1, (3, 8)_1\};$ | $R7 (1, k)_s = \{(2, 0)_2, (2, 4)_2, (2, 8)_2\}$ |
| $R8 (1, k)_s = \{(6, 2)_1, (6, 10)_1, (5, 6)_2\};$ | $R9 (1, k)_s = \{(6, 6)_1, (5, 2)_2, (5, 10)_2\}$ |

P-4 패턴 (도 48)

| | |
|---|---|
| $R6 (1, k)_s = \{(3, 0)_1, (3, 8)_1, (2, 4)_2\};$ | $R7 (1, k)_s = \{(6, 2)_1, (6, 6)_1, (6, 10)_1\}$ |
| $R8 (1, k)_s = \{(3, 4)_1, (2, 0)_2, (2, 8)_2\};$ | $R9 (1, k)_s = \{(5, 2)_2, (5, 6)_2, (5, 10)_2\}$ |

P-4 Pattern (FIG. 48)

| | |
|---|---|
| $R6 (1, k)_s = \{(3, 0)_1, (3, 4)_1, (3, 8)_1\};$ | $R7 (1, k)_s = \{(2, 0)_2, (2, 4)_2, (2, 8)_2\}$ |
| $R8 (1, k)_s = \{(6, 2)_1, (6, 10)_1, (5, 6)_2\};$ | $R9 (1, k)_s = \{(6, 6)_1, (5, 2)_2, (5, 10)_2\}$ |

P-4 패턴 (도 48)

| | |
|---|---|
| $R6 (1, k)_s = \{(3, 0)_1, (3, 8)_1, (2, 4)_2\};$ | $R7 (1, k)_s = \{(6, 2)_1, (6, 6)_1, (6, 10)_1\}$ |
| $R8 (1, k)_s = \{(3, 4)_1, (2, 0)_2, (2, 8)_2\};$ | $R9 (1, k)_s = \{(5, 2)_2, (5, 6)_2, (5, 10)_2\}$ |

Figure 49:
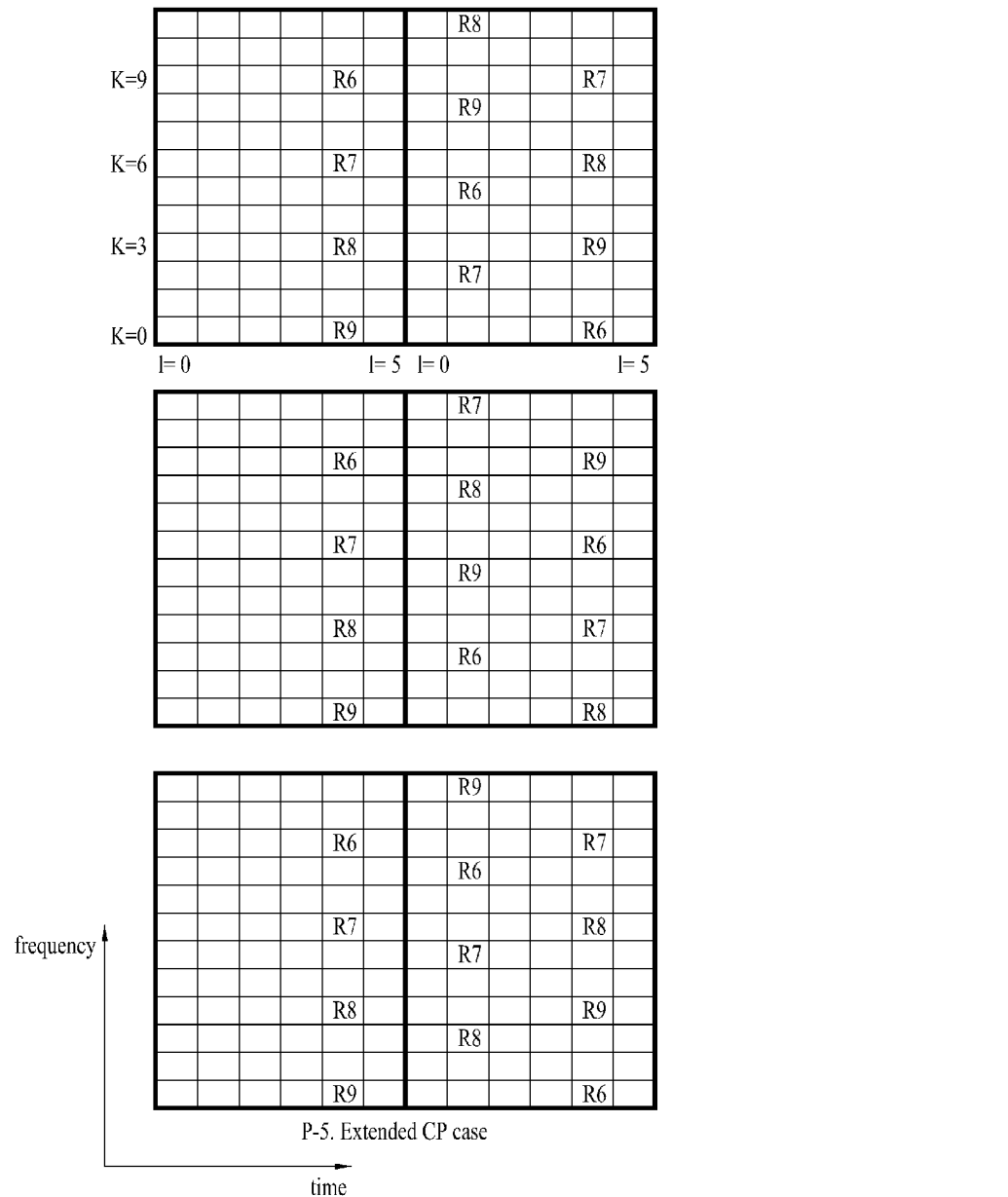

P-5-1 Pattern (FIG. 49)

| | |
|---|---|
| $R6 (1, k)_s = \{(4, 9)_1, (1, 5)_2, (4, 0)_2\};$ | $R7 (1, k)_s = \{(4, 6)_1, (1, 2)_2, (4, 9)_2\}$ |
| $R8 (1, k)_s = \{(4, 3)_1, (1, 11)_2, (4, 6)_2\};$ | $R9 (1, k)_s = \{(4, 0)_1, (1, 8)_2, (4, 3)_2\}$ |

P-5-2 Pattern (FIG. 49)

| | |
|---|---|
| $R6 (1, k)_s = \{(4, 9)_1, (1, 2)_2, (4, 6)_2\};$ | $R7 (1, k)_s = \{(4, 6)_1, (1, 11)_2, (4, 3)_2\}$ |
| $R8 (1, k)_s = \{(4, 3)_1, (1, 8)_2, (4, 0)_2\};$ | $R9 (1, k)_s = \{(4, 0)_1, (1, 5)_2, (4, 9)_2\}$ |

P-5-3 Pattern (FIG. 49)

| | |
|---|---|
| $R6 (1, k)_s = \{(4, 9)_1, (1, 8)_2, (4, 0)_2\};$ | $R7 (1, k)_s = \{(4, 6)_1, (1, 5)_2, (4, 9)_2\}$ |
| $R8 (1, k)_s = \{(4, 3)_1, (1, 2)_2, (4, 6)_2\};$ | $R9 (1, k)_s = \{(4, 0)_1, (1, 11)_2, (4, 3)_2\}$ |

Figure 50:
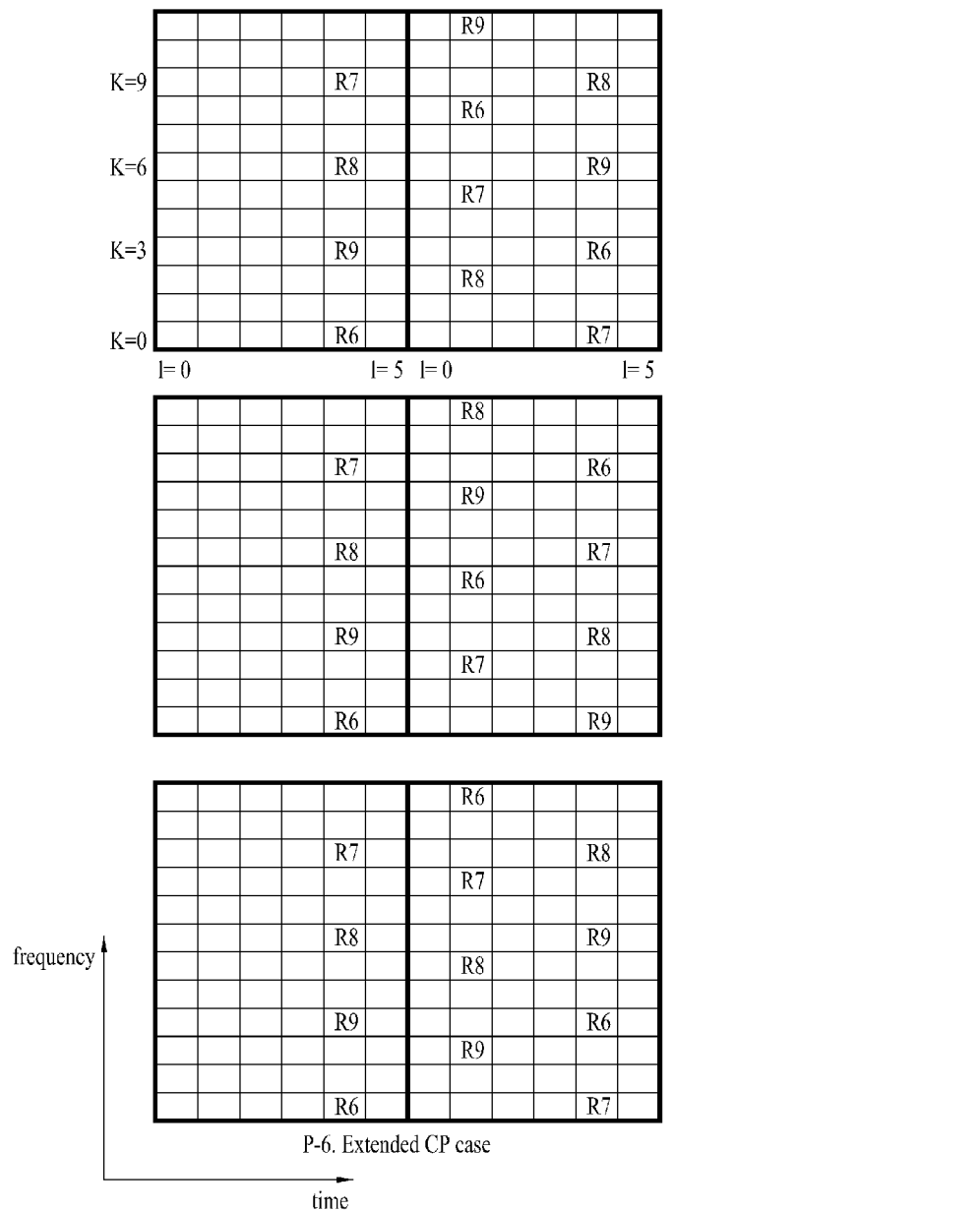

P-6-1 Pattern (FIG. 50)

| | |
|---|---|
| $R6 (1, k)_s = \{(4, 0)_1, (1, 8)_2, (4, 3)_2\};$ | $R7 (1, k)_s = \{(4, 9)_1, (1, 5)_2, (4, 0)_2\}$ |
| $R8 (1, k)_s = \{(4, 6)_1, (1, 2)_2, (4, 9)_2\};$ | $R9 (1, k)_s = \{(4, 3)_1, (1, 11)_2, (4, 6)_2\}$ |

P-6-2 Pattern (FIG. 50)

| | |
|---|---|
| $R6 (1, k)_s = \{(4, 0)_1, (1, 5)_2, (4, 9)_2\};$ | $R7 (1, k)_s = \{(4, 9)_1, (1, 2)_2, (4, 6)_2\}$ |
| $R8 (1, k)_s = \{(4, 6)_1, (1, 11)_2, (4, 3)_2\};$ | $R9 (1, k)_s = \{(4, 3)_1, (1, 8)_2, (4, 0)_2\}$ |

P-6-3 Pattern (FIG. 50)

| | |
|---|---|
| $R6 (1, k)_s = \{(4, 0)_1, (1, 11)_2, (4, 3)_2\};$ | $R7 (1, k)_s = \{(4, 9)_1, (1, 8)_2, (4, 0)_2\}$ |
| $R8 (1, k)_s = \{(4, 6)_1, (1, 5)_2, (4, 9)_2\};$ | $R9 (1, k)_s = \{(4, 3)_1, (1, 2)_2, (4, 6)_2\}$ |

Figure 51:
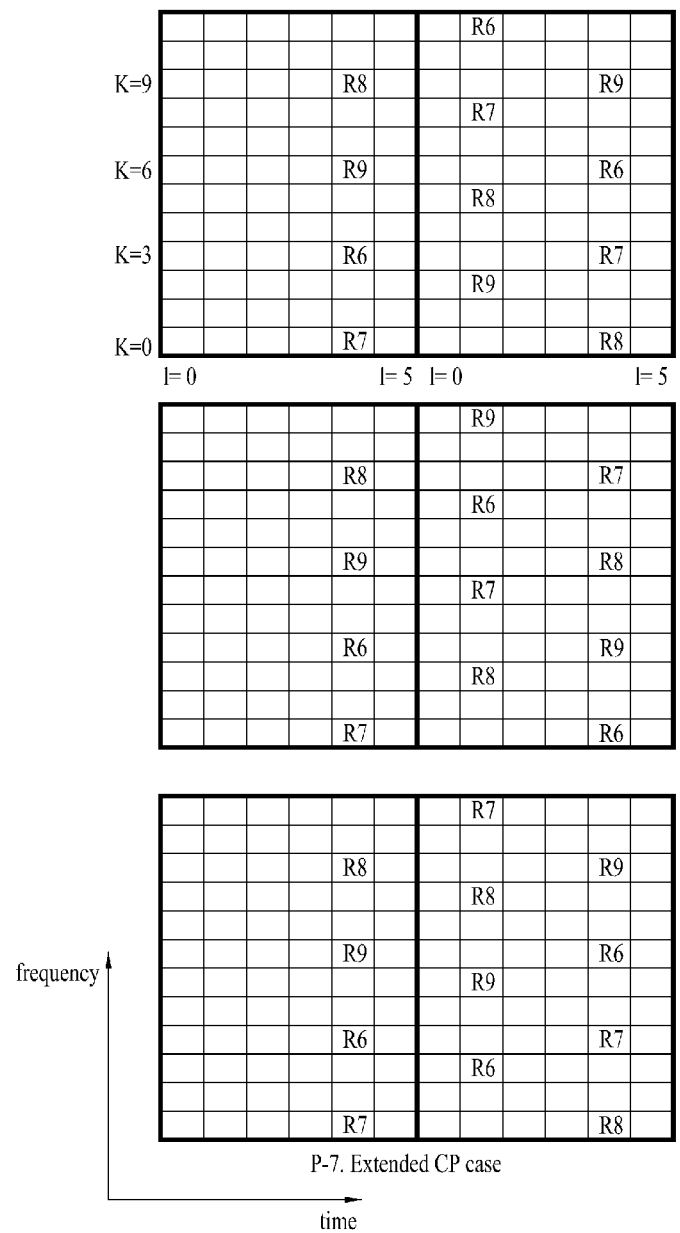

P-7-1 Pattern (FIG. 51)

| | |
|---|---|
| $R6 (1, k)_s = \{(4, 3)_1, (1, 11)_2, (4, 6)_2\};$ | $R7 (1, k)_s = \{(4, 0)_1, (1, 8)_2, (4, 3)_2\}$ |
| $R8 (1, k)_s = \{(4, 9)_1, (1, 5)_2, (4, 0)_2\};$ | $R9 (1, k)_s = \{(4, 6)_1, (1, 2)_2, (4, 9)_2\}$ |

P-7-2 Pattern (FIG. 51)

| | |
|---|---|
| $R6 (1, k)_s = \{(4, 3)_1, (1, 8)_2, (4, 0)_2\};$ | $R7 (1, k)_s = \{(4, 0)_1, (1, 5)_2, (4, 9)_2\}$ |
| $R8 (1, k)_s = \{(4, 9)_1, (1, 2)_2, (4, 6)_2\};$ | $R9 (1, k)_s = \{(4, 6)_1, (1, 11)_2, (4, 3)_2\}$ |

P-7-3 Pattern (FIG. 51)

| | |
|---|---|
| $R6 (1, k)_s = \{(4, 3)_1, (1, 2)_2, (4, 6)_2\};$ | $R7 (1, k)_s = \{(4, 0)_1, (1, 11)_2, (4, 3)_2\}$ |
| $R8 (1, k)_s = \{(4, 9)_1, (1, 8)_2, (4, 0)_2\};$ | $R9 (1, k)_s = \{(4, 6)_1, (1, 5)_2, (4, 9)_2\}$ |

Figure 52:
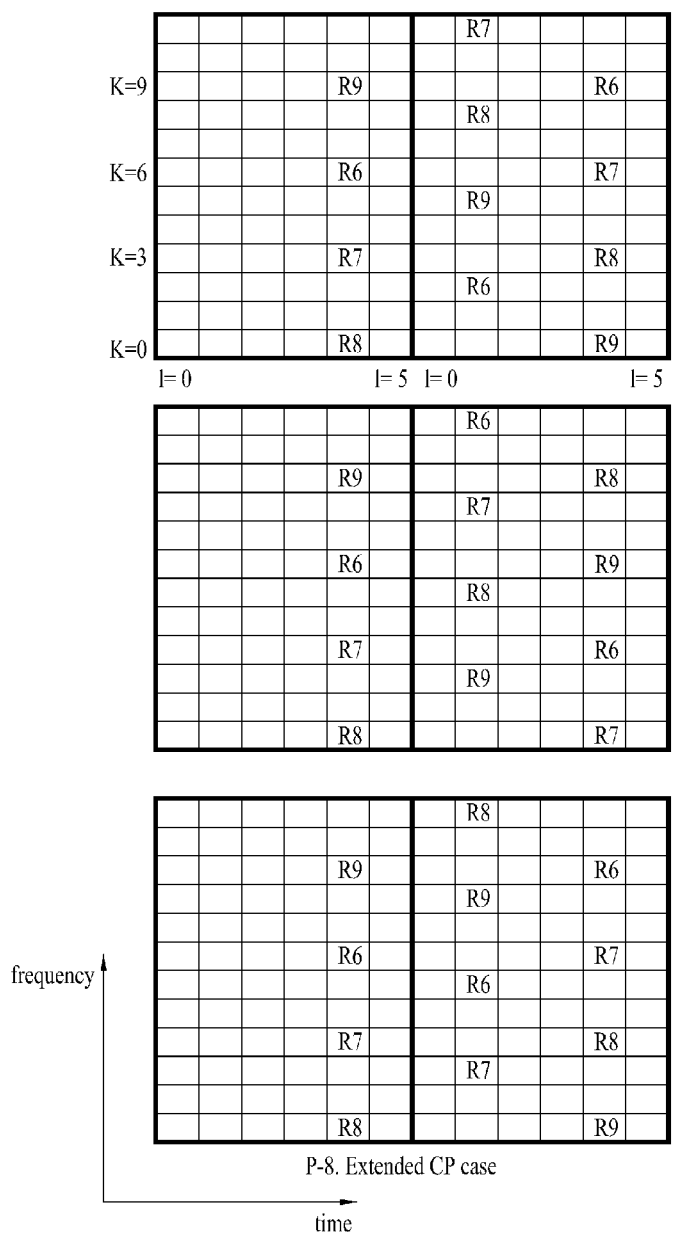

P-8-1 Pattern (FIG. 52)

| | |
|---|---|
| $R6 (1, k)_s = \{(4, 6)_1, (1, 2)_2, (4, 9)_2\};$ | $R7 (1, k)_s = \{(4, 3)_1, (1, 11)_2, (4, 6)_2\}$ |
| $R8 (1, k)_s = \{(4, 0)_1, (1, 8)_2, (4, 3)_2\};$ | $R9 (1, k)_s = \{(4, 9)_1, (1, 5)_2, (4, 0)_2\}$ |

P-8-2 Pattern (FIG. 52)

| | |
|---|---|
| $R6 (1, k)_s = \{(4, 6)_1, (1, 11)_2, (4, 3)_2\};$ | $R7 (1, k)_s = \{(4, 3)_1, (1, 8)_2, (4, 0)_2\}$ |
| $R8 (1, k)_s = \{(4, 0)_1, (1, 5)_2, (4, 9)_2\};$ | $R9 (1, k)_s = \{(4, 9)_1, (1, 2)_2, (4, 6)_2\}$ |

P-8-3 Pattern (FIG. 52)

| | |
|---|---|
| $R6 (1, k)_s = \{(4, 6)_1, (1, 5)_2, (4, 9)_2\};$ | $R7 (1, k)_s = \{(4, 3)_1, (1, 2)_2, (4, 6)_2\}$ |
| $R8 (1, k)_s = \{(4, 0)_1, (1, 11)_2, (4, 3)_2\};$ | $R9 (1, k)_s = \{(4, 9)_1, (1, 5)_2, (4, 0)_2\}$ |

The patterns P-1 to P-8 according to the embodiment of the present invention show the cases of multiplexing RSs for 4 extended antennas in form of FDM and TDM. Yet, the formerly described RS patterns are just exemplary. And, it is able to multiplex subsets of resource for allocating RSs for the antenna ports 6~9 in form of CDM. For instance, referring to the pattern A-1, it can be observed that total 6 REs are used for the RS of the antenna port #6 and the RS of the antenna port #8 [i.e., 3 each]. In this case, by allocating 6 RSs to the 6 REs for each of the antenna port 6 and the antenna port 8 doubly and allocating a different code or sequence to each of the antenna ports, RSs for the extended antenna can be multiplexed in form of CDM. Moreover, it is able to multiplex the RS for the extended antenna using all of the REs to which the RSs for the extended antenna are allocated. For instance, referring to the pattern A-1, it can be observed that total 12 REs are used for RSs of the antenna ports 6~9 [i.e., 3 each]. In this case, by allocating 12 RSs to the 12 REs for each of the antenna ports doubly and allocating a different code or sequence to each of the antenna ports, RSs for the 4 extended antennas can be multiplexed in form of CDM. Moreover, the scheme of multiplexing the RS for the extended antenna by CDM is applicable to all the patterns P-1 to P-8.

In order to perform frequency dependent scheduling on each component carrier or all component carriers proposed by the present invention, the allocation schemes of RSs for antennas #4 to #7 are applicable within a scheduling BW.

Figure 53:
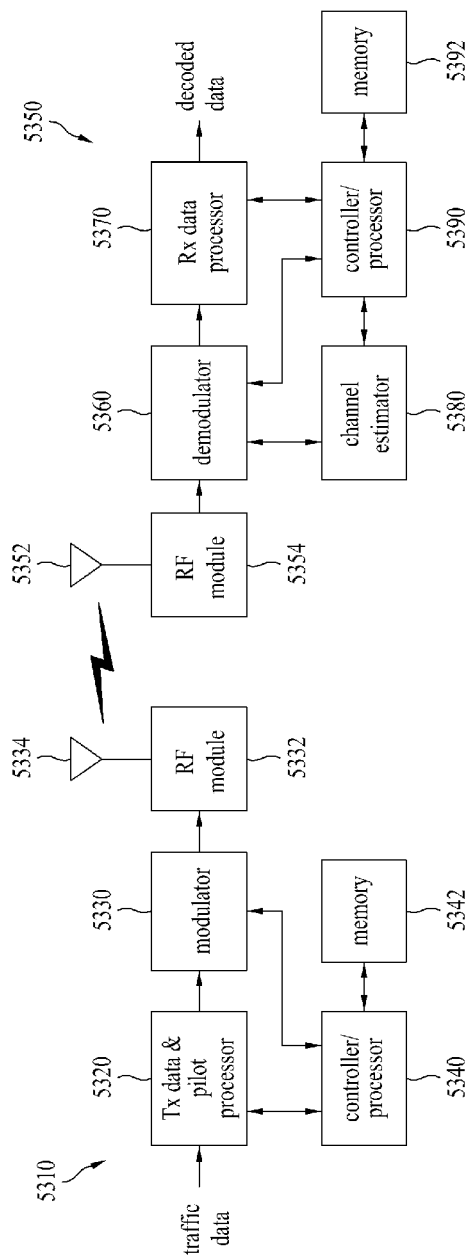
FIG. 53 is a block diagram of a transmitter and receiver applicable to the present invention.

FIG. 53 is a block diagram of a transmitter and receiver applicable to the present invention. In downlink, a transmitter 5310 is a part of a base station and a receiver 5350 is a part of a user equipment. In uplink, the transmitter 5310 is a part of the user equipment and the receiver 5350 is a part of the base station.

In the transmitter 5310, a transmission (Tx) data & pilot processor 5320 generates data symbols by performing encoding, interleaving and symbol mapping on data (e.g., traffic data and signaling). The processor 5320 generates pilot symbols and then multiplexes the data symbols and the pilot symbols together. A modulator 5330 modulates data into modulation symbol by such a scheme as BPSK (Binary Phase Shift Keying), QPSK (Quadrature Phase Shift Keying), QAM (Quadrature Amplitude Modulation) and the like. The modulator 5330 is able to generate a transmission symbol in accordance with a radio access scheme. In this case, the radio access scheme includes one of FDMA, TDMA, CDMA, SC-FDMA, MC-FDMA, and OFDMA or a combination thereof. A radio frequency (RF) module 5332 generates an RF signal transmitted via an antenna 5334 by processing (e.g., analog conversion, amplification, filtering and frequency uplink transform) the transmission symbol. In the receiver 5350, an antenna 5352 receives a signal transmitted from the transmitter 5310 and then provides the received signal to an RF module 5354. The RF module 5354 provides input samples by processing (e.g., filtering, amplification, frequency downlink transform, digitization, etc.) the received signal. A demodulator 5360 provides a data value and a pilot value by demodulating the input samples. A channel estimator 5380 induces a channel estimation value based on the received pilot values. And, the demodulator 5360 performs data detection (or equalization) on the received data values using the channel estimation value and then provides data symbols estimation values for the transmitter 5310. An Rx data processor 5370 performs symbol demapping, deinterleaving and decoding on the data symbol estimation values and then provides decoded data. Generally, the processings by the demodulator 5360 and the Rx data processor 5370 in the receiver 5350 are mutually compensated with the processings by the modulator 5330 and the Tx data & pilot processor 5320 in the transmitter 5310.

A controller/processor 5340/5390 directs and controls operations of various processing modules existing in the transmitter 5310/receiver 5350 to perform the operations proposed by the embodiment of the present invention. A memory 5342/5392 stores program codes and data for the transmitter/receiver 5310/5350.

The modules shown in FIG. 53 are provided for the description. The transceiver and/or receiver can further include necessary module(s). And, some modules/functions can be omitted or can be divided into different modules. Moreover, at least two modules can be integrated into one.

The above described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In this disclosure, embodiments of the present invention are described centering on the data transmission/reception relations between a terminal and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS)' and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention.

Thus, it is intended that the present invention covers the modifications and variations of this invention that come within the scope of the appended claims and their equivalents.

INDUSTRIAL APPLICABILITY

Accordingly, the present invention is applicable to a radio communication system. The present invention is applicable to a radio communication system supporting at least one of SC-FDMA, MC-FDMA and OFDMA. More particularly, the present invention is applicable to a method of transmitting a reference signal in a radio communication system.

What is claimed is:

1. A method of transmitting reference signals in a radio communication system, the method comprising:
mapping, for a first antenna group including a plurality of antennas, first reference signals to a set of fixed resource elements (REs) in two slots of a subframe, wherein the first reference signals are frequency division multiplexed on different REs in the set of fixed REs;
mapping, for a second antenna group including a plurality of antennas, second reference signals to K last consecutive control channel elements (CCEs) of L CCEs reserved for physical downlink control channel (PDCCH) in N starting orthogonal frequency division multiplexing (OFDM) symbols in a first slot of the subframe, wherein the second reference signals are code division multiplexed on the K last consecutive CCEs using different orthogonal sequences, wherein $K \geq 1$, wherein $L > K$, and wherein $1 \leq N \leq 3$; and
transmitting the first reference signals and the second reference signals at the subframe,
wherein each of the L CCEs includes a plurality of resource elements groups (REGs), and
wherein the L CCEs are interleaved in a unit of REG.

2. The method of claim 1, wherein each of the plurality of REGs is configured of four neighboring REs except the REs for the first reference signals in the N starting OFDM symbols at the first slot of the subframe.

3. The method of claim 1, wherein the first reference signals are configured to be transmitted every subframe, and the second reference signals are configured to be transmitted every M-th subframe from a starting subframe, wherein $M > 1$.

4. The method of claim 3, wherein the starting subframe is different per component carrier.

5. A method of processing reference signals in a radio communication system, the method comprising:
receiving first reference signals and second reference signals at a subframe;
de-mapping, for a first antenna group including a plurality of antennas, the first reference signals from a set of fixed resource elements (REs) in two slots of the subframe, wherein the first reference signals are frequency division multiplexed on different REs in the set of fixed REs; and
de-mapping, for a second antenna group including a plurality of antennas, the second reference signals from K last consecutive control channel elements (CCEs) of L CCEs reserved for physical downlink control channel (PDCCH) in N starting orthogonal frequency division multiplexing (OFDM) symbols in a first slot of the subframe, wherein the second reference signals are code division multiplexed on the K last consecutive CCEs using different orthogonal sequences, wherein $K \geq 1$, wherein $L > K$, and wherein $1 \leq N \leq 3$, wherein each of the L CCEs includes a plurality of resource element groups (REGs), and wherein the L CCEs are de-interleaved in a unit of REG.

6. The method of claim 5, wherein each of the plurality of REGs is configured of four neighboring REs except the REs for the first reference signals in the N starting OFDM symbols at the first slot of the subframe.

7. The method of claim 5, wherein the first reference signals are configured to be transmitted every subframe, and the second reference signals are configured to be transmitted every M-th subframe from a starting subframe, wherein M>1.

8. The method of claim 7, wherein the starting subframe is different per component carrier.

9. A base station for use in a radio communication system, the base station comprising:
   a radio frequency (RF) module;
   a memory; and
   a processor,
   wherein the processor is configured to:
   map, for a first antenna group including a plurality of antennas, first reference signals to a set of fixed resource elements (REs) in two slots of a subframe, wherein the first reference signals are frequency division multiplexed on different REs in the set of fixed REs;
   map, for a second antenna group including a plurality of antennas, second reference signals to K last consecutive control channel elements (CCEs) of L CCEs reserved for physical downlink control channel (PDCCH) in N starting orthogonal frequency division multiplexing (OFDM) symbols in a first slot of the subframe, wherein the second reference signals are code division multiplexed on the K last consecutive CCEs using different orthogonal sequences, wherein K≥1, wherein L>K, and wherein 1≤N≤3; and
   transmit the first reference signals and the second reference signals at the subframe,
   wherein each of the L CCEs includes a plurality of resource element groups (REGs), and
   wherein the L CCEs are interleaved in a unit of REG.

10. The base station of claim 9, wherein each of the plurality of REGs is configured of four neighboring REs except the REs for the first reference signals in the N starting OFDM symbols at the first slot of the subframe.

11. The base station of claim 9, wherein the first reference signals are configured to be transmitted every subframe, and the second reference signals are configured to be transmitted every M-th subframe from a starting subframe, wherein M>1.

12. The base station of claim 11, wherein the starting subframe is different per component carrier.

13. A user equipment for use in a radio communication system, the user equipment comprising:
   a radio frequency (RF) module;
   a memory; and
   a processor,
   wherein the processor is configured to:
   receive first reference signals and second reference signals at a subframe;
   de-map, for a first antenna group including a plurality of antennas, the first reference signals from a set of fixed resource elements (REs) in two slots of the subframe, wherein the first reference signals are frequency division multiplexed on different REs in the set of fixed REs; and
   de-map, for a second antenna group including a plurality of antennas, the second reference signals from K last consecutive control channel elements (CCEs) of L CCEs reserved for physical downlink control channel (PDCCH) in N starting orthogonal frequency division multiplexing (OFDM) symbols in a first slot of the subframe, wherein the second reference signals are code division multiplexed on the K last consecutive CCEs using different orthogonal sequences, wherein K≥1, wherein L>K, and wherein 1≤N≤3,
   wherein each of the L CCEs includes a plurality of resource element groups (REGs), and
   wherein the L CCEs are de-interleaved in a unit of REG.

14. The user equipment of claim 13, wherein each of the plurality of REGs is configured of four neighboring REs except the REs for the first reference signals in the N starting OFDM symbols at the first slot of the subframe.

15. The user equipment of claim 13, wherein the first reference signals are configured to be received every subframe, and the second reference signals are configured to be received every M-th subframe from a starting subframe, wherein M>1.

16. The user equipment of claim 15, wherein the starting subframe is different per component carrier.

* * * * *